US007164656B2

(12) United States Patent
Foster et al.

(10) Patent No.: US 7,164,656 B2
(45) Date of Patent: *Jan. 16, 2007

(54) COMMUNICATING DATA THROUGH A NETWORK SO AS TO ENSURE QUALITY OF SERVICE

(75) Inventors: Michael S. Foster, Federal Way, WA (US); Michael A. Dorsett, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 892 days.

This patent is subject to a terminal disclaimer.

(21) Appl. No.: 10/126,487

(22) Filed: Apr. 19, 2002

(65) Prior Publication Data

US 2002/0181395 A1   Dec. 5, 2002

Related U.S. Application Data

(60) Provisional application No. 60/287,069, filed on Apr. 27, 2001, provisional application No. 60/287,120, filed on Apr. 27, 2001, provisional application No. 60/286,918, filed on Apr. 27, 2001, provisional application No. 60/286,922, filed on Apr. 27, 2001, provisional application No. 60/287,081, filed on Apr. 27, 2001, provisional application No. 60/287,075, filed on Apr. 27, 2001, provisional application No. 60/314,088, filed on Aug. 21, 2001, provisional application No. 60/314,287, filed on Aug. 22, 2001, provisional application No. 60/314,158, filed on Aug. 21, 2001.

(51) Int. Cl.
*H04J 1/16* (2006.01)

(52) U.S. Cl. .................................... 370/235

(58) Field of Classification Search ........ 370/229–235, 370/237, 431, 437, 422; 709/227–229
See application file for complete search history.

(56) References Cited

U.S. PATENT DOCUMENTS

| 5,818,845 | A | * | 10/1998 | Moura et al. ............... 370/449 |
| 5,872,783 | A | | 2/1999 | Chin |
| 5,892,766 | A | | 4/1999 | Wicki et al. |
| 5,940,596 | A | | 8/1999 | Rajan et al. |
| 6,034,956 | A | | 3/2000 | Olnowich et al. |
| 6,075,796 | A | * | 6/2000 | Katseff et al. .............. 370/466 |
| 6,147,976 | A | | 11/2000 | Shand et al. |

(Continued)

OTHER PUBLICATIONS

RSVP, Sep. 1997, pp. 1-4.*

*Primary Examiner*—Dmitry Levitan
(74) *Attorney, Agent, or Firm*—Perkins Coie LLP

(57) ABSTRACT

Techniques for communicating data through a network so as to satisfy various Quality Of Service ("QOS") levels are described. The QOS levels may be selected based on a determined type of the data or the data communication, such as by a network manager after the data communication is registered, and QOS communication parameters are selected for the data communication to ensure that the QOS levels are achieved. Other techniques may also be used to ensure that a selected QOS level is achieved, including selecting an appropriate path through the network, controlling other data communications that use some or all of the selected path, and/or enabling preemption of such other data communications. QOS levels that are actually achieved may also be monitored, and the QOS communication parameters and/or path for a data communication may be dynamically modified based on differences between actual achieved QOS levels and desired QOS levels.

63 Claims, 33 Drawing Sheets

U.S. PATENT DOCUMENTS 6,215,412 B1 4/2001 Franaszek et al.
6,738,352 B1 * 5/2004 Yamada et al. ............. 370/238
6,760,306 B1 * 7/2004 Pan et al. .................. 370/230

* cited by examiner

Example Inter-NIC Communications

| | Source VI NIC _211_ | Destination VI NIC(s) _213_ | Transmittal Virtual Identifier _215_ | Response Virtual Identifier _217_ | Path Links _219_ |
|---|---|---|---|---|---|
| 1a | 250 | 270 | A | B | 262a; 264a |
| 1b | 270 | 250 | B | A | 264a; 262a |
| 2 | 250 | 275 | C | D | 262a; 264b |
| 3 | 250 | 280 | E | F | 262c; 266a |
| 4 | 275 | 250, 280 | E | G | 264c; 262b 264d; 266b |

*Fig. 2B*

Example VIC NIC 250 Virtual Identifier Translation Table

| | Sent Communication Destination Identification (IP address / port) _221_ | Received Communication Routing Information (IP address / port) _223_ | Transmittal Virtual Identifier _225_ | Response Virtual Identifier _227_ | Other Communication Parameters _229_ | | |
|---|---|---|---|---|---|---|---|
| | | | | | COS | Min. Priority | Max. Priority |
| 1 | 128.32.78.105/3523 | 153.83.28.125/3025 | A | B | 1 | 0 | 127 |
| 2 | 135.82.123.12/3123 | 153.83.28.125/3025 | C | D | 2 | 50 | 55 |
| 3 | 128.32.78.105/80 | 153.83.28.125/3183 | E | F | 2 | 0 | 10 |
| 4 | - | 153.83.28.126/3824 | G | E | 3 | 30 | 30 |

*Fig. 2C*

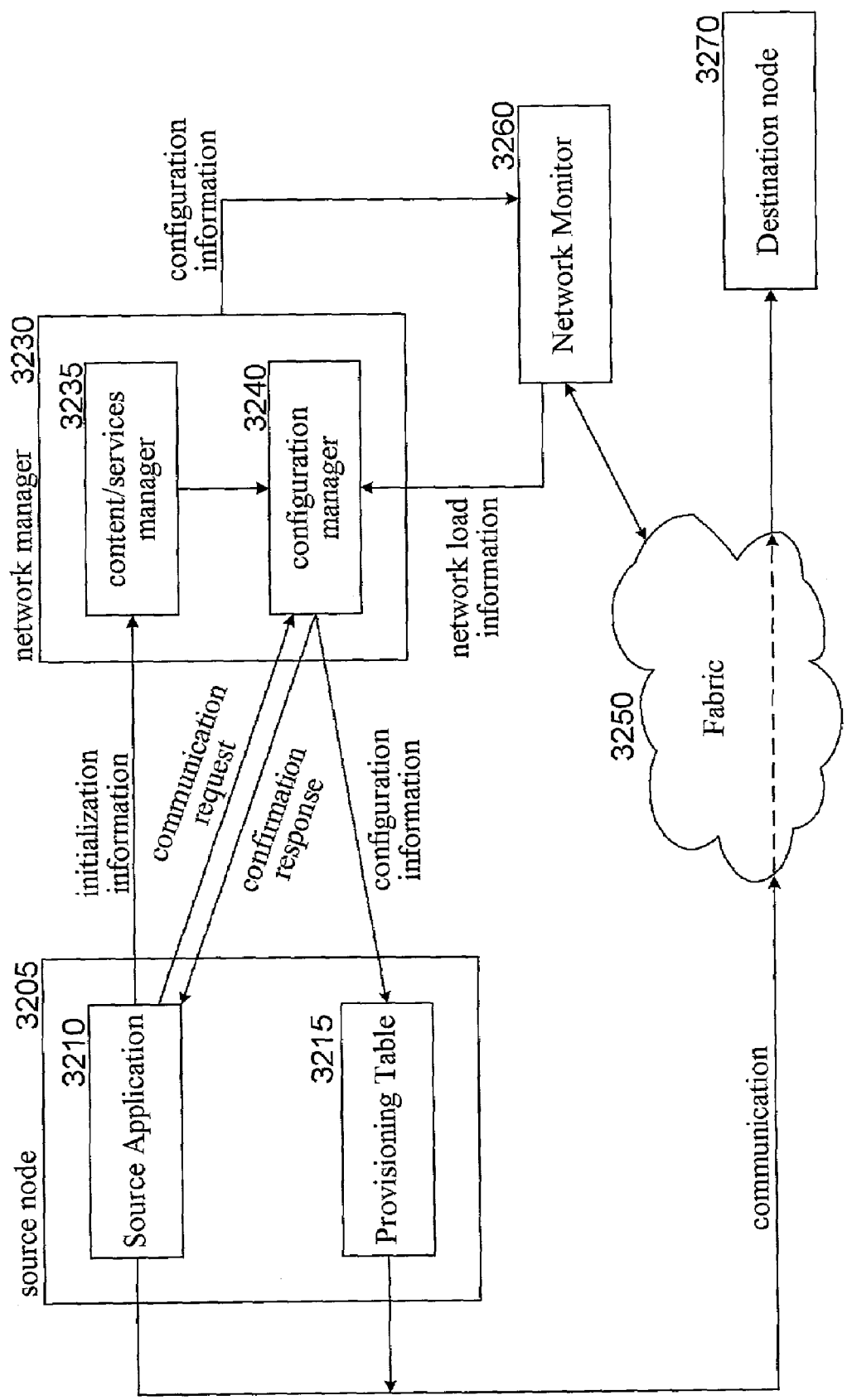

COMMUNICATING DATA THROUGH A NETWORK SO AS TO ENSURE QUALITY OF SERVICE

CROSS-REFERENCE TO RELATED APPLICATION(S)

This application claims the benefit of U.S. Provisional Application No. 60/287,069 entitled "METHOD FOR IMPLEMENTING A CLUSTER NETWORK FOR HIGH PERFORMANCE AND HIGH AVAILABILITY USING A FIBRE CHANNEL SWITCH FABRIC," filed Apr. 27, 2001; U.S. Provisional Application No. 60/287,120 entitled "MULTI-PROTOCOL NETWORK FOR ENTERPRISE DATA CENTERS," filed Apr. 27, 2001; U.S. Provisional Application No. 60/286,918 entitled "UNIFIED ENTERPRISE NETWORK SWITCH (UNEX) PRODUCT SPECIFICATION," filed Apr. 27, 2001; U.S. Provisional Application No. 60/286,922 entitled "QUALITY OF SERVICE EXAMPLE," filed Apr. 27, 2001; U.S. Provisional Application No. 60/287,081 entitled "COMMUNICATIONS MODEL," filed Apr. 27, 2001; U.S. Provisional Application No. 60/287,075 entitled "UNIFORM ENTERPRISE NETWORK SYSTEM," filed Apr. 27, 2001; U.S. Provisional Application No. 60/314,088 entitled "INTERCONNECT FABRIC MODULE," filed Aug. 21, 2001; U.S. Provisional Application No. 60/314,287 entitled "INTEGRATED ANALYSIS OF INCOMING DATA TRANSMISSIONS," filed Aug. 22, 2001; U.S. Provisional Application No. 60/314,158 entitled "USING VIRTUAL IDENTIFIERS TO ROUTE TRANSMITTED DATA THROUGH A NETWORK," filed Aug. 21, 2001; U.S. patent application Ser. No. 10/062,199 entitled "METHOD AND SYSTEM FOR VIRTUAL ADDRESSING IN A COMMUNICATIONS NETWORK"; U.S. patent application Ser. No. 10/066,014 entitled "METHOD AND SYSTEM FOR LABEL TABLE CACHING IN A ROUTING DEVICE"; U.S. patent application Ser. No. 10/039,505 entitled "METHOD AND SYSTEM FOR MULTIFRAME BUFFERING IN A ROUTING DEVICE"; U.S. patent application Ser. No. 10/046,333 entitled "METHOD AND SYSTEM FOR DOMAIN ADDRESSING IN A COMMUNICATIONS NETWORK"; U.S. patent application Ser. No. 10/039,404 entitled "METHOD AND SYSTEM FOR INTERSWITCH LOAD BALANCING IN A COMMUNICATIONS NETWORK"; U.S. patent application Ser. No. 10/046,572 entitled "METHOD AND SYSTEM FOR INTERSWITCH DEADLOCK AVOIDANCE IN A COMMUNICATIONS NETWORK"; U.S. patent application Ser. No. 10/039,877 entitled "METHOD AND SYSTEM FOR CONNECTION PREEMPTION IN A COMMUNICATIONS NETWORK"; U.S. patent application Ser. No. 10/061564 entitled "METHOD AND SYSTEM FOR MULTICASTING IN A ROUTING DEVICE"; U.S. patent application Ser. No. 10/046,640 entitled "METHOD AND SYSTEM FOR NETWORK CONFIGURATION DISCOVERY IN A NETWORK MANAGER"; U.S. patent application Ser. No. 10/046,334 entitled "METHOD AND SYSTEM FOR PATH BUILDING IN A COMMUNICATIONS NETWORK"; U.S. patent application Ser. No. 10/039,703 entitled "METHOD AND SYSTEM FOR RESERVED ADDRESSING IN A COMMUNICATIONS NETWORK"; U.S. patent application Ser. No. 10/039,814 entitled "METHOD AND SYSTEM FOR RECONFIGURING A PATH IN A COMMUNICATIONS NETWORK"; U.S. patent application Ser. No. 10/066,217 entitled "METHOD AND SYSTEM FOR ADMINISTRATIVE PORTS IN A ROUTING DEVICE"; U.S. patent application Ser. No. 10/039,784 entitled "PARALLEL ANALYSIS OF INCOMING DATA TRANSMISSIONS"; U.S. patent application Ser. No. 10/066,159 entitled "INTEGRATED ANALYSIS OF INCOMING DATA TRANSMISSIONS"; U.S. patent application Ser. No. 10/062,245 entitled "USING VIRTUAL IDENTIFIERS TO ROUTE TRANSMITTED DATA THROUGH A NETWORK"; U.S. patent application Ser. No. 10/044,182 entitled "USING VIRTUAL IDENTIFIERS TO PROCESS RECEIVED DATA ROUTED THROUGH A NETWORK"; U.S. patent application Ser. No. 10/044,164 entitled "METHOD AND SYSTEM FOR PERFORMING SECURITY VIA VIRTUAL ADDRESSING IN A COMMUNICATIONS NETWORK"; and U.S. patent application Ser. No. 10/068,329 entitled "METHOD AND SYSTEM FOR PERFORMING SECURITY VIA DE-REGISTRATION IN A COMMUNICATIONS NETWORK", all of which are hereby incorporated by reference in their entirety. This application is also related to U.S. patent application Ser. No. 10/126,489 entitled "COMMUNICATING DATA THROUGH A NETWORK" and filed concurrently.

This application is also related to U.S. patent application Ser. No. 10/126,489, entitled "COMMUNICATING DATA THROUGH A NETWORK" and filed concurrently.

TECHNICAL FIELD

The following disclosure relates generally to computer networks, and more particularly to techniques for communicating data through networks.

BACKGROUND

The Internet has emerged as a critical commerce and communications platform for businesses and consumers worldwide. The dramatic growth in the number of Internet users, coupled with the increased availability of powerful new tools and equipment that enable the development, processing, and distribution of data across the Internet, have led to a proliferation of Internet-based applications. These applications include e-commerce, e-mail, electronic file transfers, and online interactive applications. As the number of users of and uses for the Internet increases, so does the complexity and volume of Internet traffic. Because of this traffic and its business potential, a growing number of companies are building businesses around the Internet and developing mission-critical business applications to be provided by the Internet.

Existing enterprise data networks ("EDNs") that support e-commerce applications are straining under the demand to provide added performance and services to customers. In particular, the growing customer demands for services have resulted in increasingly complex ad hoc EDNs. Current architectures of EDNs typically include three sub-networks: 1) a web server local area network (LAN), 2) a computational network for application servers, and 3) a storage area network (SAN). The processing and storage elements attached to these sub-networks may have access to a wide area network (WAN) or metropolitan area network (MAN) through a bridging device commonly known as an edge switch. Unfortunately, each of these sub-networks typically uses a distinct protocol and associated set of hardware and software, including network interface adapters, network switches, network operating systems, and management applications. Communication through the EDN requires bridging between the sub-networks that requires active participation of server processing resources for protocol translation and interpretation. There are a variety of disadvantages to the current architecture of EDNs, many of which result because the sub-networks and associated applications are developed by different vendors and it is difficult to integrate, manage, maintain and scale such inter-vendor EDNs. The ability to provide affordable, high-performance EDN solutions with extensive scalability, very high availability, and ease of management is thus significantly compromised or completely lost as existing solutions are grown ad hoc to meet customer demands.

In addition to inter-vendor problems that exist in current EDN architectures, it is often difficult to transmit data to appropriate destinations in a secure manner, particularly with any guarantees as to the Quality Of Service ("QOS") of the transmissions. For example, current architectures typically assign one or more network addresses to each node in a network (e.g., logical network addresses such as IP addresses and/or physical network addresses such as Media Access Control ("MAC") addresses), and network routing and switching devices use the network addresses of a destination node to route transmissions of data from a source node to that destination node. However, it is difficult to prevent unauthorized source nodes from sending data to a destination node with a known network address, particularly if the source nodes masquerade their identities by spoofing their own network addresses, and correspondingly it is difficult for a destination node to ensure that received data is from an authorized source. In addition, it can be difficult for even an authorized source node to transmit data to desired destinations, as the source node must know the appropriate network address or other logical name (e.g., a DNS name) that is assigned or mapped to a destination node in order to perform the transmitting. Even more difficult are situations in which the appropriate destinations are difficult to identify, such as for a source node that is publishing data of a type that may be of interest to various potential subscriber destination nodes. Finally, current architectures typically do not allow a source node to ensure that transmitted data will be processed with a desired QOS, such as a minimum network latency or minimum level of throughput.

BRIEF DESCRIPTION OF THE DRAWINGS

FIGS. 2A–2C illustrate an example of Virtual Identifier Network Interface Controller ("NIC") embodiments using virtual identifiers to inter-communicate through an example Fibre Channel Fabric network.

FIG. 32 illustrates an example of configuring a node to use QOS communication parameters and of monitoring the network to determine whether to modify those configured communication parameters.

DETAILED DESCRIPTION

Figure 1:
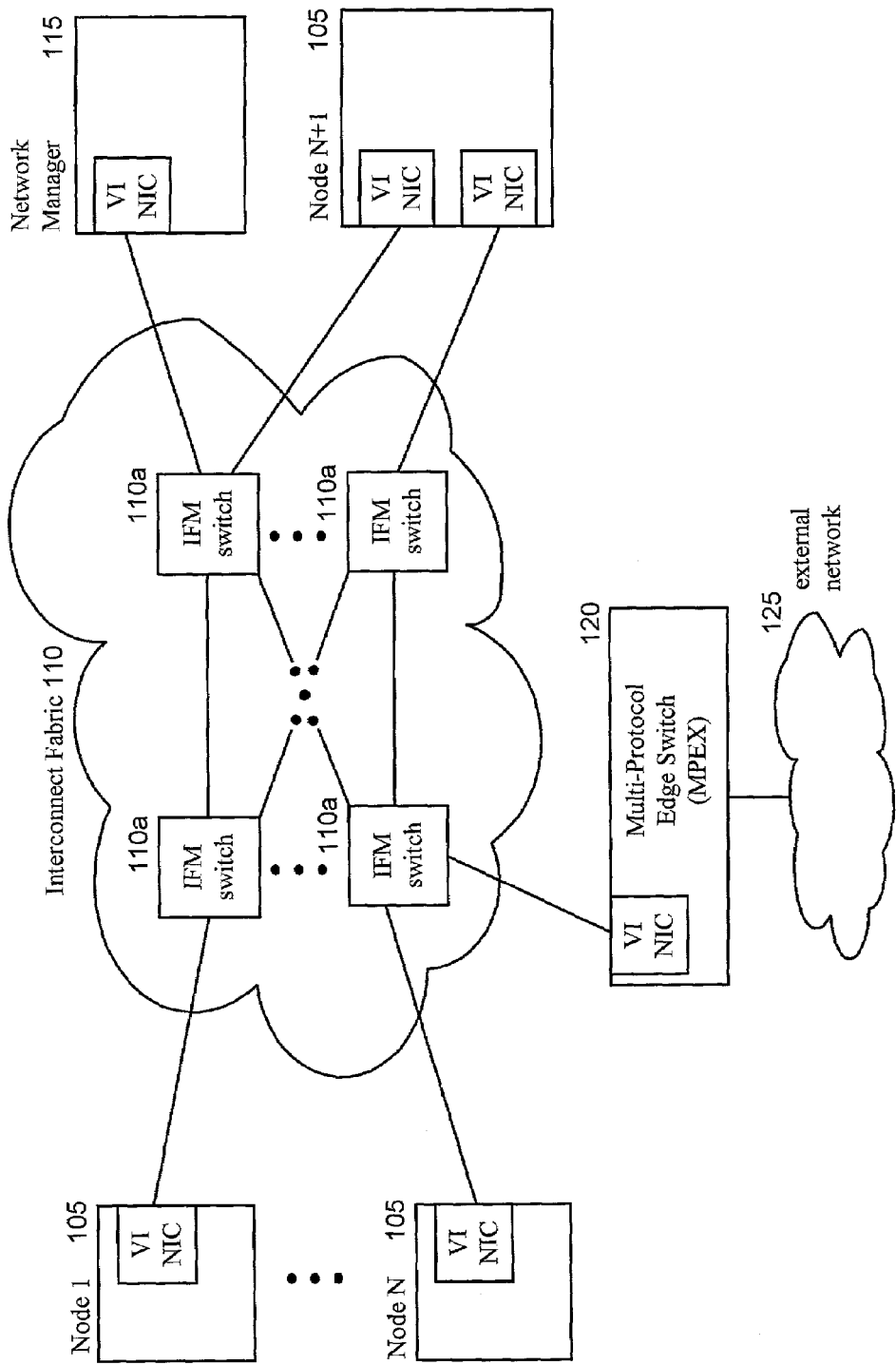
FIG. 1 is a network diagram illustrating various nodes of an example Fibre Channel Fabric network that are inter-communicating.

Techniques are described below for communicating data through a network to destinations. In some embodiments, each node of a network first registers with a network manager for the network, such as to identify to the network manager the node and/or one or more hardware ports of the node that are connected to the network. Before a network node communicates data to other network nodes, such as from software executing on that node (e.g., an application program), that node (or software executing on the node)

registers that data communication with the network manager, such as in a dynamic manner for each data communication when it is to occur and/or by pre-registering data communications of an indicated type. In response to the registering, the network manager in some embodiments provides to the node an identifier corresponding to one or more destination nodes that is to be used for routing the data communication to those destinations.

When the network manager receives a request to register a data communication (also referred to in some embodiments as an "application login request") from a network node that is to be a source of the data communication, the network manager determines whether to allow the data communication, and in some situations determines one or more appropriate destination nodes for the data. An appropriate destination determination can be made in a variety of ways, such as by selecting appropriate destinations based on a type of the data communication, on information about destinations specified in the request, and/or on other accessible information about nodes, such as nodes that are interested in receiving the data communication. When the data communication is to be allowed, the network manager configures one or more intermediate network routing devices along a path between the source node and the one or more destination nodes in such a manner that the data communication will reach the appropriate destinations. In some embodiments, the network manager selects one or more virtual identifiers to be used with a registered data communication (or with multiple data communications of a specified type), configures each of the intermediate network routing devices along the path to properly handle data communications using those virtual identifiers, and then notifies the source node of the selected virtual identifiers for use with the data communication.

In some embodiments, the network manager also determines one or more Quality Of Service ("QOS") parameters that are appropriate for a registered data communication, such as based on a type of the data to be communicated. As described in greater detail below, a variety of types of QOS levels (also referred to as "service levels" or "QOS policies") can be selected for a data communication, such as a minimum level of throughput or bandwidth, a maximum level of network latency or delivery jitter, etc. In addition, a variety of QOS communication parameters can be selected for use with a data communication in order to ensure that a selected QOS level will be achieved, such as particular communication priority levels and/or a communication Class Of Service for networks that support such communication parameters. After selecting QOS communication parameters for a data communication, the network manager notifies the source node and/or some or all of the intermediate network routing devices along the selected path of the selected QOS communication parameters for use with the data communication.

In addition to selecting appropriate QOS communication parameters, the network manager may also perform other tasks in some embodiments to ensure that a selected QOS level is achieved for one or more data communications, including selecting an appropriate path through the network (e.g., a path through an appropriate group of intermediate routing devices and/or that is configured to allow load balancing between two or more of the intermediate routing devices along the path), controlling which other data communications are allowed to use some or all of the selected path, controlling a rate or time at which such other data communications can occur, and/or enabling preemption of other data communications that are using some or all of the selected path. QOS levels that are actually achieved for some or all data communications may also in some embodiments be monitored (e.g., in real-time), and if so the QOS communication parameters that are assigned to a data communication and/or the path to be used for the data communication may be dynamically modified based on differences between actual achieved QOS levels and desired QOS levels.

After a data communication has been registered with the network manager, a source network node can then transmit the data to one or more appropriate destination nodes. In particular, the source network node transmits the data to a first intermediate network routing device along a path to the destinations (e.g., via a hardware port on the node that is connected to that first intermediate network routing device) along with an indication corresponding to the one or more destination nodes. When the network manager has notified the source node of one or more virtual identifiers to be used for the data communication, the source node uses those virtual identifiers as the indication corresponding to the destination nodes. Similarly, when the network manager has notified the source node of one or more QOS communication parameters that are to be used with the data communication (e.g., with this specific data communication, or with all data communications of a type that corresponds to this data communication), the source node uses those QOS communication parameters with the data communication. In other embodiments, destination nodes can be indicated in other manners, such as with network addresses associated with the destination nodes.

When an intermediate network routing device receives a transmitted data communication, the intermediate network routing device determines how to forward the data communication based on the destination indication and the manner in which the network manager has configured the intermediate network routing device. For example, in embodiments in which the network manager has selected one or more virtual identifiers to be used with the data communication, the network manager configures each intermediate network routing device along the path assigned to those virtual identifiers to forward data communications using those virtual identifiers to a next of the intermediate network routing devices along the path (or, for the last intermediate network routing device, to forward the data communication directly to a destination node). Similarly, if the network manager has selected one or more QOS communication parameters for use with the data communication, the intermediate network routing devices along the path may be configured to forward that data communications in accordance with those QOS communication parameters, or the intermediate network routing devices may instead forward the data communication using the same QOS communication parameters as were used with the data communication when received.

In some embodiments, data communications are also filtered during their transmission, such as by the source node, the destination node, and/or one or more of the intermediate network routing devices. As discussed in greater detail below, such filtering can be performed in a variety of ways and for a variety of purposes (e.g., security and/or to minimize network traffic to ensure QOS parameters). For example, in embodiments in which the network manager selects multiple virtual identifiers (e.g., a pair) that are to be used with each data communication, the filtering can ensure that a data communication has the correct combination of virtual identifiers. In addition, if the network manager has specified QOS parameters that are allowable for a data communication, the filtering can also ensure that a data communication is being transmitted using appropriate QOS parameters. When the filtering detects a problem with a data communication, a variety of actions may be taken, such as to block the transmission of that data communication, to notify a designated observer (e.g., the network manager) of the problem, to modify the transmission so as to remove the problem, etc.

Data Communication Registration and Node-Based Communication Filtering

In some embodiments in which virtual identifiers are used, one or more Virtual Identifier ("VI") Network Interface Controller ("NIC") facilities on each node (e.g., one VI NIC for each network interface hardware port) facilitate the use of virtual identifiers in communicating data. When a VI NIC on a node receives an indication that a data communication to one or more remote nodes is to occur, such as from an application executing on the node, the VI NIC will identify an appropriate transmittal virtual identifier that can be used to route the data communication through the network to the appropriate remote destination nodes without being assigned to or directly associated with those destination nodes. Such data communications can include both transitory connectionless transmittals of data (e.g., unidirectional transmittals from a source to a destination) and non-transitory connections that allow multiple distinct transmittals of data (e.g., a persistent dedicated connection that allows a connection-initiating source and a connection destination to transmit data back and forth).

The VI NIC can identify an appropriate transmittal virtual identifier for routing a data communication in various ways. In some embodiments, the VI NIC will register some or all outgoing data communications with a network manager for the network, and will receive an appropriate transmittal virtual identifier to be used for that communication from the network manager. If an indicated data communication corresponds to a previously registered data communication (e.g., to an existing connection or to a previous communication to the same destination and in the same transmission manner), however, the VI NIC could instead in some embodiments use the previously received transmittal virtual identifier for that data communication rather than perform an additional registration for the indicated data communication. The manners in which a data communication can be transmitted vary with the transmission characteristics that are supported by a network, and can include factors such as a particular Class Of Service ("COS") or transmission priority.

In some embodiments in which virtual identifiers are assigned to paths through a network, the assignment of paths to such virtual path identifiers is performed in a dynamic fashion after an indication is received that a data communication is to occur, such as by the network manager upon receipt of a data communication registration. The assigning of a virtual path identifier to a path can include the configuring of each of one or more intermediate routing devices (e.g., routers or switches) between the source and the destination, such as by the network manager, so that when one of the routing devices receives a data communication that includes the virtual identifier it will forward the communication in an appropriate manner either directly to the destination or instead to a next routing device along the path that is similarly configured.

The VI NIC can also assist in determining appropriate destinations for an indicated data communication, either directly or in conjunction with the network manager (e.g., by registering the data communication with the network manager), with the transmittal virtual identifier for that data communication selected so as to route the data communication to those destinations. In some situations, the indicated data communication may explicitly specify a destination, such as with a destination network address, while in other situations a destination may not be specified, such as when an application is publishing information and is relying on a third party to route the information to one or more current subscribers for that information. Regardless of whether a destination is specified, however, the VI NIC and/or the network manager can select one or more destinations that are appropriate for the indicated data communication, even if the specified destination is not among the selected destinations. This destination selection can be made by considering one or more of various factors, including any destinations specified, any expressions of interest made by potential recipients in the data communication (e.g., subscription requests), the type of data being communicated, the manner of the data communication (e.g., a specified COS and/or transmission priority), the identity or type of the source node and/or source application, the type of a destination application, etc.

In some situations, a source of an indicated data communication may specify a destination using a destination network address that is not mapped to any node in the network, and if so the VI NIC and/or the network manager could then select an appropriate destination for that destination network address. Multiple destinations can also be selected for an indicated data communication, even if that data communication specified a single destination (which may or may not be one of the selected destinations). If so, a single transmittal virtual identifier can be used to route the data communication to each of the multiple selected destinations, such as by configuring one or more intermediary routing devices to divide received communications that use that transmittal virtual identifier so as to forward a copy of such received communications to each of multiple destinations (or multiple next routing devices).

In some embodiments, virtual identifiers correspond to paths through a network that are specific to a source. If so, a single virtual identifier can be used by different sources for different paths, such as to different destinations if the different paths do not overlap. The use of virtual identifiers also allows a path corresponding to a virtual identifier to be reconfigured in a manner transparent to a source using that virtual identifier, such as to correspond to a different path to the same destination or to a path to a different destination.

In some embodiments, when a data communication indicated by a source can result in bi-directional communication (e.g., a response from one or more of the destinations), the VI NIC also identifies a response virtual identifier that can be used for routing data from one or more of the destinations back to the source. If the VI NIC registers the data communication with a network manager, this response virtual identifier may be received from the network manager. After identifying this response virtual identifier, the VI NIC associates it with information indicating how to process received data communications that are routed using the response virtual identifier. In some embodiments, such received data communications are processed by forwarding the data communications to one or more resources associated with the destination node, such as an executing application program, a file on storage, or a device that is part of the node. For example, if a source application on a source node initiates a bi-directional communication, a VI NIC for the source node may associate the response virtual identifier with that source application so that received responses can be forwarded to that source application (which then becomes the destination application for those received communications).

The association of a virtual identifier with a corresponding destination application to which a data communication will be forwarded can be performed in various ways. For example, software applications that communicate using TCP/IP mechanisms often use TCP/IP sockets, which include a combination of an IP address and a software port number specific to a computing device using that IP address. Thus, in those embodiments the response virtual identifier can be associated with socket information for the source application. In a similar manner, in some embodiments a destination node associates transmittal virtual identifiers used to route data communications to that destination with an appropriate resource local to the destination node, such as based on information provided to the destination node by the network manager as part of the registering of those data communications and/or based on information included as part of the data communications.

When the VI NIC has access to application-specific information for a destination application for a received communication, such as TCP/IP socket information that is associated with a response virtual identifier, the VI NIC can use the information to provide additional benefits. For example, many network nodes and/or applications executing on such nodes require that various information be correctly specified in a received communication in order for that communication to be accepted, such as for security reasons. One example is that a destination application using TCP/IP communication mechanisms may require that any received transmissions include the correct TCP/IP socket information corresponding to that application. However, the previously discussed use of transmittal virtual identifiers can result in valid communications being received having incorrect TCP/IP socket information for a destination application, as discussed in greater detail below. When this occurs, the VI NIC that receives the communication can replace the incorrect included TCP/IP socket information with the correct information for the application by using the TCP/IP socket information that is associated with the transmittal virtual identifier used to route the communication. In addition, in some embodiments the VI NIC may verify the accuracy of the received communication in various ways before performing such information replacement.

The use of virtual identifiers can result in valid received communications that have incorrect information for a destination application in various ways. For example, if a source application specifies a destination IP address and that destination IP address is included in the data being communicated (e.g., in a location reserved for such a destination network address), but a VI NIC for that source application identifies one or more destinations that do not correspond to that destination IP address (e.g., that have other IP addresses), then the data communication will include a specified destination IP address that does not correspond to the IP addresses used by applications at the identified destinations. In addition, if multiple destinations with different IP addresses are identified by the VI NIC when only a single destination IP address was specified, most of the destinations will receive communications that do not include correct IP address information. In such situations, the VI NIC that receives the communication can replace the incorrect included IP address information with the correct IP address information for the application by using the TCP/IP socket information that is associated with the virtual identifier used to route the communication. Those skilled in the art will appreciate that a similar information replacement can be used for other communication mechanisms. In addition, in situations in which a data communication is being routed to only a single destination, the VI NIC that sends the data communication can perform the information replacement if that VI NIC has access to the necessary application-specific information for the destination application.

In some embodiments, a VI NIC can also identify information related to routing a data communication other than a transmittal virtual identifier, either directly or in conjunction with the network manager (e.g., by registering the data communication with the network manager). For example, the VI NIC may identify one or more Quality Of Service ("QOS") parameters that relate to a manner in which the data communication should occur, such as a specified COS and/or a priority to be used for the transmission of the data. If so, the VI NIC can also use such QOS parameters when transmitting data for that data communication.

For illustrative purposes, some embodiments are described below In which the VI NIC is used as part of a Fibre Channel network and/or as part of an EDN architecture. However, those skilled in the art will appreciate that the techniques of the invention can be used in a wide variety of other situations and with other types of networks, including InfiniBand-based networks, and that the invention is not limited to use in Fibre Channel networks or with EDN architectures. Additional details about Fibre Channel are available in "Fibre Channel: A Comprehensive Introduction," which is authored by Robert W. Kembel and published by Northwest Learning Associates, Inc., and which is hereby incorporated by reference in its entirety.

FIG. 1 is a network diagram illustrating various nodes of an example Fibre Channel fabric-based interconnect network that are inter-communicating using virtual identifiers. In this example embodiment, multiple interconnect fabric modules ("IFMs") 110 with high-speed switching capabilities are used as intermediate routing devices to form an interconnect fabric, and multiple nodes 105, a network manager 115 and a Multi-Protocol Edge Switch ("MPEX") 120 are connected to the fabric. Each of the nodes has at least one VI NIC that uses virtual identifiers when communicating and receiving data. The MPEX is used to connect the Fibre Channel network to an external network, such as an Ethernet-based network, and similarly includes at least one VI NIC. Data is transmitted through the interconnect fabric using frames such as those defined by the Fibre Channel standard.

In this example embodiment, an IFM can be dynamically configured to interconnect its communications ports so that data can be transmitted through the interconnected ports. When the network manager receives a registration indication from a VI NIC for a data communication from a source node to a destination node, the network manager selects transmittal and response virtual identifiers to be used by the source and destination nodes when sending frames to each other. The network manager also identifies a path through the IFMs and their ports which frames will use when moving between the nodes. The network manager then configures the IFMs of the identified path so that when a frame that indicates the transmittal or response virtual identifiers is received at one of the IFMs, that frame is forwarded to the destination or source nodes via the path as appropriate. While the transmittal and response virtual identifiers thus use the same path (in opposite directions) in this example embodiment, they can use distinct paths in other embodiments.

Each IFM may maintain a virtual identifier table for each of its ports that maps virtual identifiers to its destinations ports. When a frame is received at a source port, the IFM then uses the virtual identifier for that frame and the virtual identifier table for the source port to identify a destination port through which the frame is to be forwarded. Thus, in this embodiment, a virtual identifier identifies a path between devices, rather than identifying a source or a destination device. In one embodiment, a virtual identifier includes both a domain address and a virtual address. Each IFM is assigned a domain address, with the IFMs that are assigned the same domain address being in the same domain. The IFMs use the domain addresses to forward frames between domains, and the network manager may also configure the IFMs with inter-domain paths. When an IFM receives a frame whose virtual identifier has a domain address that matches its domain address, then the frame has arrived at its destination domain. The IFM then forwards the frame in accordance with the virtual address of the virtual identifier. If, however, the domain addresses do not match, then the frame has not arrived at its destination domain, and the IFM forwards the frame using an inter-domain path. The virtual identifier table for an IFM port may thus be divided in some embodiments into a domain address table and a virtual address table that respectively map domain addresses and virtual addresses to destination ports through which frames are to be forwarded.

Figure 2A:
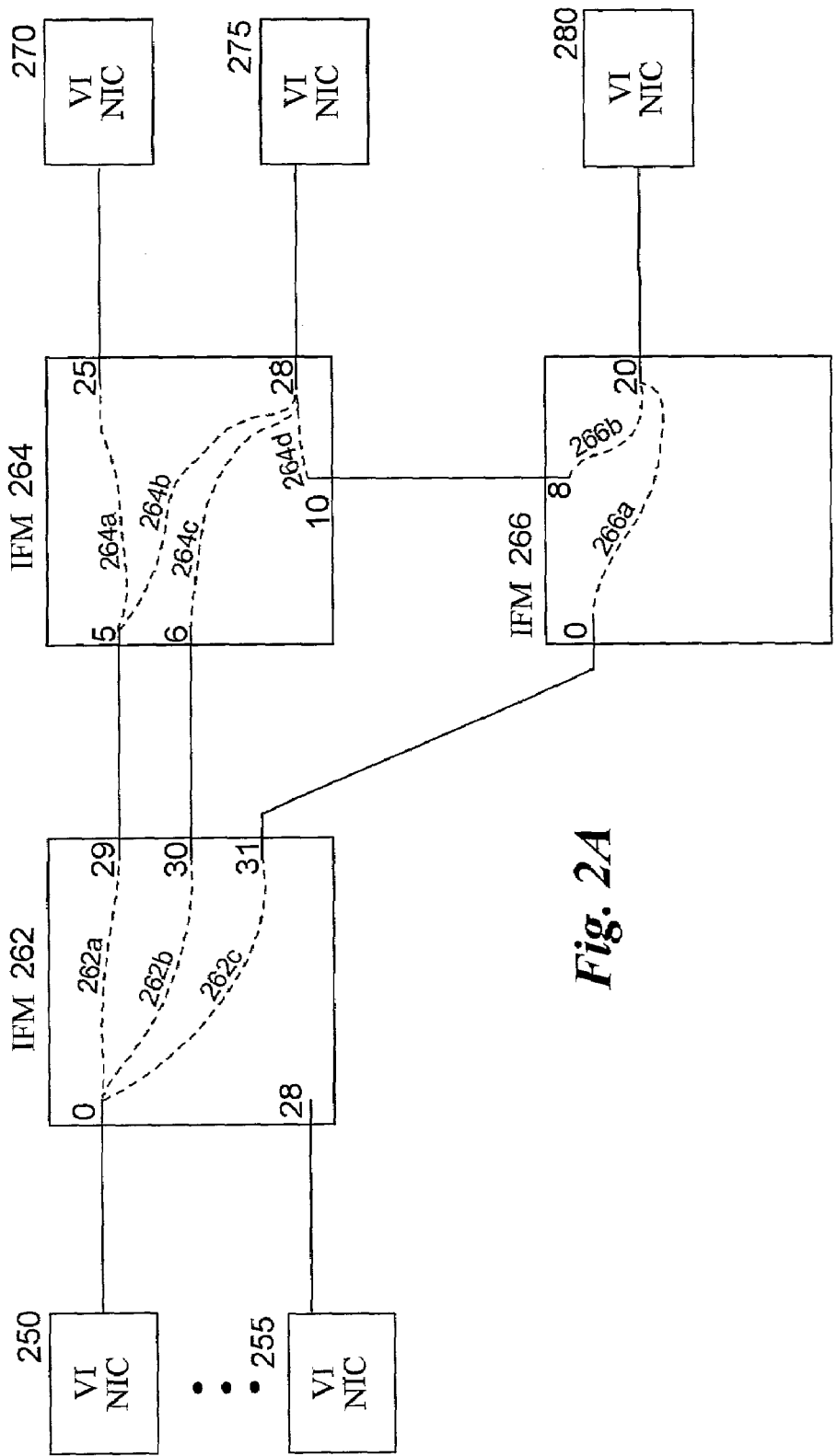

As an illustrative example of using virtual identifiers for routing data communications, FIGS. 2A–2C illustrate an example of VI NIC embodiments using virtual identifiers to inter-communicate through an example Fibre Channel Fabric network. In particular, FIG. 2A illustrates various VI NICs 250, 255, 270, 275 and 280 that are inter-communicating through a Fibre Channel fabric-based interconnect network that includes IFMs 262, 264 and 266. As discussed in greater detail below, FIG. 2B illustrates a table containing information related to each of multiple example data communications discussed below.

A first example data communication begins when VI NIC 250, which is connected to port 0 of IFM 262, initiates a data communication to VI NIC 270, which is connected to port 25 of IFM 264. This data communication is indicated to be a persistent connection, and VI NIC 250 receives a transmittal virtual identifier A (e.g., from a network manager for the network, not shown) to be used for routing communications to VI NIC 270. VI NIC 270 correspondingly receives a response virtual identifier B to be used for routing responses to VI NIC 250. Those skilled in the art will appreciate that virtual identifiers can be represented in various formats, such as 24-bit identifiers in a Fibre Channel network. As previously discussed, VI NIC 250 is also notified of the response virtual identifier B supplied to VI NIC 270 so that VI NIC 250 can recognize communications received from VI NIC 270 as being part of the persistent connection and can forward those received data communications in an appropriate manner (e.g., to an executing application (not shown) on the node to which VI NIC 250 belongs). VI NIC 270 similarly maps received data communications using virtual identifier A to an appropriate destination on the node to which VI NIC 270 belongs. The transmittal and response virtual identifiers A and B each correspond to a path through IFMs 262 and 264. In particular, data communications from VI NIC 250 using the transmittal virtual identifier A will be received at port 0 of IFM 262, and will be forwarded by that port along link 262a to output port 29 of IFM 262. That output port is statically connected to port 5 of IFM 264, which will receive the data communications using the transmittal virtual identifier A and will forward them along link 264a to output port 25 of IFM 264. VI NIC 270 will then receive the data communication. Data communications from VI NIC 270 to VI NIC 250 will return in a similar manner along that same path in an opposite direction.

As previously noted, FIG. 2B illustrates a table reflecting the example data communications between the various VI NICs, and entries 1a and 1b of the table represent the dedicated connection between VI NICs 250 and 270 that was just discussed. As is shown, in the example embodiment the determination of which of an associated pair of virtual identifiers is the transmittal virtual identifier and which is the response virtual identifier is made with respect to the source VI NIC using the virtual identifiers to route a data communication. Thus, VI NIC 250 uses virtual identifier A as its transmittal virtual identifier and virtual identifier B as its response virtual identifier for the dedicated connection, while VI NIC 270 uses them in an opposite matter.

After the connection between VI NICs 250 and 270 has ended, VI NIC 250 initiates a connectionless data communication to VI NIC 275, which is connected to port 28 of IFM 264. Transmittal and response virtual identifiers C and D are provided to VI NIC 250 to be used for the data communication, with the transmittal virtual identifier C corresponding to a path including link 262a from port 0 of IFM 262 to port 29 of IFM 262, followed by link 264b from port 5 of IFM 264 to port 28 of IFM 264. In the illustrated embodiment, a response virtual identifier is provided to VI NIC 250 so that response information can be provided to VI NIC 250 if necessary, such as an error message indicating that data communication was not successful. At least the transmittal virtual identifier C will also be provided to VI NIC 275 so that received data communications can be recognized and forwarded in an appropriate manner. Entry 2 of the table illustrated in FIG. 2B corresponds to this data communication.

Immediately after the data communication to VI NIC 275, VI NIC 250 initiates a data communication to VI NIC 280, which is connected to port 20 of IFM 266. VI NIC 250 receives transmittal and response virtual identifiers E and F, with the path corresponding to transmittal identifier E including link 262c from port 0 to port 31 of IFM 262 and link 266a from port 0 to port 20 of IFM 266. Port 31 of IFM 262 is statically connected to port 0 of IFM 266. Entry 3 of the table illustrated in FIG. 2B corresponds to this data communication.

Note that after this data communication, port 0 of IFM 262 is configured (barring any reconfigurations) to route data communications from VI NIC 250 that use any one of the transmittal virtual identifiers A, C or E. While port 0 forwards data communications in the illustrated embodiments to various specified ports, other configurations could instead be used in other embodiments (or as alternatives to the specified paths, such as if problems with the specified paths occur). For example, port 0 could be configured to forward data communications for all the transmittal virtual identifiers to port 29 of IFM 262, and port 5 of IFM 264 could then be configured to forward data communications using transmittal virtual identifier E to port 10 of IFM 264 for communication to port 8 of IFM 266, which could then forward that received data communication to port 20 of IFM 266 for delivery to VI NIC 280. Similarly, port 0 could instead be configured to forward data communications for the transmittal virtual identifier C along link 262b to port 30 of IFM 262, and port 6 of IFM 264 could then forward the data communications to port 28 of IFM 264 along link 264c.

VI NIC 275 next initiates a data communication that is determined (e.g., by the network manager) should be routed to VI NICs 250 and 280. VI NIC 275 then receives a transmittal virtual identifier E and response virtual identifier G to be used for the data communication. When used by VI NIC 275, transmittal virtual identifier E corresponds to two paths through the network that lead to the two destination VI NICs. In particular, a path to VI NIC 250 includes link 264*c* from port 28 to port 6 of IFM 264 and link 262*b* from port 30 to port 0 of IFM 262. Port 6 of IFM 264 is statically connected to port 30 of IFM 262. The path from VI NIC 275 to destination VI NIC 280 includes links 264*b* from port 28 to port 10 of IFM 264 and link 266*b* from port 8 to port 20 of IFM 266. Port 10 of IFM 264 is statically connected to port 8 of IFM 266. Entry 4 of the table illustrated in FIG. 2B corresponds to this data communication.

In this most recent data communication example, port 28 of IFM 264 is configured such that when it receives a data communication using the transmittal virtual identifier E from VI NIC 275, the port divides the received data communication and sends a copy of the data communication to both port 6 and port 10 of IFM 264 for forwarding. Thus, this single transmittal virtual identifier is used to send a data communication to multiple destinations. Note, however, that it is not necessary that the port that initially receives the data communication (i.e., port 28 of IFM 264 in this example) be the one to divide a received data communication into multiple copies. For example, port 28 of IFM 264 could instead be configured to send only a single copy of the received data communication to port 6 of IFM 264, and port 30 of IFM 262 could instead be configured to send a copy of the received data communication to both ports 0 and 31 of IFM 262. Alternatively, port 28 of IFM 264 could be configured as initially discussed, but port 30 of IFM 262 could instead be configured to send copies of the received data communication to both ports 0 and 28 of IFM 262 if VI NIC 255 is determined to be another destination for the data communication.

Note also that the transmittal virtual identifier E used by VI NIC 275 in this most recent example data communication is identical to the transmittal virtual identifier E previously used by VI NIC 250 for data communication to VI NIC 280. In this illustrated embodiment, the paths corresponding to virtual identifiers are relative to the source from which those data communications originate, and thus different VI NICs can use the same virtual identifier to correspond to different paths and to different destinations. This is possible since each of the ports of each of the IFMs can be separately configured in the illustrated embodiment to handle data communications having specified virtual identifiers. Thus, for example, port 28 of IFM 264 is configured to forward data communications received from VI NIC 275 that use the transmittal virtual identifier E to ports 6 and 10 of IFM 264, while port 0 of IFM 262 is configured to forward a data communication received from VI NIC 250 that uses the transmittal virtual identifier E to port 31 of IFM 262.

FIG. 2C illustrates an example of a virtual identifier translation table used by VI NIC 250 when transmitting and receiving the example data communications. In the illustrated example, multiple applications programs are executing on a node to which VI NIC 250 corresponds and are using TCP/IP socket communication mechanisms to specify their data communications. In addition, in the illustrated example the VI NIC can identify various QOS communication parameters to be associated with each data communication. Each entry in the virtual identifier translation table corresponds to a distinct data communication of which the VI NIC has been notified. For example, entry 1 in the table corresponds to the previously discussed dedicated connection between VI NICs 250 and 270.

In this example, the data communication for entry 1 was initiated by an executing source application opening a TCP/IP socket having a destination of IP address "128.32.78.105" and a destination node software port of 3523, with this TCP/IP socket information stored in column 221 of the table. In addition, information is stored in column 223 of the virtual identifier translation table to enable received data communications to be forwarded to the appropriate executing application, which in this case is the source application. In this example, the VI NIC 250 determines (e.g., based on the received indication of the data communication) that the source application has source socket information that includes an IP address of "153.83.28.125" and a software port number of 3025 for the node on which the application is executing.

In this example, the VI NIC 250 also determines appropriate transmittal and response virtual identifiers for the data communication, as well as various QOS parameters related to the data communication (e.g., by registering the data communication with a network manager that supplies the virtual identifiers and QOS parameters). The transmittal and response virtual identifiers are stored in columns 225 and 227 of the table respectively, and the QOS communication parameters are stored in one or more columns 229. In this example embodiment, the identified QOS communication parameters include a specified COS and an authorized minimum and maximum transmission priority. As shown, this data communication is assigned a COS of "1" (e.g., which may correspond to dedicated connections) and a transmission priority range between 0 and 127 (e.g., the full range for a 7-bit priority value).

In a similar manner, entries 2, 3 and 4 of the virtual identifier translation table correspond to example communications 2, 3 and 4 listed in the table illustrated in FIG. 2B. As is shown, a single executing application may have multiple virtual identifier pairs shown in different entries of the virtual identifier translation table, such as entries 1 and 2 which share the same TCP/IP socket routing information in column 223. Conversely, even when multiple indicated data communications specify the same destination IP address, the data communications may be routed to different destination nodes, such as is shown with entries 1 and 3 of the table. More generally, in other embodiments the destination for an indicated data communication may be selected on the basis of information other than a specified TCP/IP destination socket, and if so the virtual identifier translation table would instead store in column 221 at least the minimal set of information needed to distinguish between the different data communications of which it is notified. For example, if indicated data communications have destinations selected based solely on a type of the executing application or on a type of the data being transmitted, an indication of that type of information could be stored in column 221 instead of the destination TCP/IP socket information. In addition, in some embodiments an application could have multiple distinct virtual identifiers that can be used to communicate with a single destination, such as if the virtual identifiers are assigned to different paths through the network or have differing associated QOS parameters. Similarly, different applications on a source node could in various embodiments use the same or different virtual identifiers to communicate with a single destination, regardless of whether different virtual identifiers were assigned to different paths through the network.

Entry 4 in the virtual identifier translation table reflects a data communication initiated by a source other than VI NIC 250, in this case being VI NIC 275. In that situation, VI NIC 250 will store data in column 223 of the virtual identifier translation table indicating how to forward those received data communications (such as based on destination TCP/IP socket information included in a first of those received data communications), but need not store identification information for VI NIC 275 in column 221 since the example data communication is a 1-way connectionless transmittal. In addition, in the illustrated embodiment the transmittal virtual identifier E used by VI NIC 275 to route the data communication to VI NIC 250 is shown in column 227 of entry 4 of the virtual identifier translation table as being the response virtual identifier for the data communication, since from the perspective of VI NIC 250 the virtual identifier is used for received data communications. Those skilled in the art will appreciate that in other embodiments other types of information could be stored in the virtual identifier translation table (e.g., connection preemption information) or existing types of information may not be present, and that the existing information could also be stored in other ways (e.g., by having separate virtual identifier translation tables for outgoing and incoming data communications, or by having a separate table for virtual identifier information and for QOS parameters).

Figure 3:
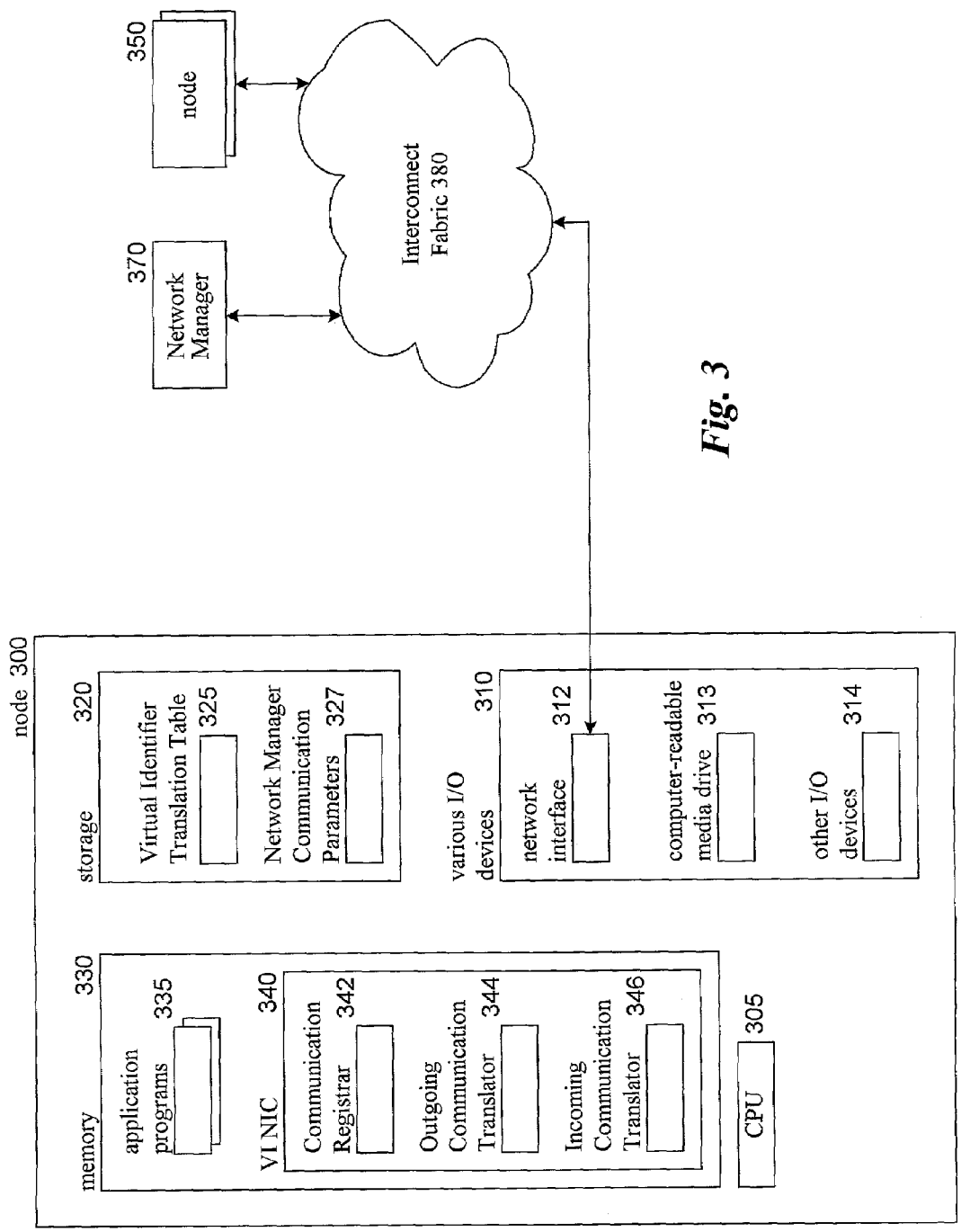
FIG. 3 is a block diagram illustrating a node using an embodiment of the disclosed Virtual Identifier NIC to communicate with other nodes.

FIG. 3 illustrates a node computing device 300 suitable for executing an embodiment of a VI NIC that uses virtual identifiers when transmitting and receiving data communications, as well as illustrating various other node computing devices 350 with which node 300 can inter-communicate. The nodes are inter-connected through an Interconnect Fabric 380, and a Network Manager 370 is similarly connected to the Fabric.

The node computing device 300 includes a CPU 305, various I/O devices 310, storage 320 and memory 330. The I/O devices include at least one network interface 312 which connects the node to the Interconnect Fabric, as well as computer-readable media drive 313 and various other I/O devices 314. An embodiment of a VI NIC 340 is executing in memory, and it includes a Communication Registrar component 342, an Outgoing Communication Translator component 344 and an Incoming Communication Translator component 346. While the VI NIC in the illustrated embodiment includes multiple components executing in the main memory of the node, those skilled in the art will appreciate that other arrangements are possible in other embodiments, such as implementing a VI NIC together with a network interface on a single plug-in card that attaches to a bus for the node and that may include stand-alone memory and/or processing capabilities including hard-wired logic. In some embodiments, some or all of the VI NIC components may be a device driver for the node, such as for one of the network interfaces. In addition, those skilled in the art will appreciate that in other embodiments multiple VI NICs may be executing on a single node, such as to correspond to multiple network interfaces.

In the illustrated embodiment, multiple application programs 335 are also executing in memory, and can initiate or receive data communications with application programs executing on remote nodes. When one of the application programs initiates a data communication, the VI NIC is notified of the data communication, and the Communication Registrar component then registers that the communication with the Network Manager. In response, the Communication Registrar component receives a pair of transmittal and response virtual identifiers from the Network Manager as well as various QOS communication parameters for that data communication. In order to register a data communication with the Network Manager, the Communication Registrar component retrieves and uses network manager communication parameters 327 from storage that may include a transmittal virtual identifier to route the communication to the Network Manager and a response virtual identifier to recognize the information received back from the Network Manager. The network manager communication parameters can be obtained in various ways, such as directly from the Network Manager during initialization of the node and/or the network. After the Communication Registrar component receives the virtual identifier pair and other information for the registered data communication, it stores that information in the virtual identifier translation table 325 on storage for use when transmitting and receiving data communications.

When an application program is ready to perform a data communication, the Outgoing Communication Translator receives notification of the communication to be performed. If the initial notification used by the Communication Registrar to initiate registration was itself an indication to perform a communication, the Outgoing Communication Translator component can receive this notification from the Communication Registrar component after the registration has been completed. The Outgoing Communication Translator component analyzes the information provided about the data communication to be performed, maps that data communication to a corresponding entry in the virtual identifier translation table in order to determine the appropriate transmission information to be used for the data communication, and then transmits the data using the information retrieved from the virtual identifier translation table. Those skilled in the art will appreciate that the Outgoing Communication Translator may also need to perform additional formatting of the data to be transmitted, such as to generate one or more appropriate Fibre Channel frames for the illustrated example in which the network is a Fibre Channel Interconnect Fabric. In addition, in some embodiments the Outgoing Communication Translator component may verify the accuracy of the communication indicated by the application program before transmitting the communication, such as to ensure that a priority requested by the application program to be used for the transmission falls within the transmission priority bounds assigned to the data communication.

In a similar manner, the Incoming Communication Translator component is notified when the network interface receives incoming data communications that are routed using virtual identifiers. Upon receiving notification of such a received data communication, the Incoming Communication Translator determines the transmittal virtual identifier used to route the data communication to the node and uses the virtual identifier translation table to map that virtual identifier to one or more of the application programs executing in memory. Upon determining one or more appropriate application programs to receive the data communication, the VI NIC then forwards the received data communication to those application programs.

In the case of a received data communication that is a response to a data communication initiated at node 300, the necessary information for forwarding the received data communication will already be present in the virtual identifier translation table based on the Communication Registrar component having previously registered that data communication. In the case of data communications that are initiated at another node, however, the necessary information to forward the received data communication to an executing application program may or may not already be present in the virtual identifier translation table. For example, in some embodiments the Network Manager will have supplied the appropriate information to the VI NIC (e.g., to the Communication Registrar component) before the data communication is received, and the information could be stored in the virtual identifier translation table at that time. In other embodiments, the appropriate information for forwarding the received data communication may be added to the virtual identifier translation table at the time that the data communication is received, such as by the Incoming Communication Translator component analyzing information included in the data communication to identify the needed information.

In some embodiments, the Incoming Communication Translator component will also process received data communications in various ways before forwarding them to one or more appropriate application programs. For example, in some embodiments application programs may expect received data communications to include information specific to the receiving application, such as one or more network addresses associated with that application. If the VI NIC has access to the appropriate information for the application, such as from the virtual identifier translation table, the Incoming Communication Translator component can add that information to a received data communication when it is missing or incorrect (or for every received data communication). For example, when the executing applications are using TCP/IP socket mechanisms or more generally receiving data in the form of IP packets, the Incoming Communication Translator component could ensure that the data communication forwarded to an executing application includes the appropriate IP address and/or port number associated with that application. In addition, those skilled in the art will appreciate that the Incoming Communication Translator component may need to reformat received information into an appropriate form for the application receiving the information, such as by converting a received Fibre Channel frame into one or more IP packets.

Those skilled in the art will also appreciate that node computing device 300 is merely illustrative and is not intended to limit the scope of the present invention. Computing device 300 may be connected to other devices that are not illustrated, including one or more networks such as the Internet or via the World Wide Web. In addition, computing device 300 could be one part of an EDN, such as by being a device at any one or more of the EDN sub-networks. Various available products could be used as network interfaces and/or to implement some or all of the functionality of a VI NIC, including products from Banderacom, Inc. and Mellanox Technologies. Those skilled in the art will also appreciate that the functionality provided by the illustrated VI NIC components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory while being used, these items or portions of them can be transferred between memory and other storage devices for purposes of memory management and data integrity. Similarly, items illustrated as being present on storage while being used can instead be present in memory and transferred between storage and memory. Some or all of the components and data structures may also be stored (e.g., as instructions or structured data) on a computer-readable medium, such as a hard disk, a memory, a network, or a portable article to be read by an appropriate drive. The components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 4:
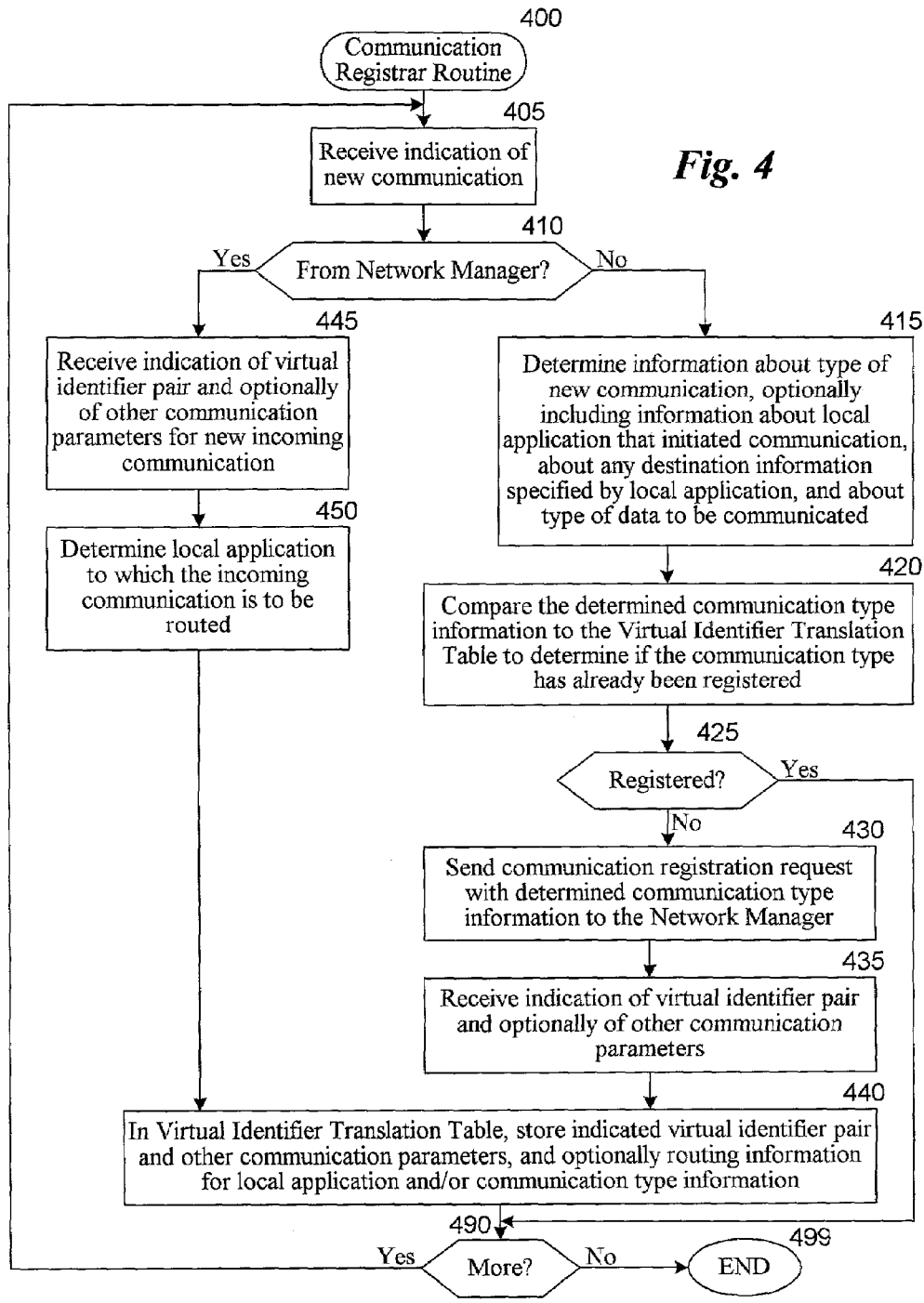
FIG. 4 is a flow diagram of an embodiment of the Communication Registrar routine.

FIG. 4 is a flow diagram of an embodiment of the Communication Registrar routine 400. The routine receives indications of new data communications from either a local executing application or from a remote network manager, registers new data communications indicated by local applications with the network manager and receives appropriate virtual identifiers and other information to be used for the data communication in response, and stores any received information from the network manager in the virtual identifier translation table for use in processing incoming and outgoing data communications.

The routine begins at step 405 where an indication is received of a new communication. The routine continues to step 410 where it determines if the indication was received from the network manager, such as for a data communication initiated by a remote source. If the data communication is instead from a local executing application, the routine continues to step 415 to determine whatever information about the data communication that will be used to register the data communication with the network manager so that the network manager can determine appropriate destinations for the data communication. In the illustrated embodiment, information is determined about the type of data to be communicated, about the application that initiated the communication, and about any destination information specified by the local application.

The routine then continues to step 420 where it is determined if the indicated data communication needs to be registered with the network manager. For example, if the indicated data communication is a transmittal of data for an existing persistent connection, the connection will already have been registered and registration is not necessary. In other situations, even a new data communication may not need to be registered, such as a data communication that will be communicated in the same manner and to the same destination as a previous communication, as the information provided for the previous data communication may be able to be reused. In particular, the routine compares whenever information is used to uniquely identify the destination and/or the manner of transmission for the indicated new data communication, and determines if there is a match for that information already present in the virtual identifier translation table. Those skilled in the art will appreciate that in other embodiments the routine may not make this determination and instead send registration information to the network manager for each new indicated data communication, such as if the network manager provides functionality to determine whether to reuse previously provided transmission information or to instead send new transmission information.

If it is determined in step 425 that the new indicated data communication needs to be registered, the routine continues to step 430 to send a communication registration notification to the network manager that includes the determined communication type information. The routine then continues to step 435 to receive from the network manager an indication of a pair of transmittal and response virtual identifiers for the data communication, as well as optionally receiving other communication parameters to be used as part of the communication. The routine then continues to step 440 to store the received information in the virtual identifier translation table, as well as to optionally store routing information with which to route a response data communication back to the application that initiated this new data communication. After step 440, or if it was instead determined in step 425 that the new indicated data communication did not need to be registered, the routine continues to step 490 to determine if there are more indications to receive. If so, the routine returns to step 405, and if not the routine continues to step 499 and ends.

If it was instead determined in step 410 that the received indication of the new data communication is from the network manager, the routine continues to step 445 to receive transmission information related to that new data communication. In particular, in the illustrated embodiment the network manager will supply information about a pair of transmittal and response virtual identifiers to be used to route the indicated data communication to the node and to be used to route any responses back to the originating node, and will optionally also supply other communication parameters that will be used as part of the data communications. The routine then continues to step 450 to determine a local application to which the incoming communication is to be forwarded, such as based on information supplied by the network manager (e.g., TCP/IP socket information provided by the source application initiating the new data communication). After step 450, the routine continues to step 440 to store the received information from the network manager and the routing information for the local application in the virtual identifier translation table.

Figure 5:
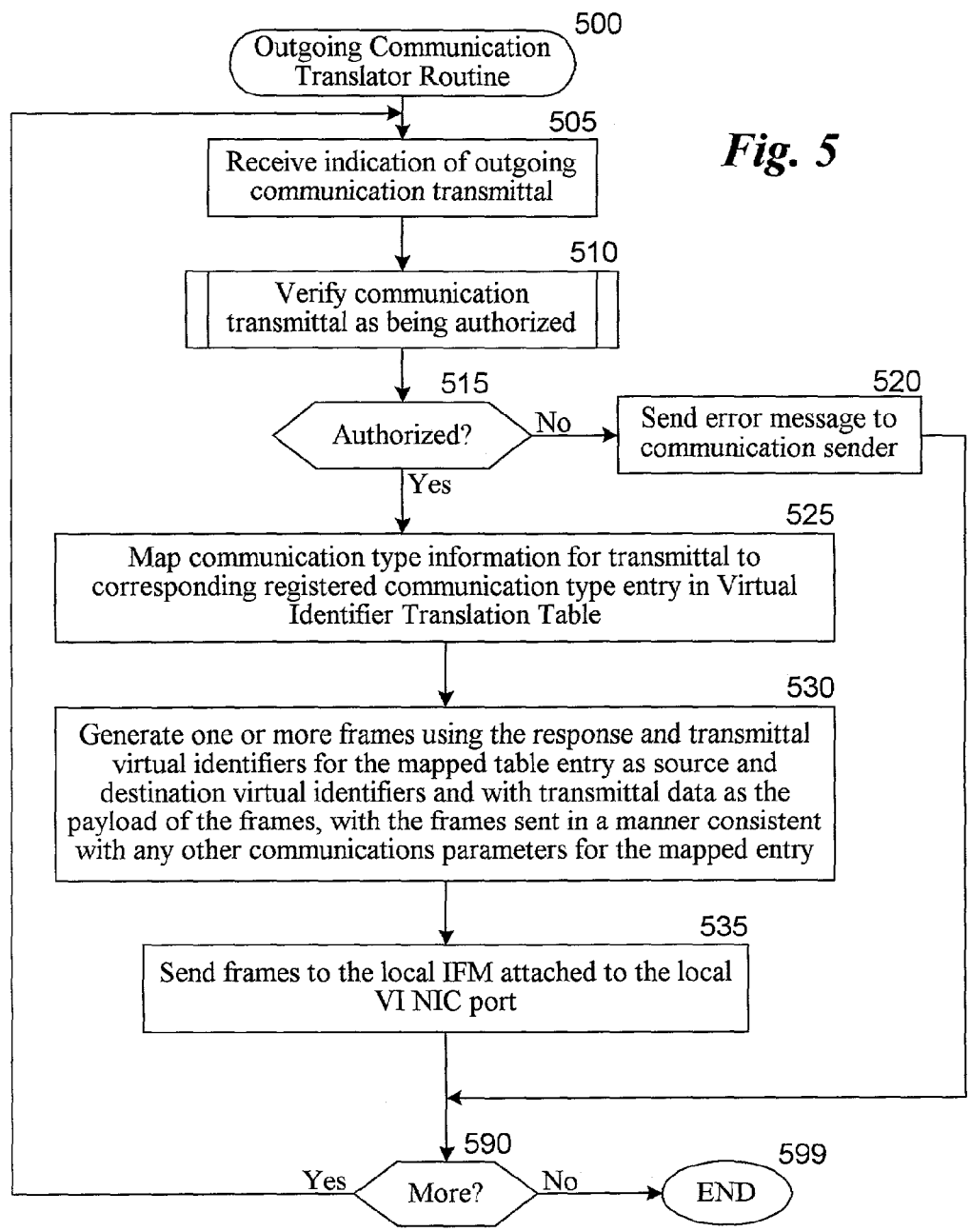
FIG. 5 is a flow diagram of an embodiment of the Outgoing Communication Translator routine.

FIG. 5 is a flow diagram of an embodiment of the Outgoing Communication Translator routine 500. The routine receives indications of outgoing data communication, determines an appropriate transmittal virtual identifier to be used for routing the data communication as well as optionally determining other communication parameters to be used, and transmits the data communication using the determined transmittal virtual identifier and other determined communication parameters.

The routine begins at step 505 where an indication is received of an outgoing communication. The routine continues to step 510 to execute a subroutine to verify that the communication transmittal is authorized. In other embodiments, this verification step may not be performed. The routine next continues to step 515 to determine if the communication transmittal was determined to be authorized, and if not continues to step 520 to send an error message to the application that initiated the data communication. If it was instead determined in step 515 that the communication transmittal was authorized or if no authorization verification was performed, the routine continues to step 525 to map communication type information for the indicated data communication to a corresponding entry in the virtual identifier translation table for a registered data communication. For example, in some embodiments the communication type information to be used for the mapping may be destination TCP/IP socket information provided by the application that initiated the data communication.

The routine then continues to step 530 to format the outgoing data communication in a manner appropriate for the network type being used and to use the transmittal virtual identifier and any other communication parameters indicated in the virtual identifier translation table entry. In the illustrated embodiment, one or more Fibre Channel frames are generated by storing response and transmittal virtual identifiers in the Fibre Channel frame locations for source and destination identifiers and by storing the data to be communicated as the payload of the frames, and the header information for the frames is specified to correspond to a Fibre Channel COS and a priority that is consistent with the information in the virtual identifier translation table entry. The routine then continues to step 535 to send the generated frames to the local IFM attached to the hardware output port to which the VI NIC corresponds. After step 535 or step 520, the routine continues to step 590 to determine if there are more indications to be received. If so, the routine returns to step 505, and if not the routine continues to step 599 and ends.

Figure 6:
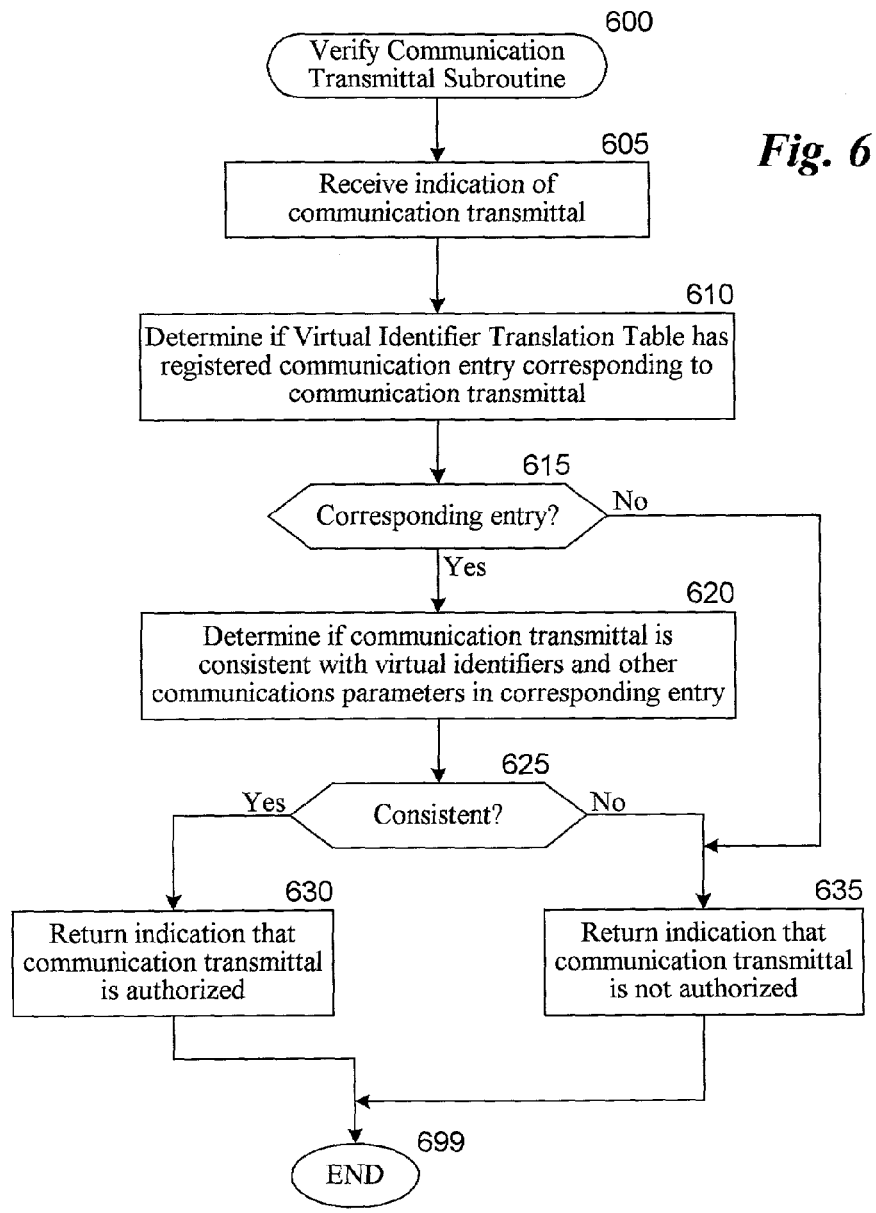
FIG. 6 is a flow diagram of an embodiment of the Verify Communication Transmittal subroutine.

FIG. 6 is a flow diagram of an embodiment of the Verify Communication Transmittal subroutine 600. The subroutine receives an indication of a data communication and determines if the data communication is consistent with corresponding information that was stored in the virtual identifier translation table based on a prior registration for the data communication. The subroutine begins at step 605 where an indication is received of a communication to be transmitted. The subroutine continues to step 610 to determine if the virtual identifier translation table has an entry corresponding to the communication. In step 615, if there was not a corresponding entry, the subroutine to step 635 to return an indication that the data communication is not authorized. If it is instead determined in step 615 that a corresponding entry was present, the subroutine continues to step 620 to determine if the manner of the transmittal of the data communication is consistent with the transmission information in the corresponding entry, including use of virtual identifiers and other communication parameters. In some embodiments, it is verified that the data communication includes a pair of transmittal and response virtual identifiers that were provided together by the network manager and that the COS and priority for the data communication corresponds to the specified COS and priority limits provided by the network manager. If in step 625 it is determined that the data communication transmittal was not consistent, the subroutine continues to step 635. If the data communication is instead determined to be consistent, the subroutine continues to step 630 to return an indication that the data communication is authorized. After step 630 or 635, the subroutine continues to step 699 and ends.

Figure 7:
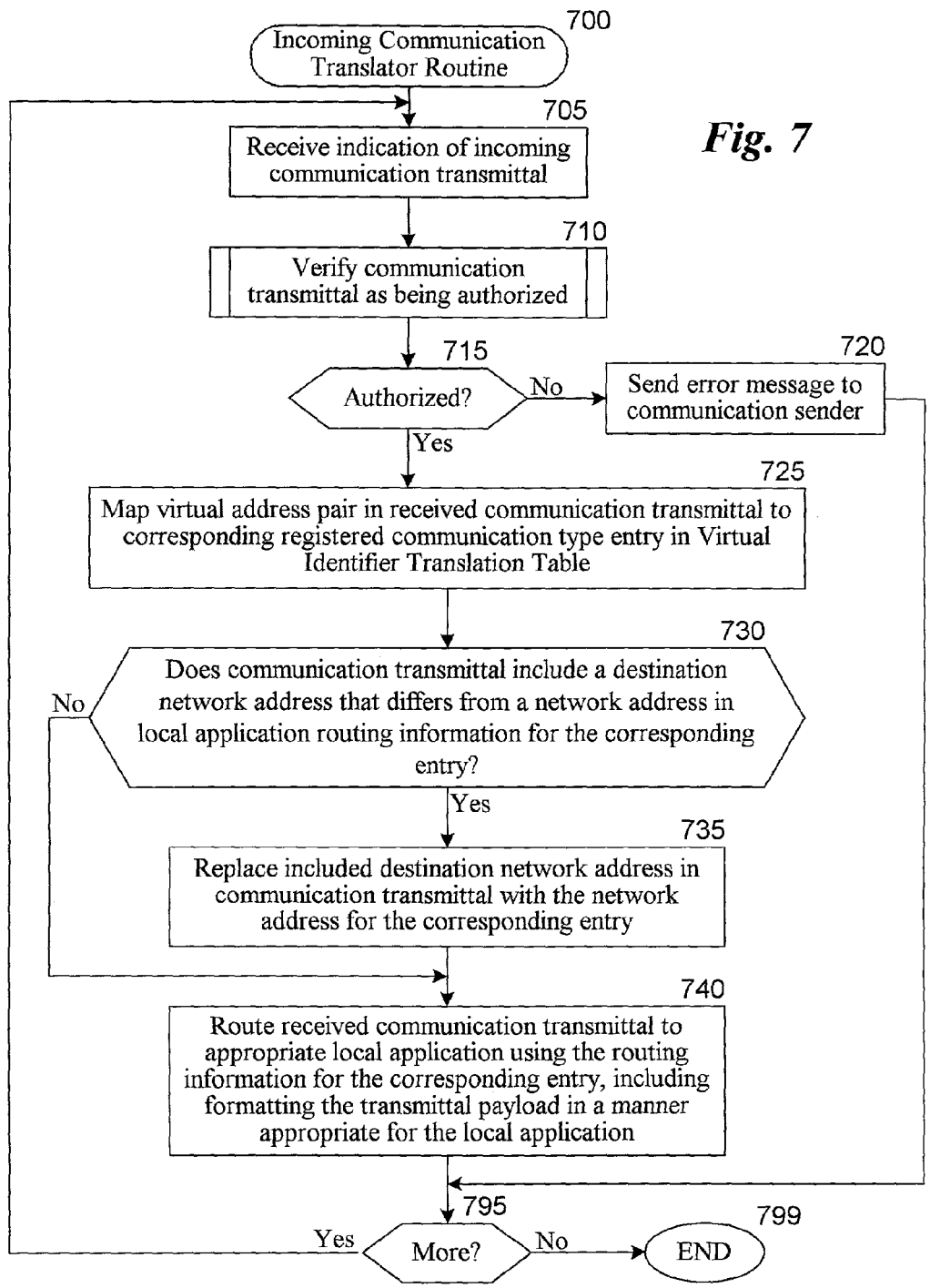
FIG. 7 is a flow diagram of an embodiment of the Incoming Communication Translator routine.

FIG. 7 is a flow diagram of an embodiment of the Incoming Communication Translator routine 700. The routine receives indications of incoming data communications and forwards those data communication to appropriate local destinations such as an executing application. In some situations, the routine can also modify the incoming data communication in various ways, such as to replace missing or incorrect destination application-specific information with appropriate information.

The routine begins at step 705 where an indication is received of an incoming data communication. The routine continues to step 710 to execute a subroutine to determine whether the data communication is authorized. Those skilled in the art will appreciate that in some embodiments such data communication verification may not be performed. In step 715, the routine then determines if the data communication is authorized, and if not continues to step 720 to send an error message to the sender of the communication. If it is instead determined in step 715 that the data communication is authorized or if the verification is not performed, the routine continues to step 725 to map the transmittal virtual identifier (or in some embodiments the pair of the transmittal and response virtual identifiers) used to route the data communication to a corresponding entry in the virtual identifier translation table.

In step 730, the routine then determines if the data communication includes information specific to the destination application that is incorrect or is missing, such as a network address. If so and if the correct information is accessible, such as by being stored in the virtual identifier translation table, the routine then continues to step 735 to replace the included incorrect information with the correct information. Those skilled in the art will appreciate that in other embodiments, if correct destination application-specific information is accessible it could always be used to replace information sent in a received data communication without checking if the included information is missing or incorrect. After step 735, or if it was instead determined that in step 730 that incorrect information was not included or that correct information to be used as a replacement was not accessible, the routine continues to step 740 to forward the received data communication to the appropriate local destination by using the routing information from the corresponding entry in the virtual identifier translation table. In addition, the routine may format the data communication in a manner appropriate for the local destination, such as by converting the received data communication into IP packet format. The routine then continues to step 795 to determine if there are more indications to be received. If so, the routine returns to step 705, and if not the routine continues to step 799 and ends.

Intermediate Network Routing Device Configuration

As noted above, as part of registering a data communication from a source node to one or more destination nodes, the network manager configures one or more intermediate network routing devices along a path between the source node and the destination nodes in such a manner that the data communication will reach the appropriate destinations. In particular, in some embodiments the network manager receives registration requests from source nodes to send data to destination nodes, configures the routing devices of the network to establish a path from each source node to its destination node, and provides a virtual identifier to each source node. As noted above, in some embodiments the virtual identifier may be a combination of a domain address and a virtual address, while in other embodiments the virtual identifier may consist only of a virtual address that identifies a path from the source node to the destination node.

When the source node sends the data to its destination node, it provides the data along with the virtual identifier to a routing device of the network. Upon receiving the data and the virtual identifier, a source-side port of each routing device in the path uses the virtual identifier to identify a destination-side port through which the data and the virtual identifier are to be transmitted. The network manager configures the routing devices by setting the mappings from a source-side port to a destination-side port for each routing device in the path. The routing devices receive data via source-side ports and transmits data via destination-side ports.

In one embodiment, the network manager may be centralized or distributed. A centralized network manager may reside at one node connected to the interconnect fabric. The centralized network manager may provide configuration information to the routing devices using in-band communications or out-of-band communications. In-band communications refers to the use of the communications links connecting the ports of the routing devices. Out-of-band communications refers to the use of communications links used specifically to connect the routing devices to the network manager. A centralized network manager may alternatively reside within a routing device. Each routing device may have the capabilities to be the network manager. Upon initialization, the routing devices may coordinate to select which of the routing devices is to function as the network manager. A distributed network manager, in contrast, may have its functions performed at various manager devices connected directly to the routing devices. The network manager at each manager device can control the routing device(s) to which it is directly connected. In addition, the network manager at each manager device can communicate with the network managers at other manager devices via in-band or out-of-band communications to coordinate control of the routing devices. In one embodiment, the distributed network manager can have different functions performed at various manager devices.

In one embodiment, the network manager identifies paths through the network from source nodes to destination nodes. The paths may be identified initially when the network manager starts up, when the network topology (e.g., the routing devices of the network and their interconnections) changes (e.g., as a result of a failure), or dynamically when a registration request is received from a source node. One skilled in the art will appreciate that various combinations of these techniques for identifying a path may be used. For example, the network manager may identify paths dynamically at registration, but may re-identify paths when the topology of the network changes. Regardless of which of these techniques are used, the network manager would typically need to know the topology of the network to identify the paths.

In one embodiment, the network manager dynamically discovers the topology of the network at initialization. The network manager can discover the topology in several different ways. The network manager can be provided with configuration information that identifies the routing devices of the network. The network manager can use this configuration information to send a message to each routing device asking which of its ports are connected to another device. The network manager can then send a query message via each connected port asking the connected-to device to identify itself and its port. From the responses to the query messages, the network manager can identify the connections (i.e., communications links) between the routing devices and thus the topology of the network. Alternatively, rather than sending a query message to each connected-to port, the routing devices upon initialization can request the connected-to devices to provide their identifications. The routing devices can then provide the identifications of the connected-to ports to the network manager. The configuration information along with the identifications of the connected-to ports describes the network topology.

In another embodiment, the network manager can dynamically discover the identifications of the routing devices by sending query messages through the ports of the routing device to which it is directly connected. The network manager then becomes aware of each routing device that responds to the query. The network manager then sends a query message through the ports of each responding routing device. Alternatively, the network manager can send one query message to the routing device to which it is directly connected and that routing device can forward the query message via each of its ports to the routing device to which it is directly connected. Each port upon receiving the query message may send a message to the network manager with its identification along with the identification of the port to which it is directly connected.

In one embodiment, each routing device may dynamically discover which of its ports are connected to other devices (e.g., nodes or other routing devices) at initialization. Each port of a routing device may sense a characteristic of its communications link (e.g., voltage on a receive link) or may transmit a request and receive (or not receive) a response via its communications link to identify whether a device is connected. The network manager may poll each routing device for an indication of which ports of the routing device are connected to other devices. The network manager can then send a query message to each connected-to port to identify the port to which it is connected.

In one embodiment, the network manager establishes paths through the network of routing devices by configuring the ports of the routing devices along the path. The network manager may identify a path from a source node to a destination node using conventional path identification techniques. For example, the network manager may use a shortest path algorithm to identify the path with the smallest number of communications links or may use a congestion-based algorithm that factors in actual or anticipated network traffic to identify the path. The network manager then identifies a transmittal virtual identifier for the identified path, which will be sent by the source node along with the data to be transmitted to the destination node. The network manager then configures each source-side port of each routing device along the path to forward frames sent with the identified virtual identifier to the destination-side port of the routing device that is connected to the next communications link in the path. The configuration information may be stored in a label table (described below) for the port that maps virtual identifiers to destination-side ports. When a source-side port receives a frame with the identified virtual identifier, it then forwards the frame through the destination-side port in accordance with the configuration information.

In one embodiment, the network manager identifies a virtual identifier that is not currently in use by any source-side port along the path. Thus, when a source-side port receives a frame addressed with the identified virtual identifier, there is no ambiguity as which port of the routing device is the destination-side port. It is possible, however, that paths from two different source nodes to the same destination node may have a common sub-path. For example, the path from one source node may be through communications links A, X, Y, and Z, and the path from the other source node may be through communications links B, X, Y, and Z. In such a case, the network manager may use the same virtual identifier for both paths and share the terminal portion of the already-configured paths.

In one embodiment, the network manager may also establish a response path between the destination node and the source node. The network manager may identify a new path or may use the same path that was identified between the source node and the destination node (but in the opposite direction). The network manager then identifies a response virtual identifier and configures the ports along the path in a manner that is analogous to the configuration of the path from the source node to the destination node. Whenever a source node sends a frame, it may also include the response virtual identifier in the frame. If so, when the destination node receives the frame it can respond to the source node by sending a frame addressed to that response virtual identifier.

In one embodiment, the network manager may need to identify and configure a new path between a source node and a destination node. For example, the network manager may determine that, because of congestion, the required quality of service cannot be provided along the existing path or may detect a failure along the existing path. The network manager may be able to use the same virtual identifier to configure the new path. If the network manager uses each virtual identifier only once, then the network manager can use the same virtual identifier for the new path. If, however, the same virtual identifier is used to identify different paths, then it may be possible that the configuration of the new path may conflict with the configuration of another path that uses the same virtual identifier. When the same virtual identifier can be used, then the network manager can change the path in a manner that is transparent to the source node. In particular, the network manager need not notify the source node of the change in the path. Also, if multiple destination nodes provide the same functionality, then the network manager may implement node load balancing by dynamically changing a path so that data will be sent to a different destination node. The use of these virtual identifiers allows the changes to be made without changing the response and transmittal virtual identifiers of the path.

In one embodiment, the network manager may reserve one or more virtual identifiers for sending frames from a device (e.g., a routing device or node) to the network manager. For example, such a frame may include a registration request from a source node. When the network manager is distributed, a routing device may detect when it has received a frame with a reserved virtual identifier and may forward the frame directly to the connected manager device for processing by the network manager. To provide flexibility, a frame directed to the network manager may include a combination of a reserved virtual identifier and another virtual identifier. When a routing device detects such a frame, it may determine whether it is configured to forward frames directed to the other virtual identifier using in-band communications. If so, the routing device forwards the frame through the destination-side port identified by the other virtual identifier. If the routing device is not configured for the other virtual identifier, then the routing device sends the frame to the network manager via out-of-band communications. For example, the routing device may send the frame to its directly connected manager device. In this way, the network manager can configure the network so that certain frames are forwarded to certain manager devices that provide certain functions or services of the network manager.

In one embodiment, a routing device is an interconnect fabric module ("IFM") with high-speed switching capabilities. An interconnect fabric module can be dynamically configured to interconnect its communications ports so that data can be transmitted through the interconnected ports. Multiple interconnect fabric modules can be connected to form an interconnect fabric through which nodes (e.g., computer systems) can be interconnected. The interconnect fabric module may allow the creation of an interconnect fabric that is especially well suited for interconnecting devices utilizing multiple information types such as might be required by the devices of an enterprise data network ("EDN").

Figure 8:
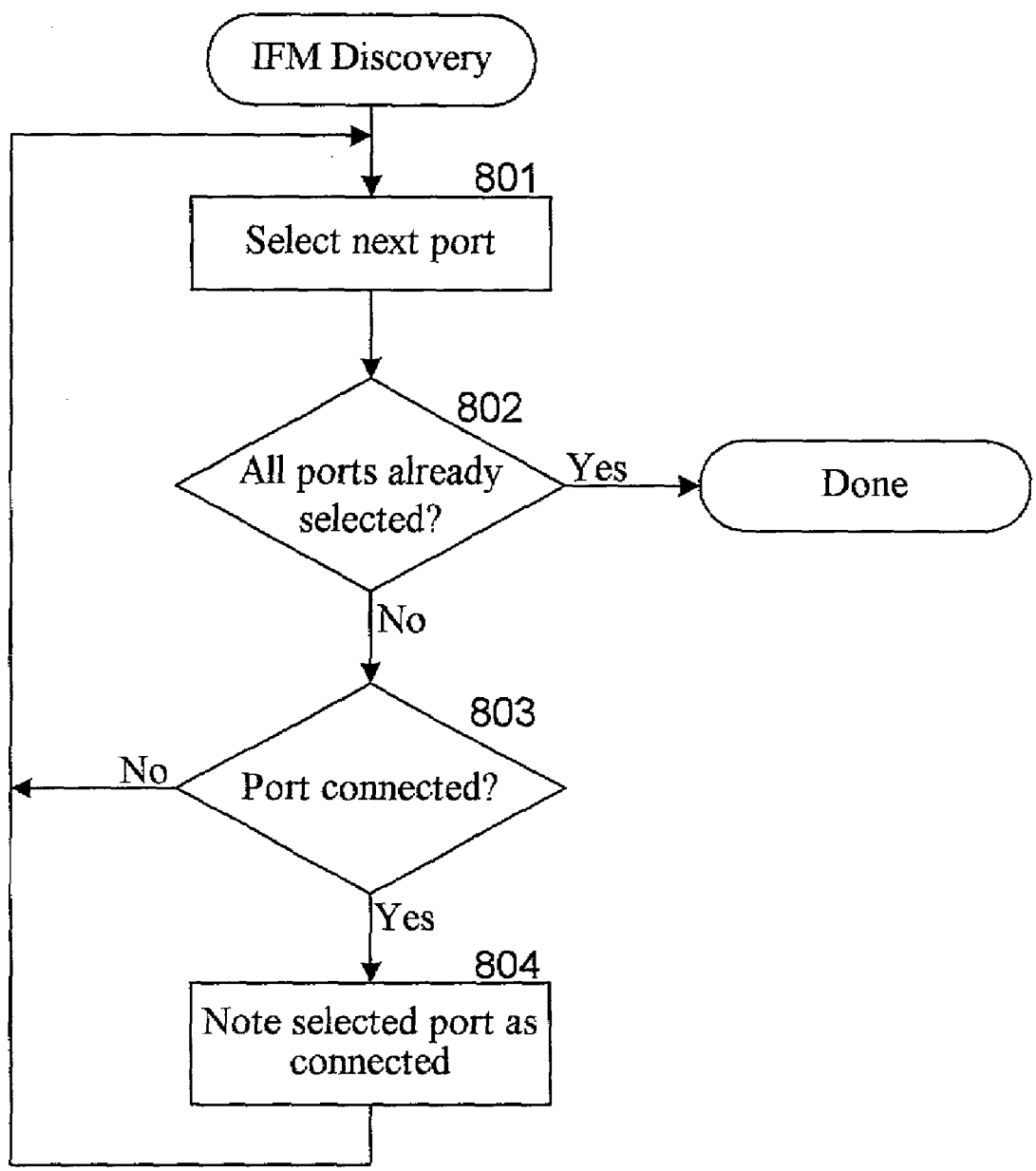
FIG. 8 is a flow diagram illustrating an embodiment of topology discovery processing of a component of the interconnect fabric module.

As described above, the network manager may dynamically discover the topology of the network using various different techniques. In the embodiment described below, each interconnect fabric module identifies which of its ports are connected to other devices. The network manager then uses this information to send a message through each port that is connected to another device to identify the connected-to device. FIG. 8 is a flow diagram illustrating an embodiment of topology discovery processing of a component of the interconnect fabric module. Each port of an interconnect fabric module identifies whether it is connected to a port of another device, such as another switch or a node. The interconnect fabric module then provides to the network manager an indication of which of its ports are connected to other ports to assist in the discovery process. In blocks 801–804, the component determines whether each port is currently connected to another port. In block 801, the component selects the next port, beginning with the first. In decision block 802, if all the ports have already been selected, then the component completes, else the component continues at block 803. In decision block 803, the component determines whether the selected port is connected to another port. This determination may be made in various ways, such as based on various voltage levels of the communications links. If there is a connection, then the component continues at block 804, else the component loops to block 801 to select the next port of the interconnect fabric module. In block 804, the component notes the selected port as connected to another port and loops to block 801 to select the next port of the interconnect fabric module.

Figure 9:
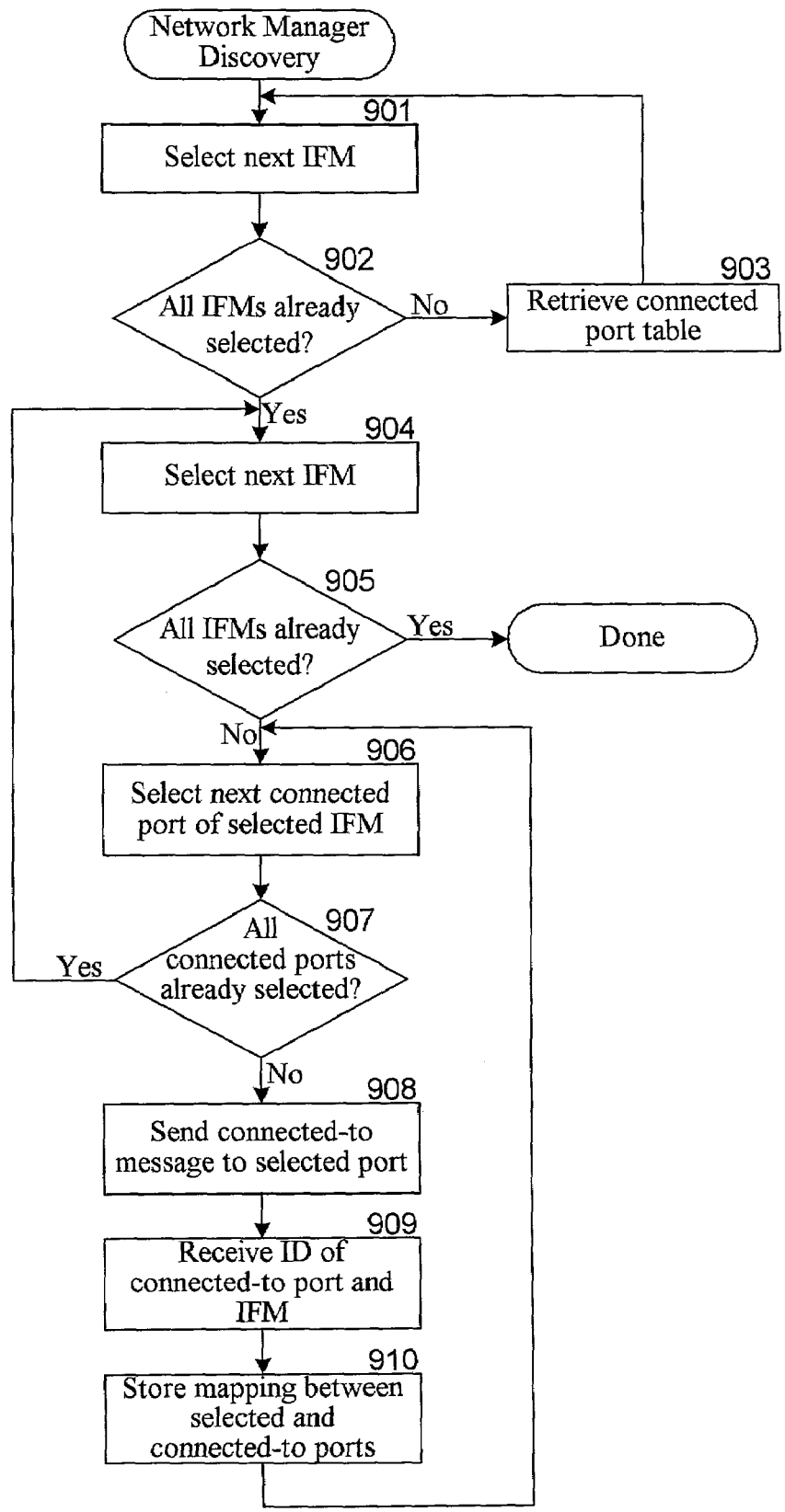
FIG. 9 is a flow diagram illustrating an embodiment of topology discovery processing of the network manager.

FIG. 9 is a flow diagram illustrating an embodiment of topology discovery processing of the network manager. The network manager first retrieves an indication of which ports of the interconnect fabric modules are connected to other devices. The network manager then sends a query message through each of the indicated ports to the connected-to port. When the connected-to port receives the query message, it responds with an identification of its interconnect fabric module and its port number. In this way, the network manager can discover the topology of the interconnect fabric. In blocks 901–903, the network manager retrieves the indications of which ports of the interconnect fabric modules are connected to other ports. In block 901, the network manager selects the next interconnect fabric module that has not yet been selected, beginning with the first. In decision block 902, if all the interconnect fabric modules have already been selected, then the network manager continues at block 904, else the network manager continues at block 903. In block 903, the network manager retrieves an indication of which ports of the selected interconnect fabric module are connected to other ports. The network manager may send the message using either in-band our out-of-band communications. The network manager then loops to block 901 to select the next interconnect fabric module. In blocks 904–910, the network manager determines the identity of each of the connected-to ports. In block 904, the network manager selects the next interconnect fabric module, beginning with the first. In decision block 904, if all the interconnect fabric modules have already been selected, then the network manager completes its discovery process, else the network manager continues at block 906. In blocks 906–910, the network manager loops sending a query message through each port of the selected interconnect fabric module that is connected to another port. In block 906, the network manager selects the next port of the selected interconnect fabric module that is connected to another port, beginning with the first. In decision block 907, if all such ports are already selected, then the network manager loops to block 904 to select the next interconnect fabric module, else the network manager continues at block 908. In block 908, the network manager sends a query message through the selected port of the selected interconnect fabric module. In block 909, the network manager receives the identification of the connected-to port of the selected port of the selected interconnect fabric module. The identification may include an indication of the interconnect fabric module and the port number of the connected-to port. In block 910, the network manager stores a mapping between the selected port of the selected interconnect fabric module and the connected-to port of the connected-to interconnect fabric module. These mappings define the topology of the network. The network manager then loops to block 906 to select the next port of the selected interconnect fabric module that is connected to another device.

The processing of the discovery of the network manager as described above assumes that the network manager initially is aware of all interconnect fabric modules of the interconnect fabric. One skilled in the art will appreciate that the network manager may become aware of additional interconnect fabric modules during the discovery process. For example, if the network manager is centralized, then it may initially send a query message through its port that is connected to the interconnect fabric. The receiving port responds with the identity of the interconnect fabric module and its port number. The network manager can then request that identified interconnect fabric module to provide a indication of which of its ports are connected to other ports. The network manager can then send a query message through each of the indicated ports to the connected-to ports. The connected-to ports then each respond with the identification of the connected-to interconnect fabric module and connected-to port. This process can be repeated by the network manager to identify all interconnect fabric modules that comprise the interconnect fabric.

Figure 10:
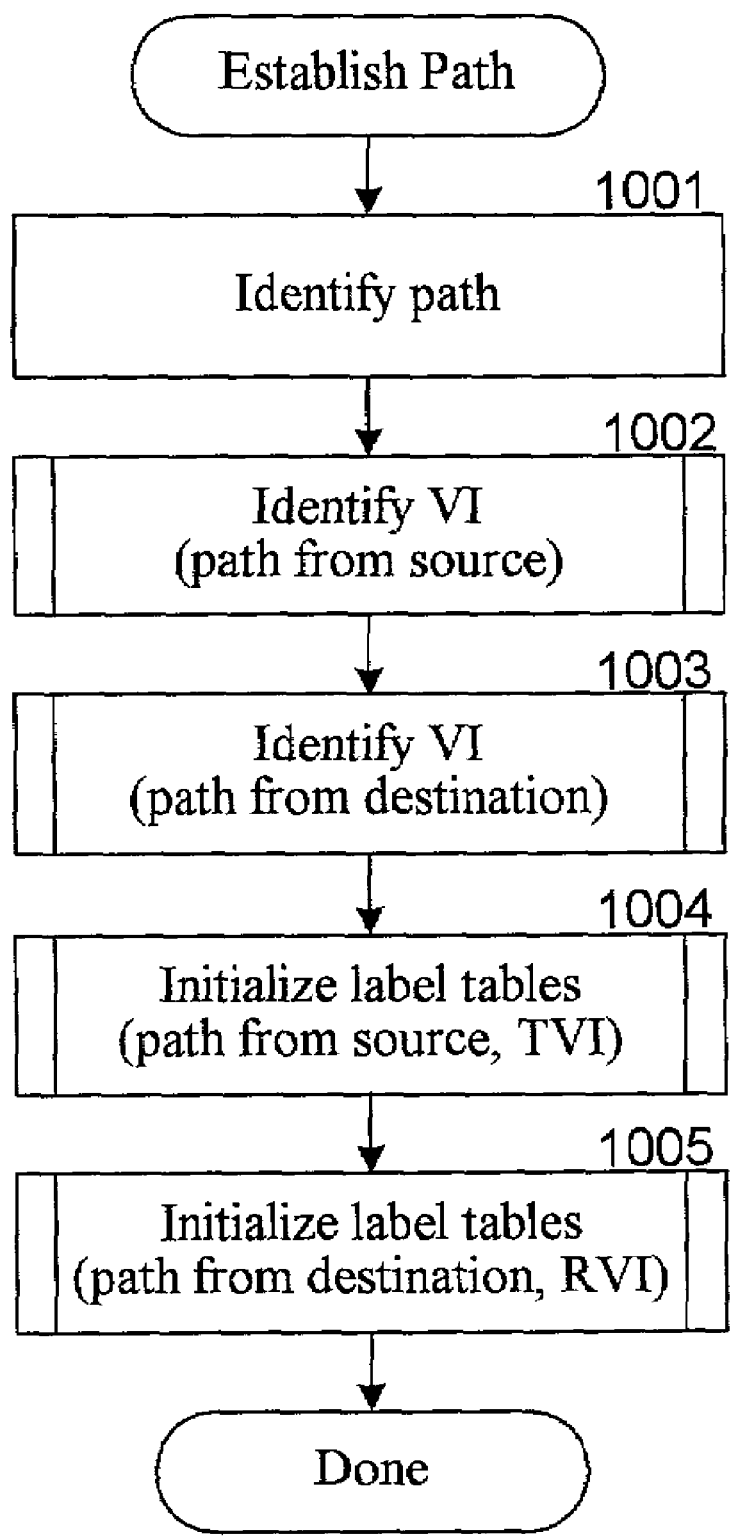
FIG. 10 is a flow diagram illustrating an embodiment of a process for establishing a path by the network manager.

Paths through the network can be determined by the network manager in a variety of ways, such as based on previously determined network topology information. FIG. 10 is a flow diagram illustrating an embodiment of a process for establishing a path by the network manager. A path is typically established when a data communication is registered with the network manager. An establish path component of the network manager may receive an indication of a source node and a destination and then identify paths of ports of interconnect fabric modules from the source node to the destination node, and optionally back from the destination node to the source node. The component then identifies virtual identifiers for the paths and initializes the label tables of the ports of the interconnect fabric modules along the identified paths. A label table of a port contains mappings from virtual identifiers to destination-side ports through which a frame sent using that virtual identifier is to be forwarded. In block 1001, the component identifies the paths. In one embodiment, the path from the source node to the destination node and the path from the destination node to the source node use the same ports of the same interconnect fabric modules. That is, the paths use the same communications links. Alternatively, the path in one direction may be different from the path in the other direction. One skilled in the art will appreciate that various well-known techniques for identifying paths can be used. In block 1002, the component invokes an identify virtual identifier component passing an indication of the path from the source node to the destination node(s), and receives in response an indication of the transmittal virtual identifier that is to be used by the source node when sending a communication to the destination node along that path. As described in greater detail below, the invoked component may select a transmittal virtual identifier that is not currently in use by any of the source-side ports of the path. A source-side port of the path is a port that receives data sent by a source node, and a destination-side port of the path is a port through which data is transmitted on its way to the destination node. In block 1003, the component again invokes an identify virtual identifier component passing an indication of a path from a destination node to the source node, and receives in response a response virtual identifier that is to be used by the destination node when sending a communication to the source node along that path. In block 1004, the component invokes a component to initialize the label tables of the IFM source-side ports along the path associated with the transmittal virtual identifier. The invoked component transmits instructions to each such source-side port indicating that the port is to update its label table to map the transmittal virtual identifier to a destination-side port of that IFM along the path. In block 1005, the component invokes a component to similarly initialize the label tables of the IFM source-side ports along the path associated with the response virtual identifier. The component then completes.

Figure 11:
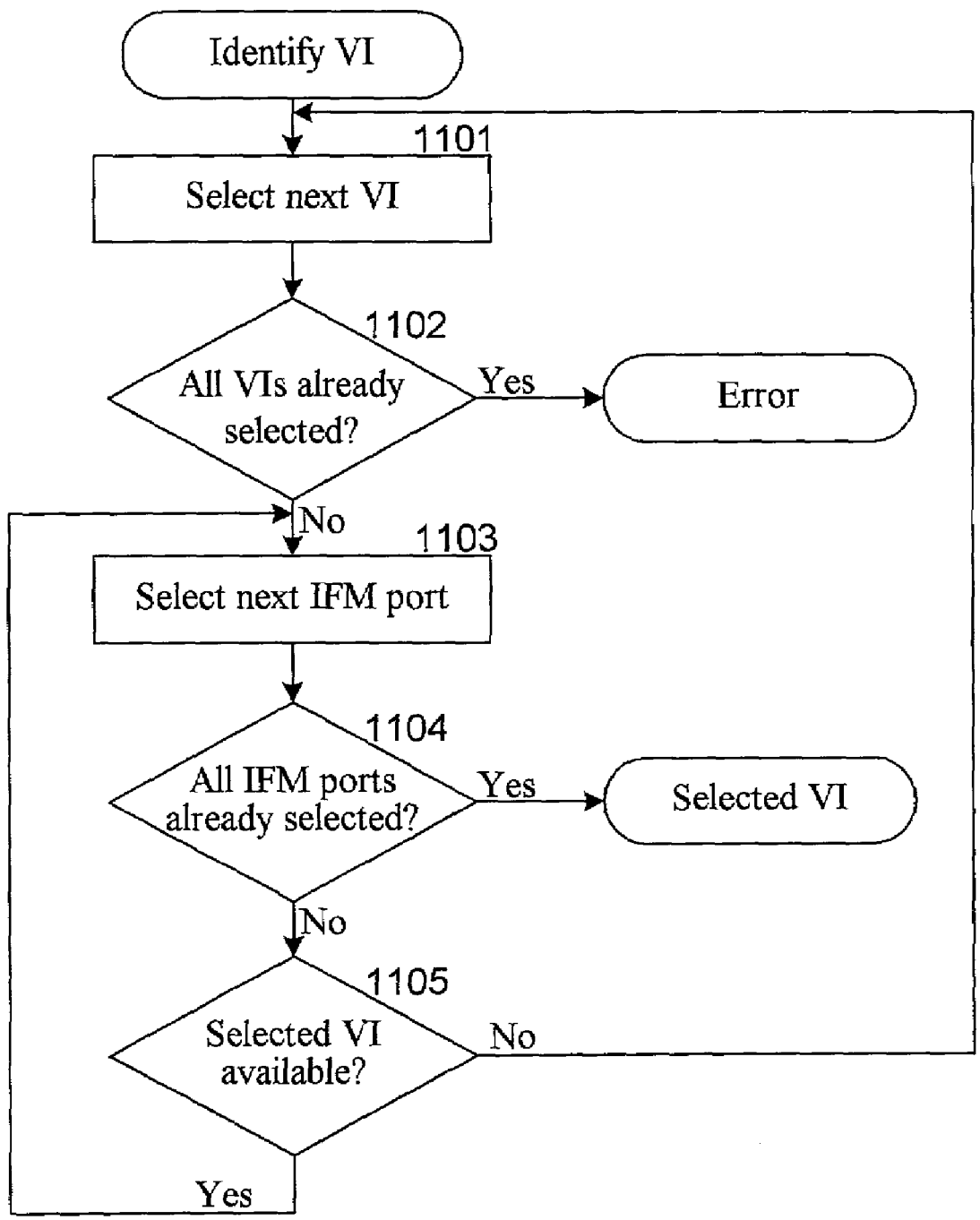
FIG. 11 is a flow diagram illustrating an embodiment of a process for identifying virtual identifiers by the network manager.

FIG. 11 is a flow diagram illustrating an embodiment of a process for identifying virtual identifiers by the network manager. In this embodiment, the identify virtual identifier component is provided an indication of a path. The component may check every port along the path to identify a virtual identifier that is not currently used by a port along the path. Alternatively, the component may identify virtual identifiers based on a sequential ordering. That is, the component may keep track of the last identified virtual identifier and increment that virtual identifier to identify the next available virtual identifier. In this way, each virtual identifier is unique. In blocks 1101–1105, the component loops selecting the next virtual identifier and determining whether it is available. The virtual identifier may not be available for use if a port along the path already uses that virtual identifier. In block 1101, the component selects the next virtual identifier, beginning with the first. In decision block 1102, if all the virtual identifiers have already been selected, then the component indicates that a virtual identifier could not be identified, else the component continues at block 1103. In blocks 1103–1105, the component loops selecting each port along the path and determining whether that port already uses the selected virtual identifier. In block 1103, the component selects the next interconnect fabric module source port of the path, beginning with the first. In decision block 1104, if all the interconnect fabric module source ports of the path have already been selected, then the component designates the selected virtual identifier as the identified virtual identifier and completes, else the component continues at block 1105. In decision block 1105, if the selected virtual identifier is available at the selected interconnect fabric module port, then the component loops to block 1103 to select the next port along the path, else the component loops to block 1101 to select the next virtual identifier.

Figure 12:
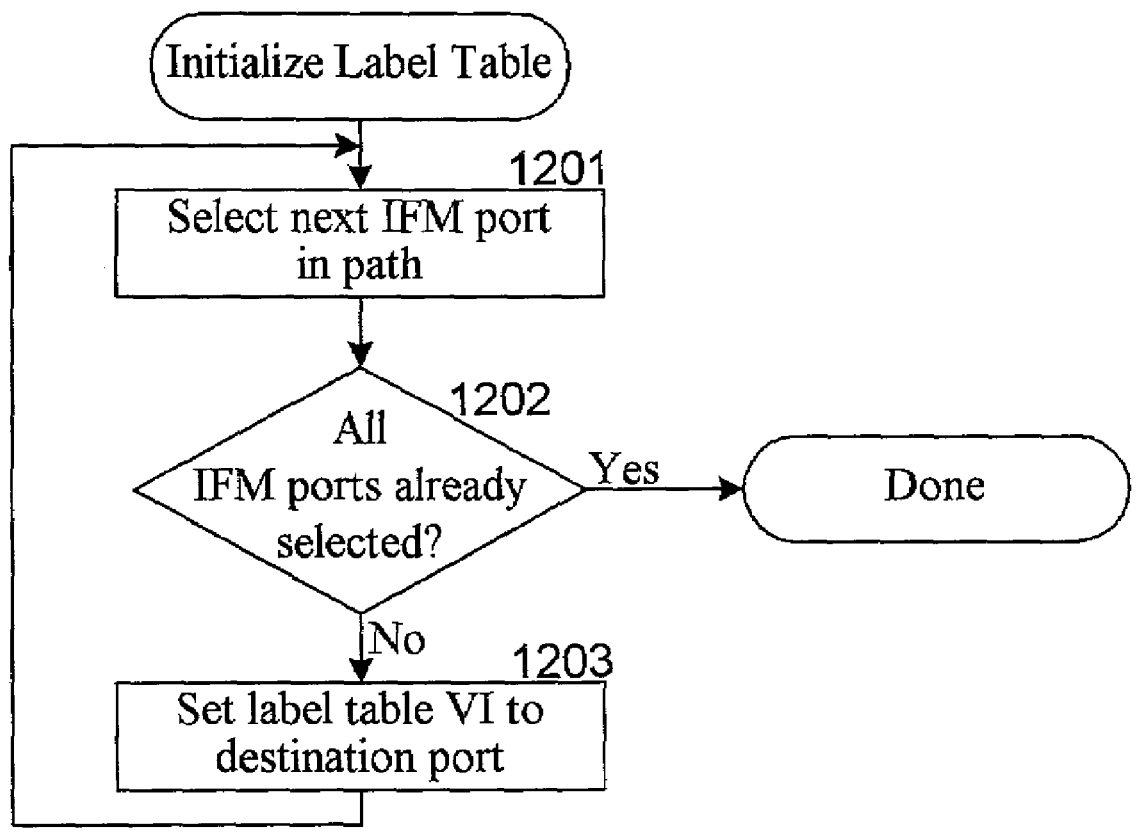
FIG. 12 is a flow diagram illustrating an embodiment of a process for initializing label tables by the network manager.

FIG. 12 is a flow diagram illustrating an embodiment of a process for initializing label tables by the network manager. The initialize label table component sends a command to each source port along the path indicating to add a mapping from the identified virtual identifier to the destination port of that interconnect fabric module. The component is passed an indication of the path and the virtual identifier. In block 1201, the component selects the next interconnect fabric module source port in the path, beginning with the first. In decision block 1202, if all the interconnect fabric module source ports along the path have already been selected, then the component completes, else the component continues at block 1203. In block 1203, the component sends a message to be selected port indicating to add to its label table a mapping from the virtual identifier to the destination port of the path. The component then loops to block 1201 to select the next interconnect fabric module port in the path. Alternatively, the label tables of the ports in a path are initialized from the destination to the source to ensure that, when a port receives a frame, the label tables of all ports to the destination have already been initialized.

In one embodiment, the crosspoint switch of an IFM may have more outputs than the number of ports of the IFM. For example, a crosspoint switch may have 34 inputs and outputs, but the IFM may have only 32 ports. The IFM may use these additional ports of the crosspoint switch to route upper layer protocol frames, such as frames directed into a name server or other administrative services. In one embodiment, the additional output ports of the crosspoint switch may be connected to a manager device for the IFM. An interconnect fabric module may have a list of "reserved" addresses that designate an upper layer protocol port. When an IFM determines that an address of its frame matches one of the reserved addresses, it enables the routing of that frame to an upper layer protocol port. The routing to upper layer protocol ports may use the same arbitration mechanism as used for routing to non-upper layer protocol ports. Alternatively, when the crosspoint switch does not have extra output for an upper layer protocol port, an output can be selectively switched between a communications port and an upper layer protocol port depending on whether the address of the destination identifier is reserved.

Figure 13:
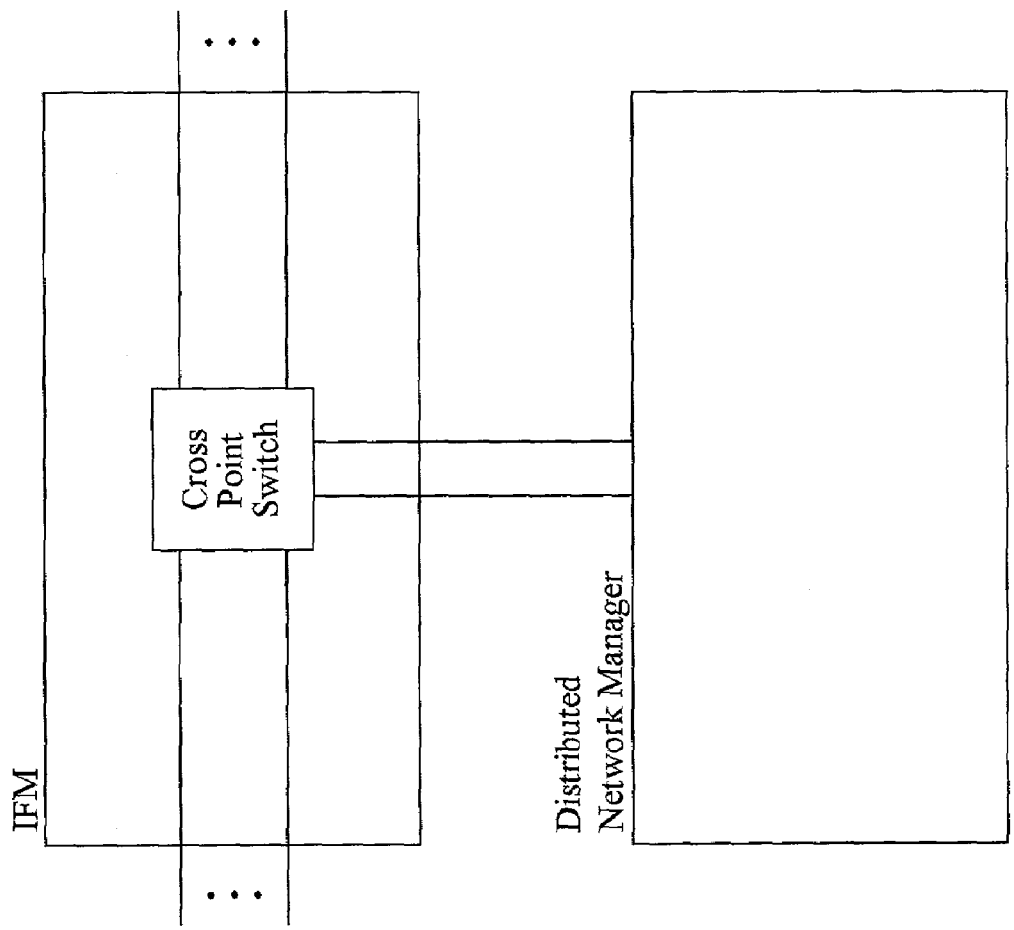
FIG. 13 is a block diagram illustrating a distributed network manager in one embodiment.

FIG. 13 is a block diagram illustrating a distributed network manager in one embodiment. In this embodiment, the network manager may be implemented on a series of manager devices connected directly to the interconnect fabric modules. The distributed network manager may communicate with each other using in-band communication of the interconnect fabric or using out-of-band communication that is independent of the interconnect fabric. The crosspoint switch of an interconnect fabric module may have reserved ports for the distributed network manager. When an interconnect fabric module receives data that designates one of the reserved ports, then the interconnect fabric module forwards the data to the distributed network manager through the reserved port.

Figure 14:
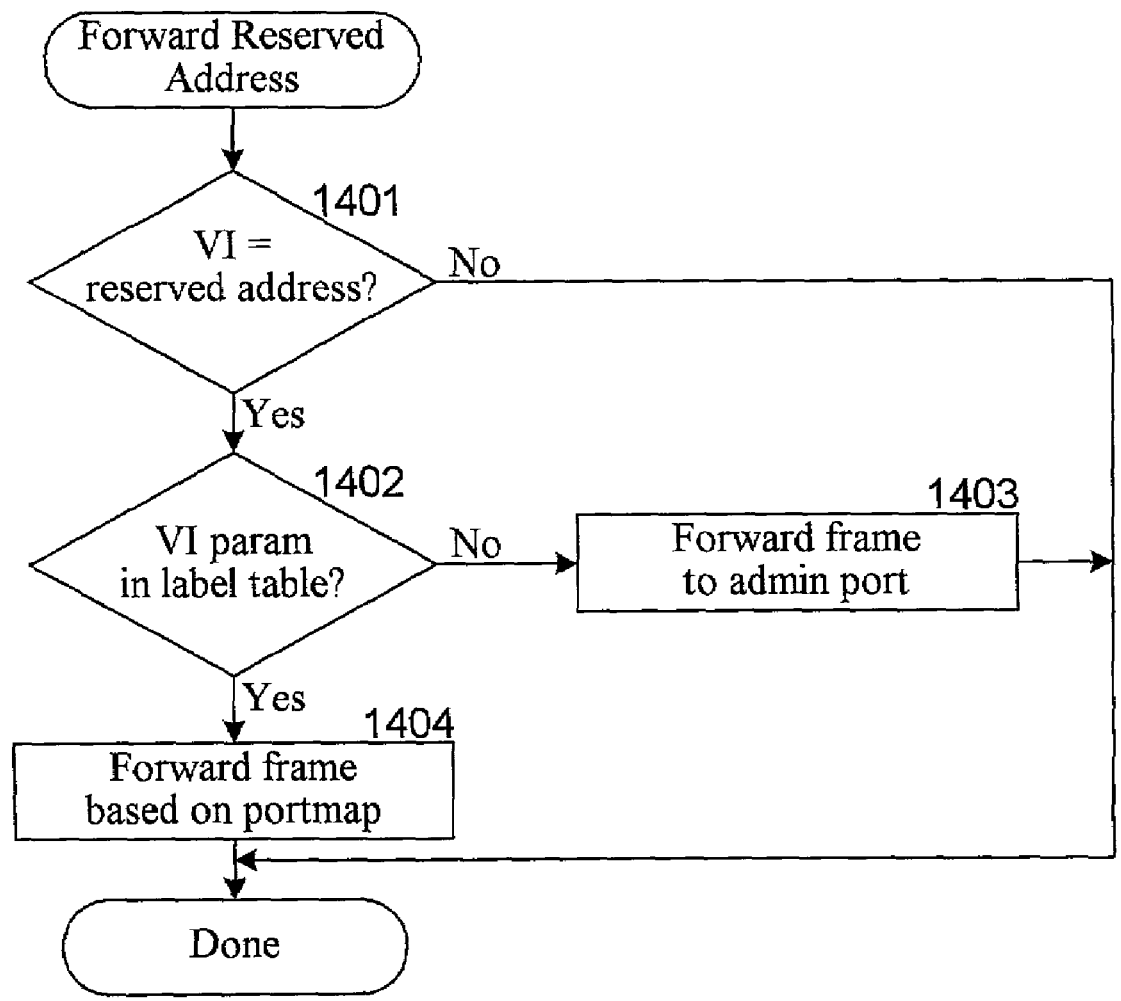
FIG. 14 is a flow diagram illustrating an embodiment of processing reserved addresses by a component of an interconnect fabric module.

FIG. 14 is a flow diagram illustrating an embodiment of processing reserved addresses by a component of an interconnect fabric module. This component forwards a frame to the network manager via either in-band or out-of-band communications. With the use of in-band communications, the frame can be routed to the appropriate interconnect fabric module which can then send the frame to the network manager using the out-of-band communications. In block 1401, if the virtual identifier of the received frame includes a reserved address, then the component continues at block 1402, else the component completes. In decision block 1402, if the virtual identifier parameter within the frame is in the label table, then the frame is to be forwarded using in-band communications and the component continues at block 1404. Otherwise, the frame is to be forwarded directly to the network manager at the IFM's manager device using out-of-band communications and the component continues at block 1403. In block 1403, the component forwards the frame to the administrative port corresponding to the manager and then completes. In block 1404, the component forwards the frame based on the port map of the label table and then completes.

Data Communication Routing and Filtering

As noted above, when an intermediate network routing device receives a transmitted data communication (whether from a source node or from another intermediate network routing device), the intermediate network routing device determines how to forward the data communication based on a destination indication for the data communication and the manner in which the network manager has configured the intermediate network routing device. As previously noted, in some embodiments the destination indications are virtual identifiers that are associated with paths through the network, such as virtual identifiers selected by the network manager for a path that the network manager has identified between source and destination nodes. After selecting a virtual identifier for a path to a destination node, the network manager configures the IFMs along the path so that when a frame is received that indicates that virtual identifier, the frame is forwarded to the destination node via the path. In the illustrated embodiment, the network manager need only configure the IFMs once and the path will remain available, as each of the IFMs maintains a persistent virtual identifier table for each of its ports that maps virtual identifiers to destinations ports of the IFM.

In some embodiments, an IFM may implement virtual identifier tables using a caching mechanism. Each port of an IFM may have its own local cache of mappings from virtual identifiers to destination ports. When a frame is received at a source port, the IFM checks the cache of that source port to determine whether it has a mapping for the virtual address used for that frame. If not, the IFM checks a virtual identifier table that is shared by multiple ports. When the virtual identifier table has a mapping for the virtual identifier, then the IFM forwards the frame in accordance with that mapping. The IFM also stores that mapping in the cache for the source port so that the mapping can be retrieved more quickly when a subsequent frame is received at the source port with that virtual identifier. In an alternative embodiment, when the virtual identifier table does not have a mapping for the virtual identifier, the IFM requests the network manager or an external virtual identifier table to provide the mapping. When that mapping is provided by the network manager or the external table, the IFM stores it in the shared virtual identifier table and/or in the port's local cache. Thus, an IFM may implement no caching, two-tiered caching, or three-tiered caching for virtual identifiers.

In some embodiments, an IFM may implement inter-switch load balancing via groups of equivalent ports. As discussed above, IFMs may themselves be interconnected to form an interconnect fabric for connecting nodes. Two IFMs may have multiple links directly connecting their ports. Ports are considered equivalent when a frame can be selectively transmitted on any of the ports to reach its final destination. The use of multiple links (and equivalent ports) between IFMs allows for a greater bandwidth between those IFMs. The network manager may configure each IFM to indicate which groups of its ports are equivalent. The IFM may have an equivalent ports table that maps each port to its equivalent ports. When the IFM receives a frame, it identifies a destination port based on the virtual identifier in the frame. If the identified destination port is currently in use, then the IFM checks the equivalent ports table to determine whether there any equivalent ports. If so, and the equivalent port is not in use, the IFM forwards the frame through the equivalent port. In this way, IFMs can balance their load through the use of equivalent ports.

In some embodiments, an IFM allows an existing connection between a source node and a destination node to be preempted by a request for a proposed connection that specifies a higher priority and specifies to preempt existing connections. When an IFM receives a connection request at a source port, it identifies a destination port. If the destination port is currently part of an existing connection and the proposed connection indicates to preempt, then the IFM determines whether the proposed connection or the existing connection has a higher priority. If the existing connection has a higher priority, then the IFM indicates that the proposed connection cannot be made. If, however, the proposed connection has a higher priority, then the IFM indicates that the existing connection is to be terminated and then proceeds to establish the proposed connection. The use of priorities to preempt an existing connection allows connection management to be distributed through the interconnect fabric, rather then performed directly by the network manager.

In some embodiments, a device may send a frame that is to be multicasted to multiple destinations without acknowledgment. The Fibre Channel communications standard refers to such a frame as a class 3 frame. Such frames are not guaranteed to be received by each destination. When an IFM receives such a frame, it identifies its destination ports through which the frame is to be forwarded and forwards the frame to each identified destination port that is not currently in use. If an identified destination port is currently in use, the IFM keeps the frame stored in the buffer until the identified destination port becomes available or until the time to live for the frame expires. When an identified destination port becomes available, the IFM forwards the frame to that destination port. In this way, the IFM increases the chances of the frame to being successfully received by all of its destinations.

In some embodiments, many different techniques may be used by the network manager, the routing devices and the nodes to ensure the security of the network. In particular, the network manager may authenticate each node attempting to register to ensure that the node is not an imposter node. In this way, only previously authorized nodes can access the network. The routing devices may also discard any communication that is addressed with one or more virtual identifiers that are not properly configured in the routing device. More generally, the routing device and nodes may check the header or other information of a communication to ensure that the communication is valid, and may disregard the communication if not valid. For example, a routing device may detect that a communication received from a node specifies a higher priority than the priority authorized by the network manager, and if so the routing device may discard the communication to prevent the use of the unauthorized priority. Similarly, a routing device may detect that a communication specifies a combination of virtual identifiers that is not authorized, and if so may discard or modify the communication. The routing device may also remove or disable previously configured virtual identifiers to prevent use by nodes past an allotted time period or to prevent use by an imposter node. These security techniques can help ensure the overall security of the network and help prevent various common security problems, such as denial-of-service attacks. A denial-of-service attack can be prevented because an unauthorized node can only send communications through the routing device to which it is directly connected. That routing device can detect that a communication is unauthorized and immediately discard the communication, thus preventing the targeted node from receiving such communications. Moreover, since the routing device that is directly connected to the unauthorized node handles the security, the unauthorized communications do not impact network bandwidth, except possibly for the bandwidth through the directly connected routing device.

In some embodiments, the network manager coordinates network security with the routing devices and the nodes. When a node registers with the network manager, the network manager authenticates the node. The network manager and the node may use a PKI-based ("Public Key Infrastructure") authentication technique. For example, a node may generate a private and public key pair. The node then provides its public key to the network manager during authorization that may be coordinated by a person who is a network administrator. Once authorized, the node can register with the network manager. To register, the node encrypts its registration request (or a portion of it) using its private key and then sends the encrypted registration request to the network manager. The network manager decrypts the registration request using the node's public key. If the request is correctly decrypted, then the network manager knows it was sent by an authorized node and proceeds with the registration. If, however, the request is not correctly decrypted, then the network manager knows that the request was sent by an imposter (or otherwise unauthorized) node and disregards the registration request. To ensure that a registration request is not intercepted and decrypted by an unauthorized node that has the authorized node's public key, the network manager may generate its own private and public key pair and provide its public key to the authorized node. An authorized node can then further encrypt the registration request with the network manager's public key. In this way, only the network manager can decrypt and recognize the registration request. One skilled in the art will appreciate that these encryption techniques can also be used to protect data communication registrations and other communications sent via the network. In addition, various other authentication techniques may be used during registration.

In some embodiments, a routing device filters communications (e.g., communications sent from a directly connected node) so that unauthorized communications are not further transmitted through the network. The routing device may filter communications in various ways, such as based on information contained in the header of the communication. In particular, a source-side port that receives a communication may discard the communication if the virtual identifier used for the communication in not in the label table of the port. In addition, the network manger, when it configures a routing device during registration, may configure the source-side port with filter parameters other than the virtual identifier. For example, the network manager may provide the source-side port with the maximum priority or the classes of service that the node is authorized to use. When the port receives a communication, it determines whether any of the filter parameters are unauthorized and, if so, discards the communication. The routing device may also notify the network manager of the unauthorized communication. Because the filtering is performed at the ports, unauthorized communications have minimal impact on internal routing device performance and on overall network performance.

In some embodiments, the security of the network is further enhanced by the removal of virtual identifiers from the routing device and from the nodes. When a virtual identifier is removed from a routing device or a node, communications directed to that virtual identifier will no longer be accepted by the routing device or node. A virtual identifier may be removed for various reasons, including when the network manager requests that it be removed, when a routing device or node detects an expiration of the virtual identifier, and/or when the routing device or node detects an error at the physical layer (e.g., due to changing a physical piece of hardware). The network manager may request that a virtual identifier be removed as part of a node's de-registration process. The de-registration may be initiated by the network manager or by the node itself. In either case, the network manager may send a request to remove the virtual identifier to each source-side port along the path associated with that virtual identifier. The network manager may also send a request that the node itself remove its virtual identifier. Routing devices and nodes may also automatically remove a virtual identifier after a certain timeout period, such as a period specified by the network manager, the routing device or the node. The routing device or node may base the timeout on the last use of the virtual identifier, such as by restarting the timeout period whenever a communication is received or sent using that virtual identifier. The routing device or node may also remove a virtual identifier when certain events (e.g., errors) are detected at the physical layer. For example, the physical layer of a routing device may detect that the communications link between the routing device and a node has been removed (e.g., the line has been unplugged from the source-side port of the routing device). In such a case, the routing device may automatically remove all the virtual identifiers associated with that node (e.g., stored in the label table of the source-side port). In this way, an imposter node cannot then be connected to the routing device and start sending communications using the virtual identifiers of the disconnected node. In addition, since the routing devices are not configured until a node registers (i.e., just-in-time configuration), the length of time that the network is configured to support a node tends to be minimized and tends to be on an as-needed basis. The configuring of the network on an as-needed basis tends to reduce the opportunities an imposter node has to access the network and tends to free up network resource to be used by other authorized nodes.

Figure 15:
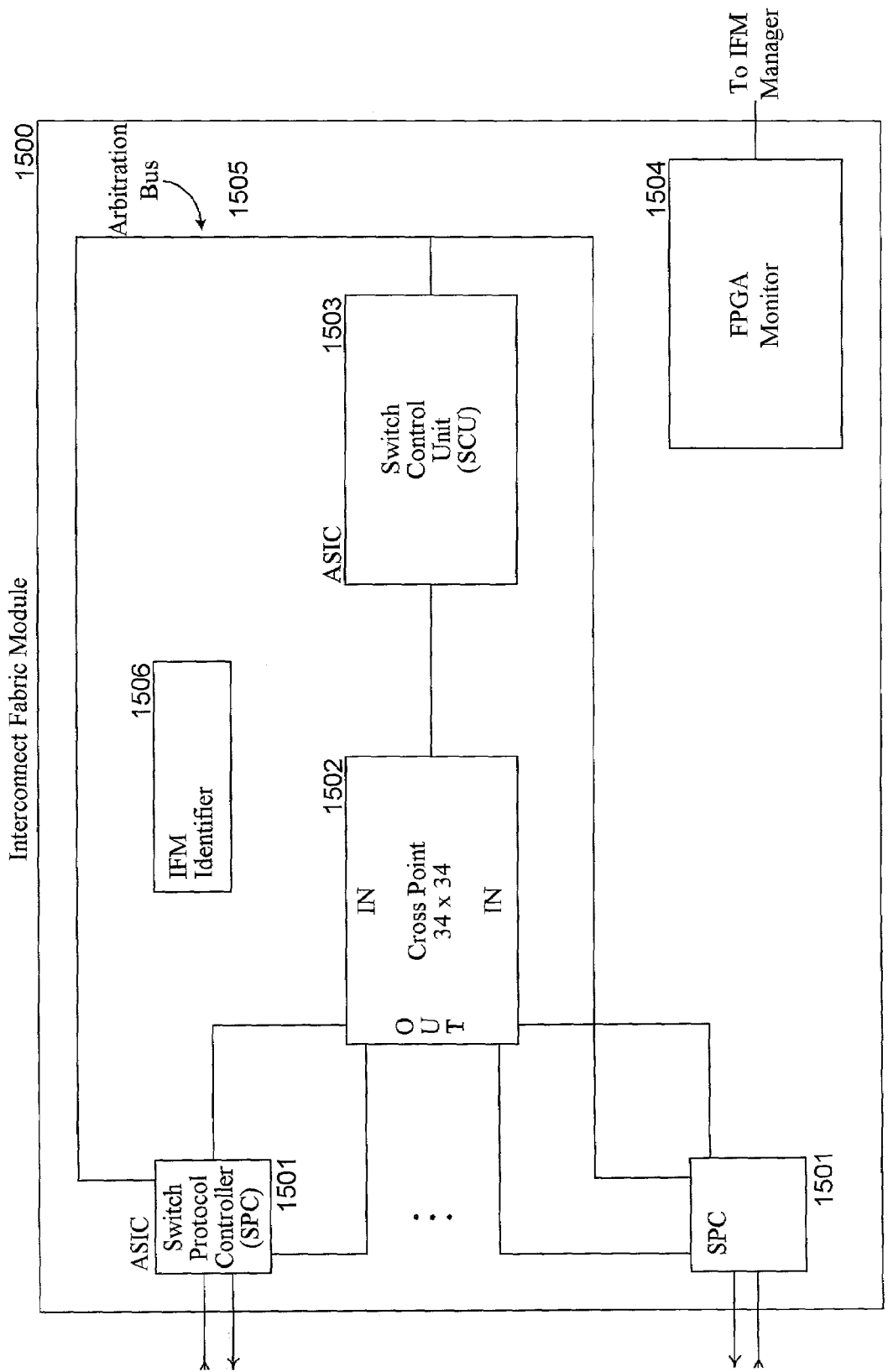
FIG. 15 is a block diagram illustrating components of an embodiment of an interconnect fabric module.

FIG. 15 is a block diagram illustrating components of one embodiment of an IFM. The IFM 1500 includes 32 switch protocol controllers ("SPCs") 1501, a crosspoint switch 1502, a switch control unit ("SCU") 1503, a field programmable gate array ("FPGA") monitor 1504, an arbitration bus 1505, and an IFM identifier 1506. In the illustrated embodiment, the IFM has 32 bi-directional communication ports, and one of the SPCs controls each communications port. Each SPC is responsible for decoding the header information of a frame, arbitrating access to destination ports, and transmitting the received frame through the crosspoint connections to one or more communication ports. The SCU receives requests for crosspoint connections from the SPCs, configures the crosspoint switch accordingly, and directs the SPCs to transmit their frames through the crosspoint connections as configured. In the illustrated embodiment, the crosspoint switch provides full crossbar functionality such that each port of the IFM can be simultaneously connected to any number of the other ports, and includes 34 inputs and 34 outputs (numbered 0–33). The FPGA monitor connects to an IFM manager (not shown), which in the illustrated embodiment is a single board computer that provides an interface for configuring the IFM, and may also provide an interface to upper layer protocol services such as a name server or alias server. The monitor may provide a variety of network/IFM monitoring functions, such as determining QOS levels being achieved on some or all of the paths and/or links in the network (e.g., the links through the IFM 1500) and/or determining QOS levels being achieved for some or all data communications, and can perform the monitoring in a variety of well-known manners. When monitors are present on multiple (e.g., all) IFMs, the monitoring can occur in a distributed manner and the various monitoring information can be combined (e.g., to combine multiple groups of link-specific information to determine path-specific information).

Figure 16:
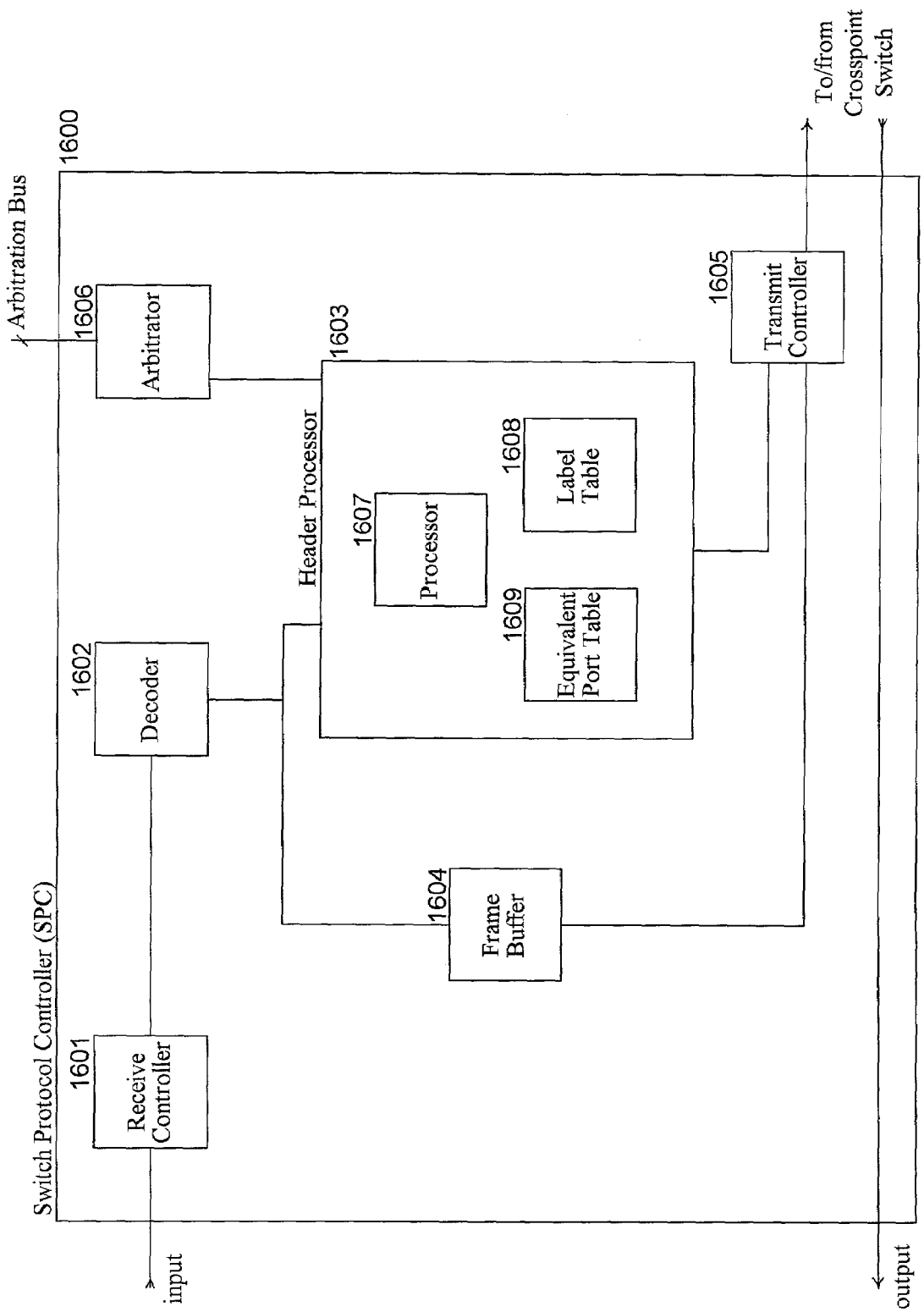
FIG. 16 is a block diagram illustrating components of an embodiment of a switch protocol controller.

FIG. 16 is a block diagram illustrating components of an embodiment of an SPC corresponding to a port on an IFM. The SPC 1600 includes a receive controller 1601, a decoder 1602, a header processor 1603, a frame buffer 1604, a transmit controller 1605, and an arbitrator 1606. The receive controller is connected to the input (i.e., receive side) of a port and may perform a serial-to-parallel conversion of a received frame. The decoder provides the header information of the received frame to the header processor and stores the frame in the frame buffer. The header processor includes a processor 1607, a label table 1608, and an equivalent port table 1609. The label table contains port maps that indicate to which other ports of the IFM switch a frame should be routed (i.e., the "switch destination ports") if the SPC's corresponding port is the port through which the frame is received (i.e., the "switch source port") based on the destination indicator used for the frame. The processor retrieves the port map from the label table for the received frame and provides the port map to the arbitrator. The equivalent port table indicates groups of ports that are equivalent in the sense that a frame can be sent through any port of an equivalent group to reach the destination. If one port in an equivalent port group is currently in use, then an SPC can equivalently route the frame to any available port in the equivalent port group. The arbitrators of the SPCs coordinate access to the SCU so that an SPC can request the SCU to configure the crosspoint switch in accordance with the port map. As described below in detail, the arbitrators and the SCU are connected to an arbitration bus. The arbitrator is also connected to the output (i.e., transmit side) of the corresponding port for transmitting control frames. The transmit controller transmits frames stored in the frame buffer to the switch destination ports via the crosspoint switch when the SCU indicates that the crosspoint switch has been configured appropriately.

Figure 17:
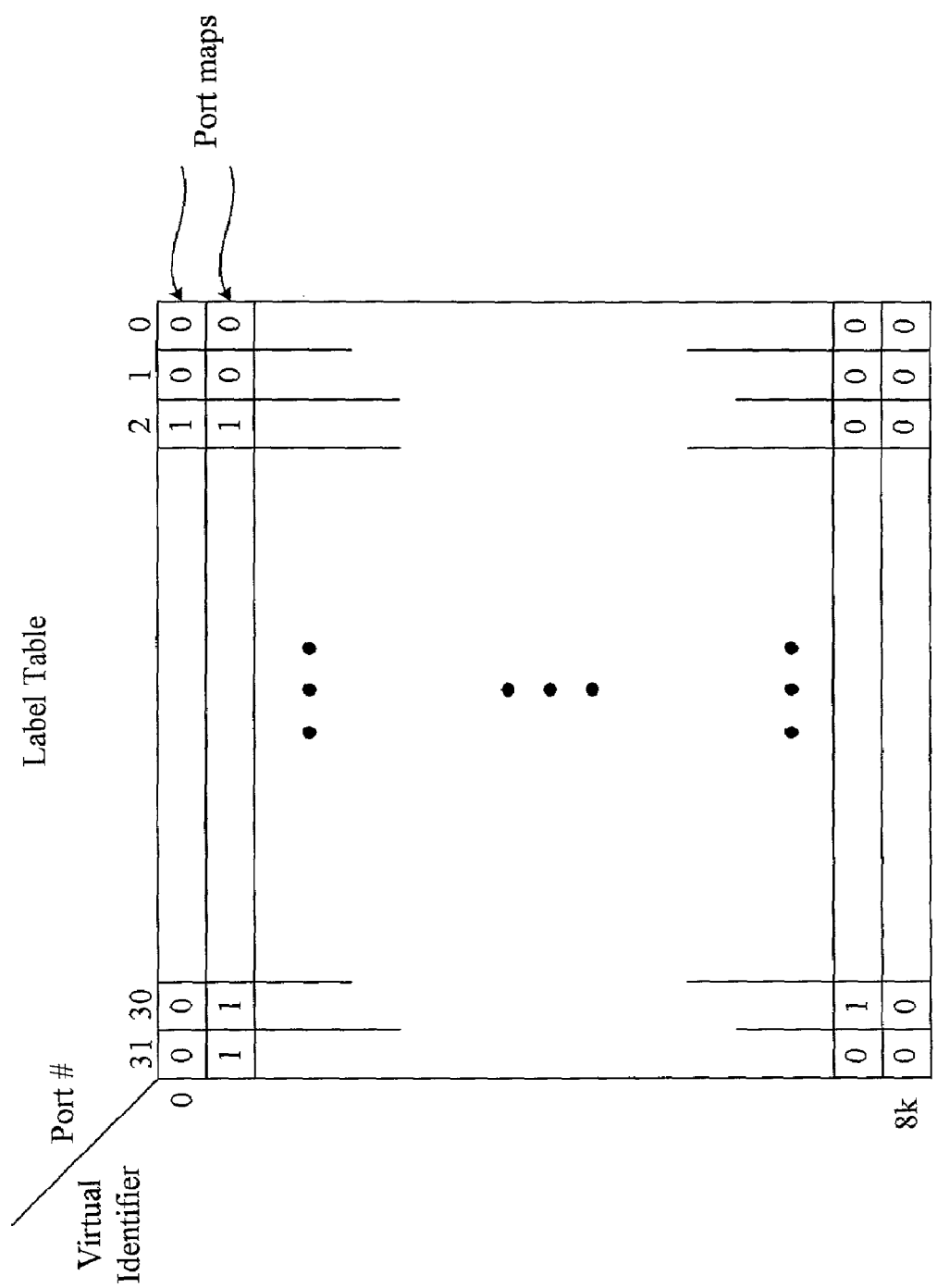
FIG. 17 is a block diagram illustrating example contents of one embodiment of a label table.

FIG. 17 is a block diagram illustrating example contents of one embodiment of a label table. In the illustrated embodiment, the entries of the label table are port maps that are indexed by a virtual identifier, with each port map having one bit for each of the 32 ports of the IFM. A bit value of 1 for a port indicates that frames using that indexing virtual identifier should be routed to that port. For example, the first entry in the label table contains a bit value of 1 in the column corresponding to port 2 and contains a bit value of 0 in all the other columns corresponding to ports 0, 1, and 3–31. When a frame is directed to the virtual identifier that indexes that first entry (e.g., a virtual identifier of 0 in the illustrated embodiment), the entry in the label table indicates that only port 2 of the IFM should be used as a switch destination port. Conversely, the second entry in the label table indicates that frames directed to the virtual identifier of 1 are to be routed to switch destination ports 2–31, but not to ports 0 and 1. In one embodiment, the label table of each SPC contains 8K entries, but the size of the label table can be adjusted in other embodiments to meet overall performance goals of the IFM. Because each SPC has its own label table, a frame using a virtual identifier of 0 or 1 that is received via another port would be routed in accordance with a port map in the label table for that other port.

Figure 18:
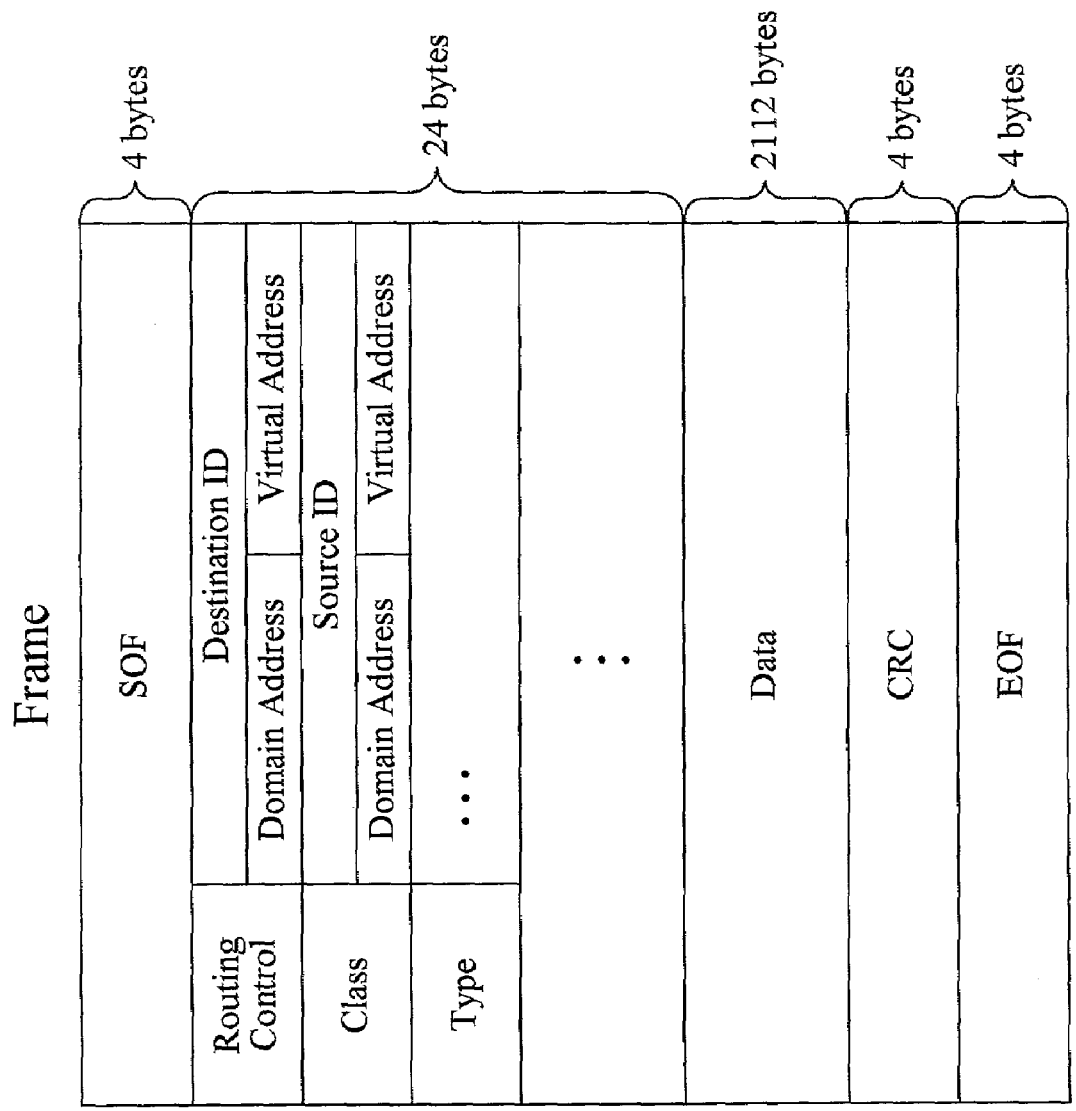
FIG. 18 is a block diagram illustrating the format of an example frame.

FIG. 18 is a block diagram illustrating the format of a frame in one embodiment. The illustrated frame is in Fibre Channel format. One skilled in the art will appreciate that other formats can be used such as the InfiniBand format. A frame contains a start-of-frame portion, a header portion, a data portion, and an end-of-frame portion. The header portion includes a 24-bit destination address field, a 24-bit source address field, an 8-bit control field, an 8-bit type field, and an 8-bit priority field. The data portion is variable length and contains up to 2112 bytes. In some embodiments, virtual identifiers are used in place of addresses in the destination address and/or source address fields. The control field indicates whether the frame is a control frame or a data frame. A control frame may include response frames (e.g., an acknowledge frame), fabric control frames, flow control management frames, and link control frames. The flow control management and link control frames are standard Fibre Channel defined frames. The type field indicates the type of data in the data field. A data frame contains payload data that is to be sent from one node to another node using the interconnect fabric. The class of a frame specifies whether a frame is to be sent with or without a connection (e.g., Fibre Channel class 1 represents a connection with acknowledgment). The class field may indicate a class, a priority value, and a preemption flag. Start-of-connection and end-of-connection frames delimit a connection. A connection is a bi-directional, physical connection from a source node through the interconnect fabric to destination node. When the interconnect fabric receives a start-of-connection frame, the IFMs cooperate to establish a physical connection between the source and destination nodes. The physical connection is maintained until an end-of-connection frame is sent via the connection or until a frame that has a priority higher than the connection and that designates to preempt conflicting connections (i.e., its preemptive flag is set) is received by an IFM that needs to use one of its port that is dedicated to the existing connection.

Figure 19:
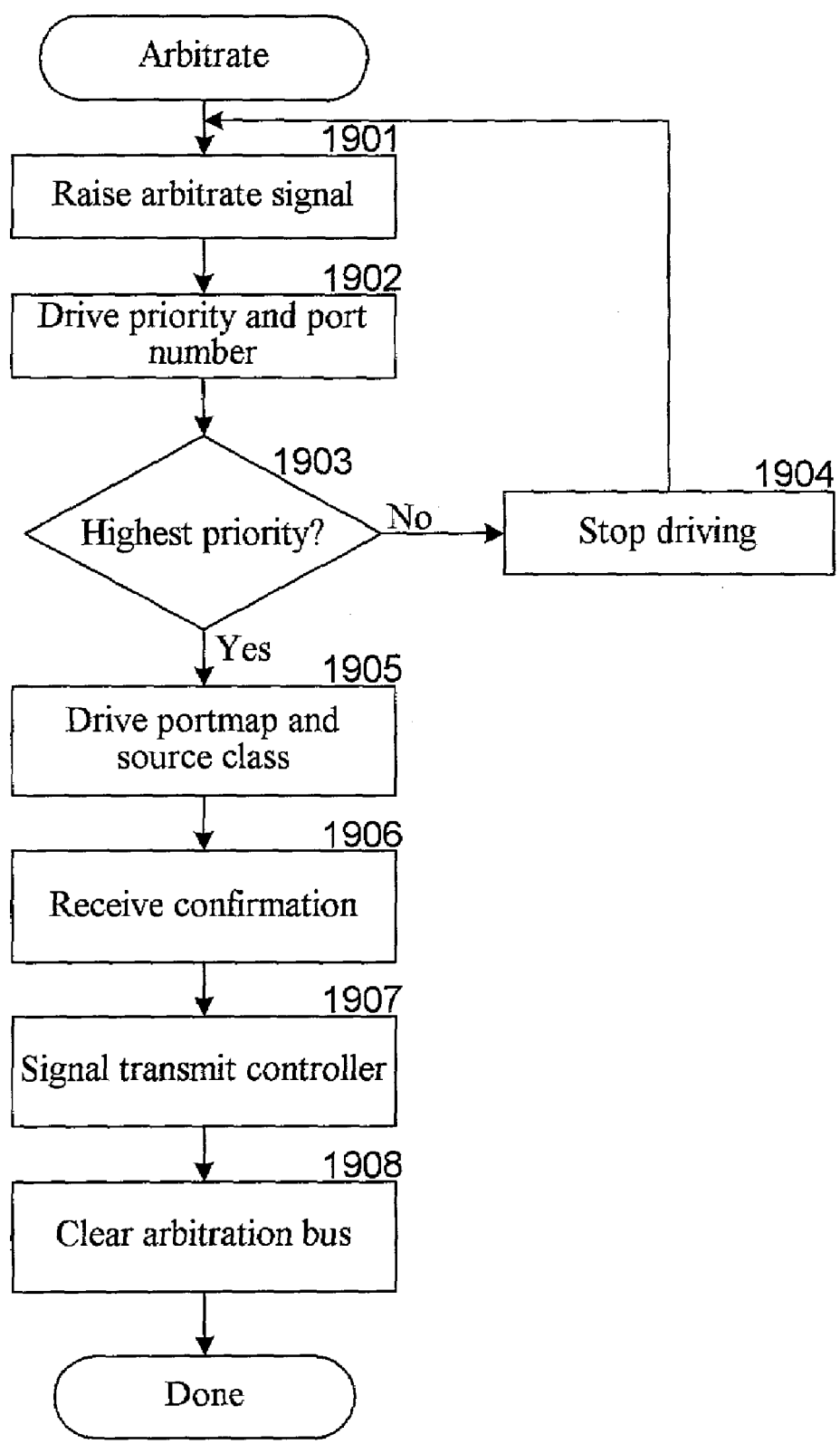
FIG. 19 is a diagram illustrating logic of an arbitrator of a switch protocol controller in one embodiment.

FIG. 19 is a diagram illustrating example logic of one embodiment of an arbitrator of an SPC. The arbitrator communicates with the SCU via the arbitration bus, which in the illustrated embodiment follows the IEEE 896 Futurebus+ arbitration protocol. The arbitration bus is a wired-or bus in which multiple arbitrators can drive their information onto the bus simultaneously. Based on the information that is being driven on the arbitration bus, each arbitrator determines whether it is the arbitrator with the highest priority that is currently driving the bus. When an arbitrator decides that it does not have the highest priority, it stops driving its information onto the bus. Ultimately, the arbitrator with the highest priority will remain driving the bus. At that point the SCU retrieves the information from the arbitration bus, which includes the port map for the virtual identifier being used, the switch source port number, and the class. The SCU then configures the crosspoint switch to crosspoint connect the input of the switch source port to the output of each switch destination port identified by the port map. The SCU then notifies the arbitrator with the highest priority that the crosspoint switch has been configured. In one embodiment, the arbitration bus includes 32 port status lines to indicate whether the corresponding port is currently in use. The SCU sets and clears the status lines as it configures the crosspoint switch. If the port status lines indicate that the crosspoint switch cannot be configured in accordance with the port map (e.g., a port indicated in the port map is in use), then the arbitrator, in general, does not participate in arbitrations until all the switch destination ports indicated by the port map become available.

In block 1901, the arbitrator raises an arbitration signal on the arbitration bus. If the arbitration signal is already raised, then the arbitrator waits until the arbitration signal is lowered before raising the signal. It is possible that two arbitrators can raise the arbitration signal simultaneously. If so, the arbitrator with the highest priority frame is given control of the arbitration bus. In block 1902, the arbitrator drives a competition number comprising the 7-bit priority of the frame and the 5-bit port number of its port onto the arbitration bus. In decision block 1903, if the arbitrator does not have the highest priority, then it stops driving the competition number and other data onto the arbitration bus in block 1904 and then continues to block 1901 so it can eventually raise the arbitration signal and try again. If the arbitrator has the highest priority and all the other arbitrators have stopped driving the arbitration bus, then the arbitrator continues at block 1905. In block 1905, the arbitrator drives the port map, its 5-bit port number, and class onto the arbitration bus. In block 1906, the controller stops driving any data on the arbitration bus, lowers the arbitration signal, and receives confirmation from the SCU when the crosspoint switch has been appropriately configured. In block 1907, the arbitrator signals the transmit controller to transmit the frame to the crosspoint switch. In block 1908, the arbitrator clears the arbitration bus, and then completes. At that point, other arbitrators detect that the arbitration signal has been lowered and can then arbitrate access to the SCU.

Figure 20:
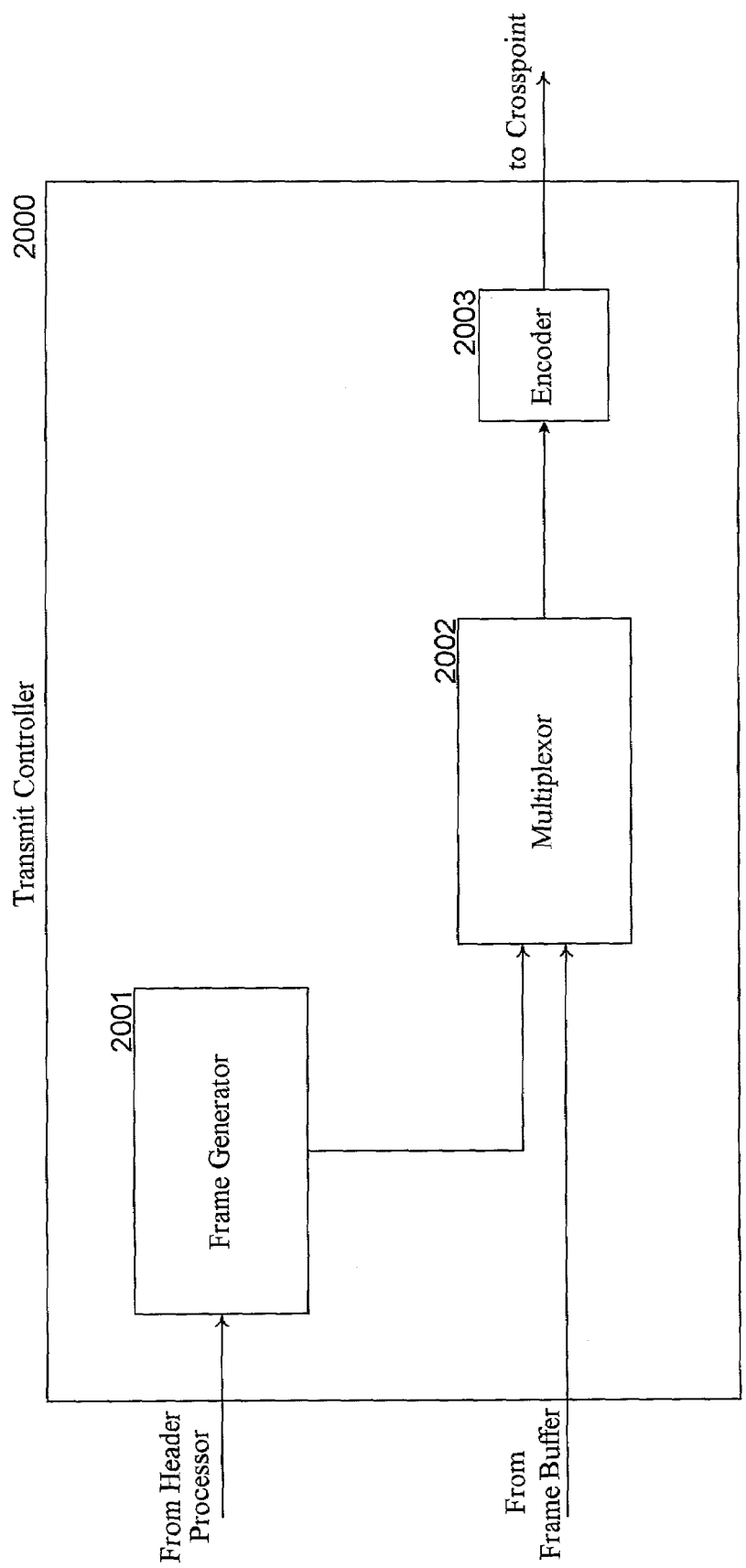
FIG. 20 is a block diagram illustrating an embodiment of a transmit controller.

FIG. 20 is a block diagram illustrating an embodiment of a transmit controller. The transmit controller 2000 includes a frame generator 2001, a multiplexor 2002, and an encoder 2003. The transmit controller when directed by the arbitrator either generates and transmits a control frame or transmits the frame currently stored in a frame buffer. The encoder forwards the frame to the crosspoint switch for transmission through the switch destination ports.

Figure 21:
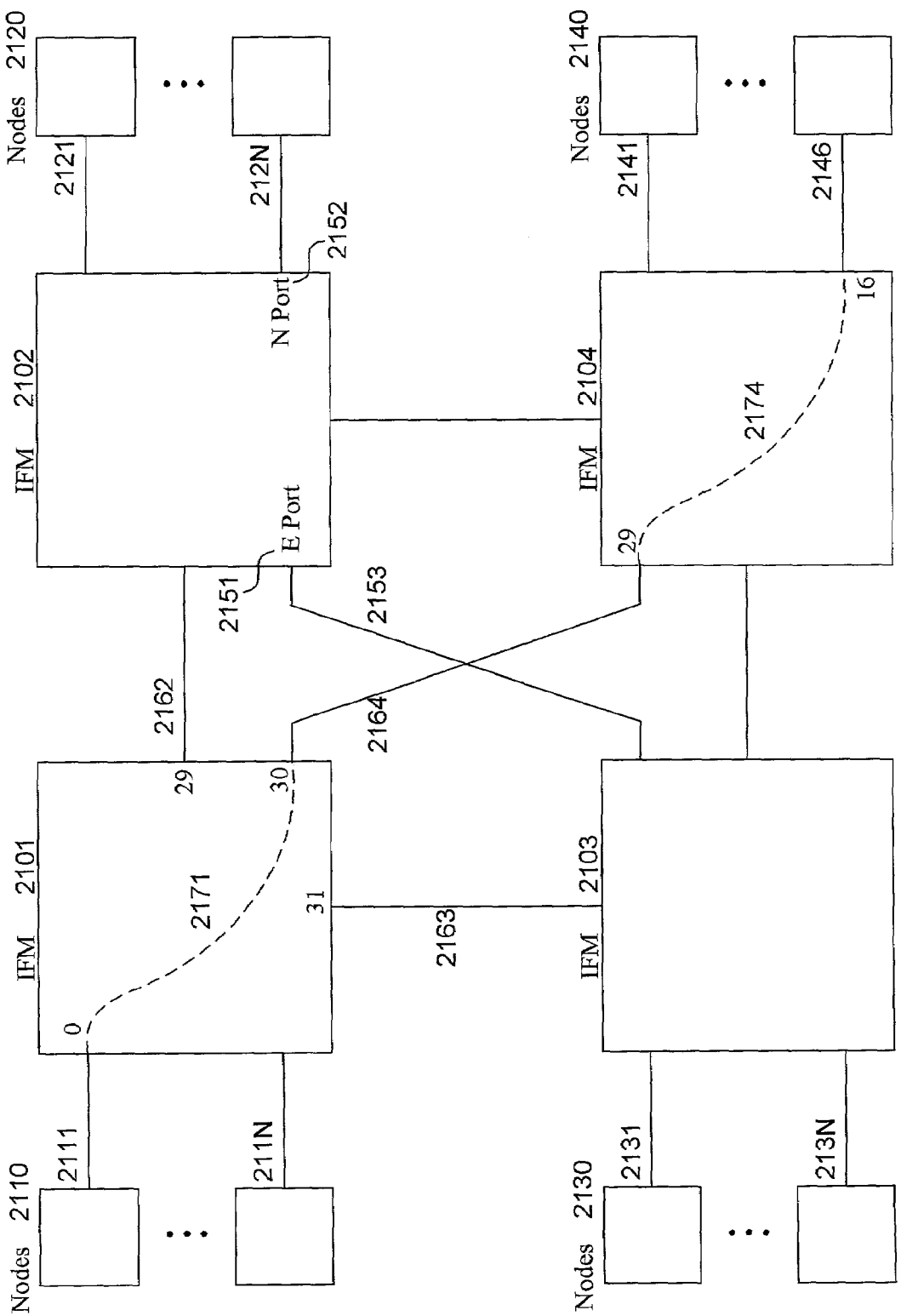
FIG. 21 is a block diagram illustrating an example interconnection of IFMs to form an interconnect fabric connecting various nodes.

FIG. 21 is a block diagram illustrating an example interconnection of IFMs to form an interconnect fabric connecting various nodes. In this example, the IFMs 2101, 2102, 2103, and 2104 form a fully connected interconnect fabric. An interconnect fabric is fully connected when each IFM is directly connected to each other IFM. For example, IFM 2101 is directly connected to IFM 2102 via link 2162, to IFM 2103 via link 2163, and to IFM 2104 via link 2164. Each IFM is also directly connected to various nodes. For example, IFM 2101 is directly connected to nodes 2110. All IFM ports are generic fabric ports ("G-ports") until connected to either other IFMs or nodes. The ports of an IFM that are directly connected to other IFMs are referred to as expansion ports ("E-ports"), and the ports of an IFM that are connected to nodes are referred to as fabric ports ("F-ports"). FIG. 21 illustrates that a connection has been established between node 2111 and node 2146. Node 2111 is directly connected to port 0 of IFM 2101. Port 0 of IFM 2101 is currently connected to port 30 via the crosspoint connection 2171. Port 30 of IFM 2101 is directly connected to port 29 of IFM 2104 via link 2164. Port 29 of IFM 2104 is currently connected to port 16 via the crosspoint connection 2174. Port 16 of IFM 2104 is directly connected to node 2146. While the connection is maintained, all frames sent from node 2111 through port 0 of IFM 2101 are transmitted through the connection to node 2146 via port 16 of IFM 2104. When a frame is transmitted using a connectionless protocol, the crosspoint switches of the IFMs are dynamically configured to route the packet from the source node to the destination node. That is, once an IFM transmits a frame from its switch source port through its switch destination port, those ports are available to be reconnected to other ports. Thus, with a connectionless protocol each frame will result in an arbitration at each IFM in the path from the source node to the destination node.

Figure 22:
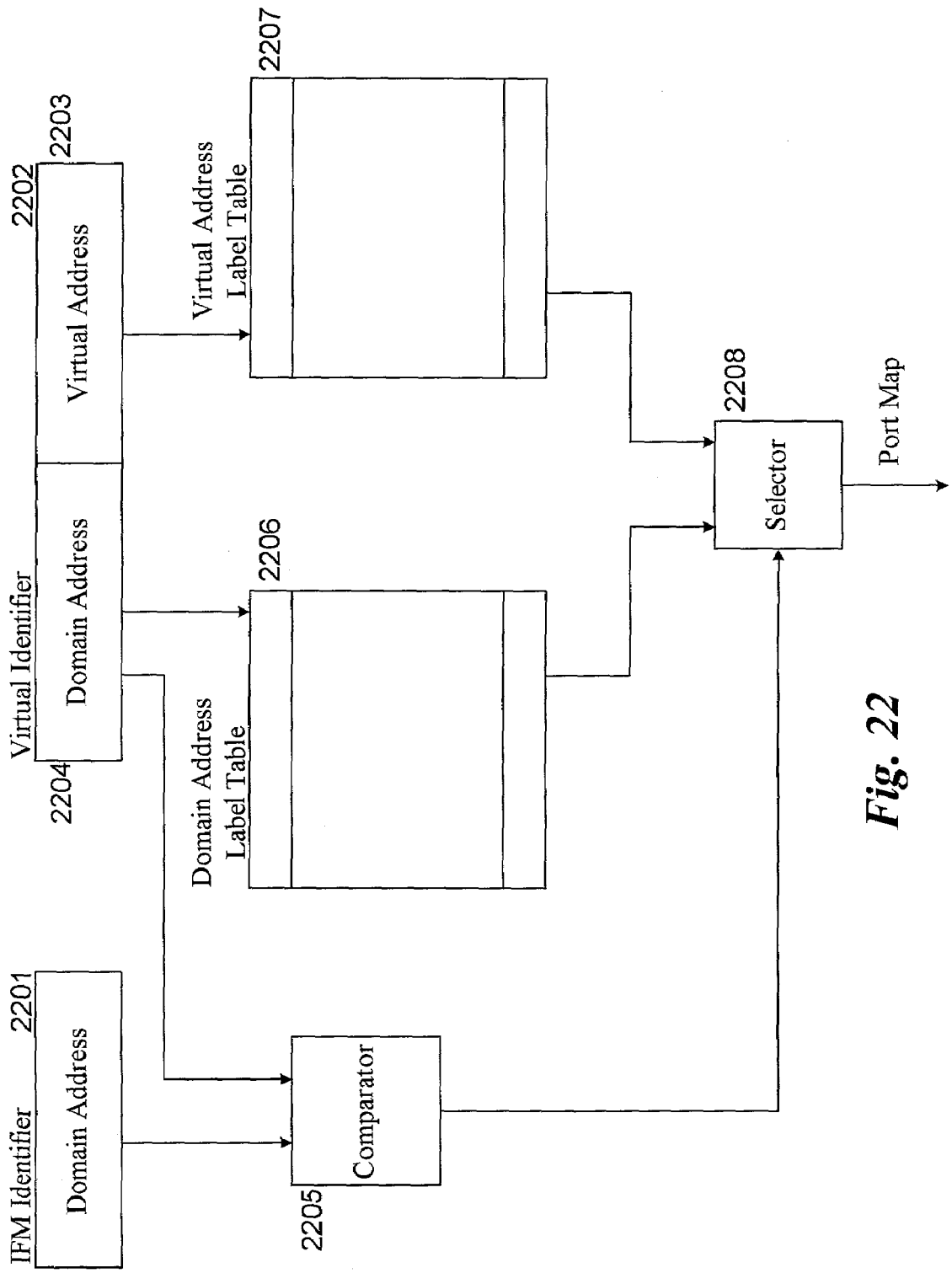
FIG. 22 is a block diagram illustrating an example of mapping a virtual identifier to a port map.

FIG. 22 is a block diagram illustrating an example of mapping a virtual identifier to a port map. In some embodiments, each IFM has an IFM identifier 2201, which in the illustrated embodiment contains a domain address that has been assigned to the IFM. In such embodiments, the label tables are each subdivided into a virtual address label table and a domain address label table. If a virtual identifier for a received frame includes a domain address and a virtual address, an SPC processing the frame determines whether the domain address of the virtual identifier matches the domain address assigned to the IFM. If so, then the SPC uses the virtual address label table to retrieve the port map and route the frame. If the domain addresses do not match, however, then the SPC instead uses a domain address label table to retrieve the port map. The domain address label table port map will be used to route the frame to one of the IFMs in the domain corresponding to the virtual identifier's domain address, and that IFM will then use the virtual address portion of the virtual identifier to route the frame to its destination.

An SPC may include a virtual identifier buffer 2202, a comparator 2205, a domain address label table 2206, a virtual address label table 2207, and a selector 2208. The comparator inputs are the domain addresses of the IFM and of the virtual identifier. The comparator signals whether the domain addresses match. The domain address label table is indexed by the domain address of the virtual identifier and outputs the indexed port map. The virtual address label table is indexed by the virtual address of the virtual identifier and outputs the indexed port map. The port maps of the domain address label table and the virtual address label table are input to the selector, which selects a port map based on the input generated by the comparator. That is, the port map is selected from the virtual address label table when the domain addresses of the IFM and of the virtual identifier match and from the domain address label table when they do not match.

In some embodiments, multiple SPCs of an IFM may share a single label table, which may include both a virtual address label table and a domain address label table in embodiments in which a virtual identifier includes a domain address and a virtual address. The contents of the label table may be dynamically modified to reflect routing algorithms used by a manager of the interconnect fabric. Each SPC that shares a single label table may include a local label table cache in which it stores recently retrieved port maps from the shared label table. An SPC resolves a virtual identifier into its corresponding port map by first checking its local label table cache. If the corresponding port map is not in the local label table cache, then the SPC accesses the shared label table. The use of local label tables and a shared label table represents a two-tier caching system. In one embodiment, the SPCs additionally use a third caching system tier. The third tier provides access to an extended label table that contains port maps not currently contained in the shared label table. Thus, when the shared label table does not contain the port map for a virtual identifier, an SPC uses an extended label table interface to retrieve a port map for that virtual identifier from a device that is external to the IFM.

Figure 23:
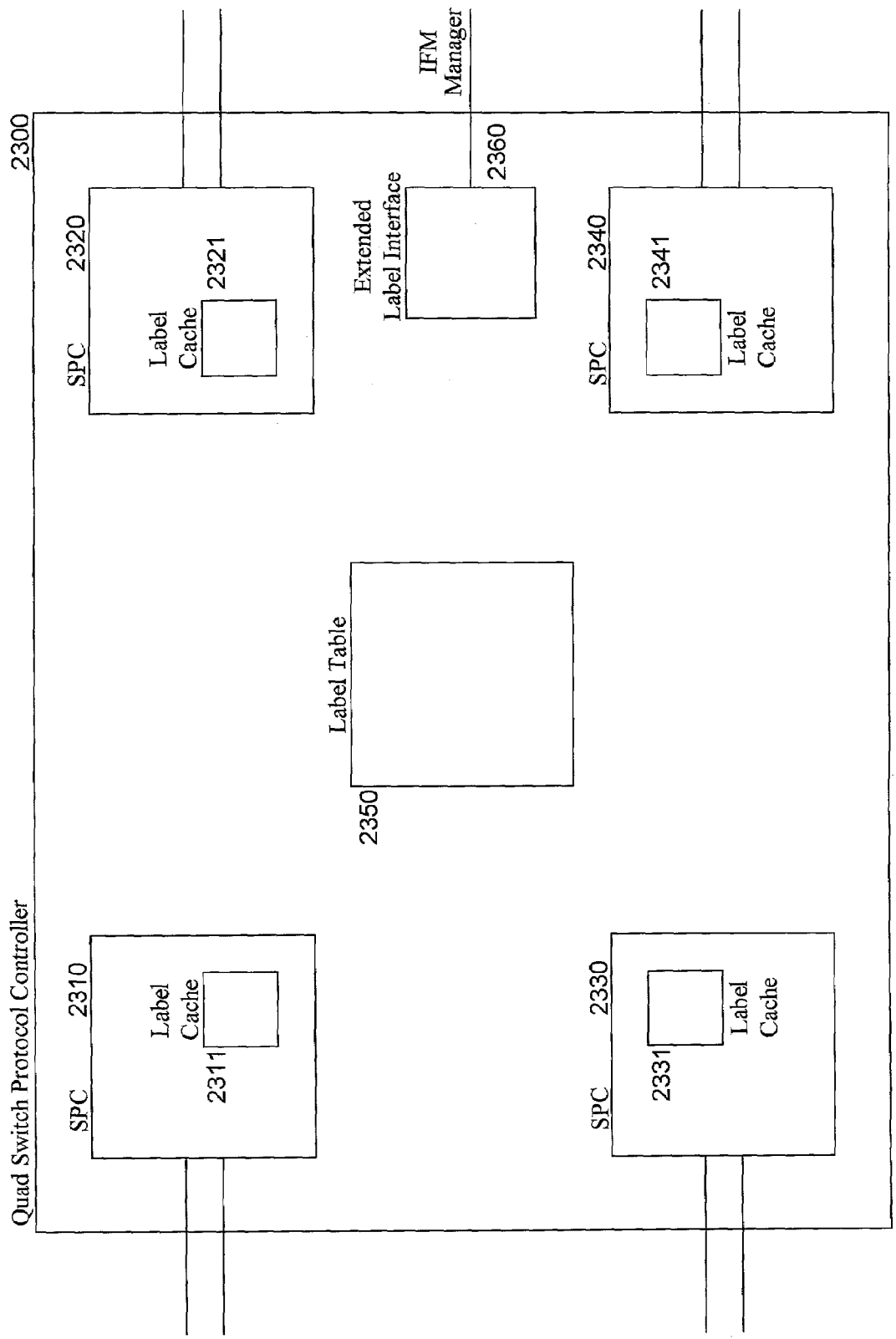
FIG. 23 is a block diagram illustrating an example of switch protocol controller caching in one embodiment.

FIG. 23 is a block diagram illustrating an example of SPC caching in one embodiment. In this embodiment, four SPCs 2310, 2320, 2330, and 2340 share a label table 2350. The four SPCs may be contained on a single board or chip referred to as a quad SPC 2300. Each SPC also has a local label table cache, such as local label table cache 2311 for SPC 2310. The extended label table interface 2360 provides access to, in one embodiment, an IFM manager that receives requests for port maps not currently stored in the shared label table and provides the requested port maps. Alternatively, the extended label table interface can provide access directly to an external label table. The IFM manager may access an overall manager of the interconnect fabric to retrieve the port maps. One skilled in the art will appreciate that various well-known caching techniques may be used to implement the described two-tier or three-tier caching system.

Figure 24:
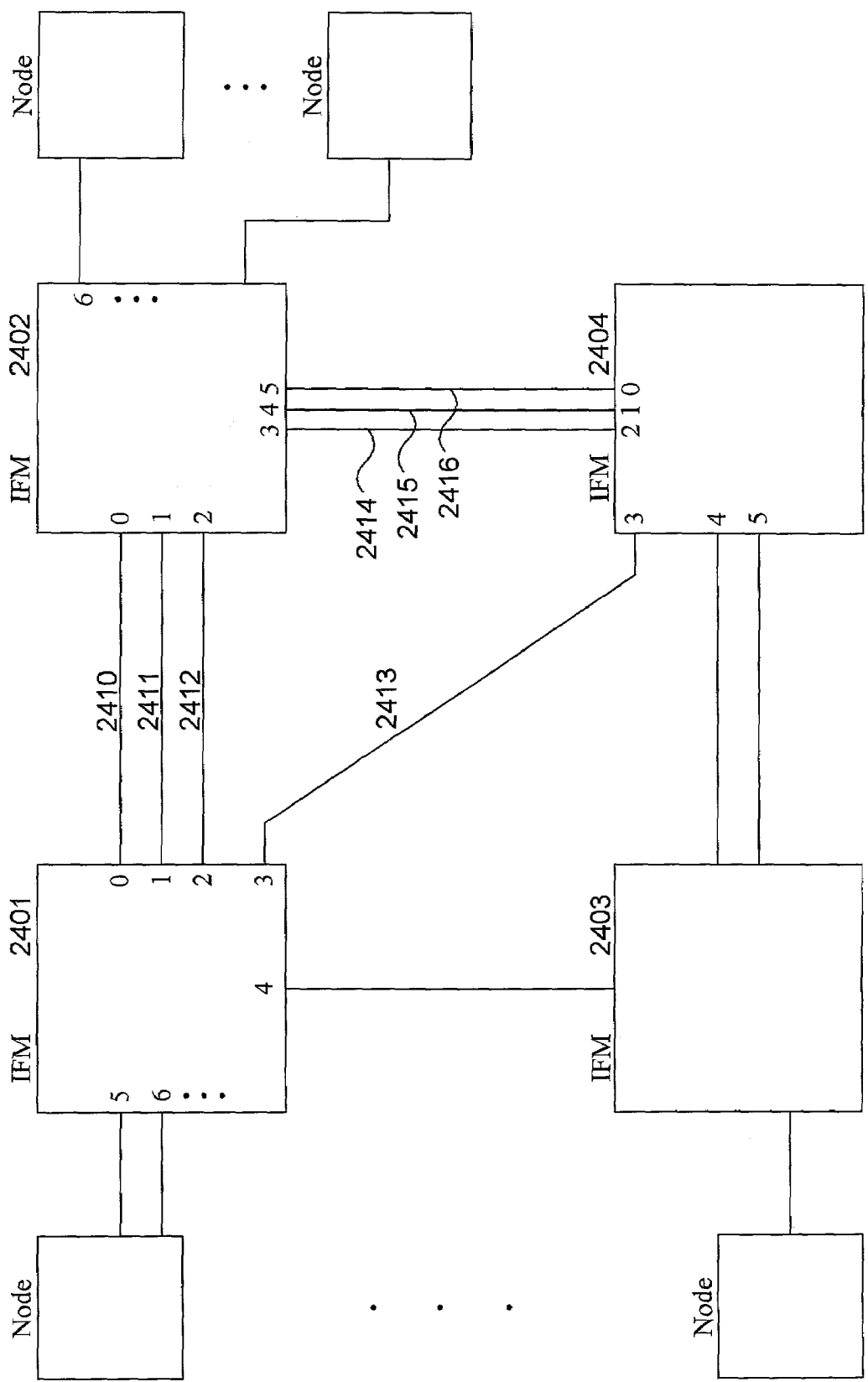
FIG. 24 is a block diagram illustrating an interconnect fabric configuration with multiple direct links between interconnect fabric modules.

As noted above, IFMs may be interconnected to provide inter-switch load balancing. For example, two IFMs may have multiple direct links between them to increase the bandwidth of transmissions between the IFMs. FIG. 24 is a block diagram illustrating an interconnect fabric configuration with multiple direct links between IFMs. In this example, IFM 2401 and IFM 2402 have three direct links 2410, 2411, and 2412 between them. The use of multiple direct links allows multiple frames to be transmitted simultaneously between the directly linked IFMs. For example, three nodes directly linked to IFM 2401 may simultaneously have connections established to three different nodes directly linked to IFM 2402. In this example, IFM 2401 is also indirectly linked to IFM 2402 via links 2413 and links 2414, 2415, and 2416 through IFM 2404. Ports of an IFM are equivalent when they can be used interchangeably to route frames to their destination. Equivalent ports may have similarly configured label tables to facilitate their use as equivalents.

In one embodiment, each SPC has an equivalent port table that defines which ports of the IFM are logically equivalent to one another. Alternatively, the SPCs of an IFM may share an equivalent port table. In the illustrated embodiment, ports 0,1, and 2 may be equivalent ports for both IFM 2401 and IFM 2402. When the header processor selects a port map, an equivalent port service of the SPC determines whether the ports of the port map are currently available. If a port is not currently available, the equivalent port service determines from the equivalent port table whether an equivalent port is available. If so, the equivalent port service modifies the port map so that the frame is routed through the equivalent port. For example, if a port map designates port 0 of IFM 2401, but port 0 is currently in use, then the equivalent port service may select port 1 as an equivalent to replace port 0 in the port map (assuming port 1 is not currently in use).

Figure 25:
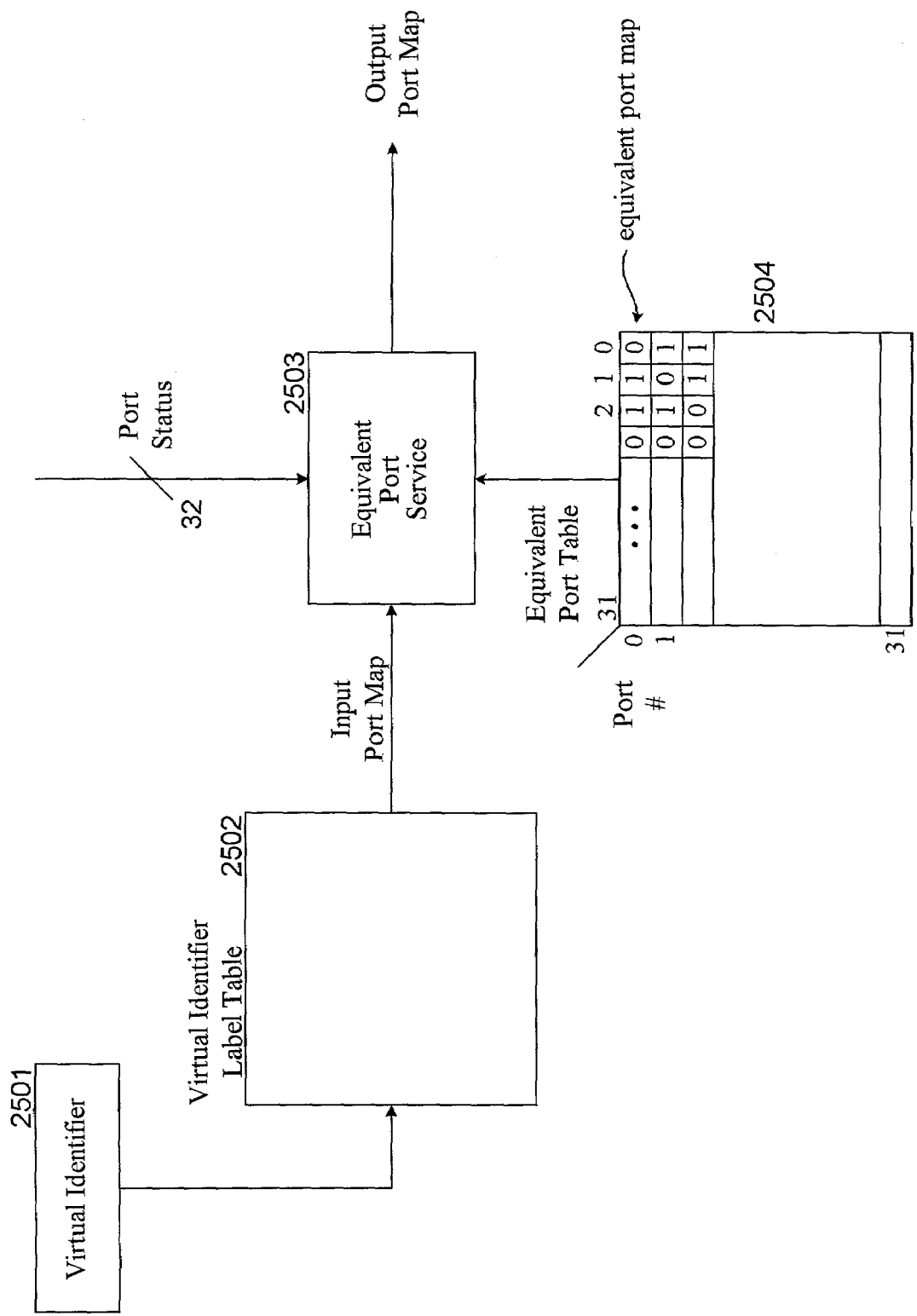
FIG. 25 is a block diagram illustrating an example use of equivalent ports.

FIG. 25 is a block diagram illustrating an example use of equivalent ports. Equivalent port service 2503 inputs a port map that may be selected based on virtual identifier 2501 and virtual identifier label table 2502. The equivalent port service also inputs equivalent port table 2504. The equivalent port table contains an entry for each port of the IFM. Each entry, referred to as an equivalent port map, contains a bit for each port of the IFM. In this example, the entry for port 0 has its bits for port 1 and port 2 set to indicate that port 0, port 1, and port 2 are equivalent. The entries for ports 1 and 2 have their bits set in a similar manner. The equivalent port service also inputs the port status lines, which indicates the current status of each of the ports of the IFM. When the equivalent port service receives a port map it determines whether the designated ports are available based on the port status. If a designated port is not available, the equivalent port service retrieves the equivalent port map for that designated port. The equivalent port service then determines whether any of the equivalent ports are available. If an equivalent port is available, then the equivalent port service changes the port map to designate an available equivalent port. If no equivalent ports are available, then the equivalent port service leaves the port map unchanged. In some embodiments, an equivalent port map may also have a priority associated with each port, and if so may select equivalent ports based on their associated priority. The priorities may be useful, for example, when ports are equivalent, but the cost of routing a frame through the ports are different. For example, port 3 of IFM 2401 may be equivalent to port 0, port 1, and port 2, but the cost of routing a frame through port 3 may be higher because the frame would travel through IFM 2404 on its way to IFM 2402. If an equivalent port is selected, then the same equivalent port may be selected for subsequent frames of the same sequence of frames. This selection will help ensure that the frames in the sequence are received at the destination in the order that they were transmitted.

Figure 26:
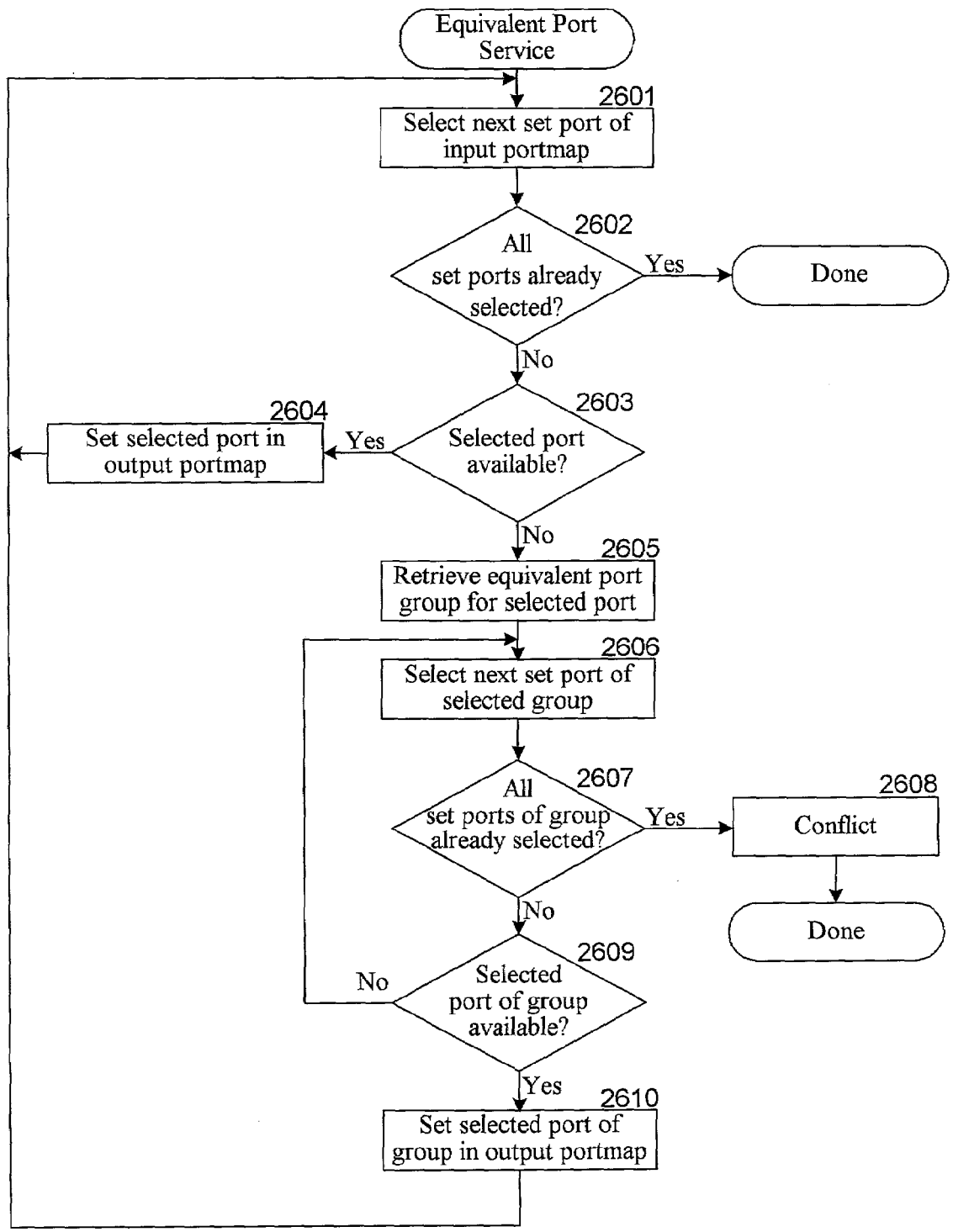
FIG. 26 is a diagram illustrating logic of an embodiment of the equivalent port service.

FIG. 26 is a diagram illustrating logic of an embodiment of the equivalent port service. The equivalent port service receives an input port map and processes each designated port of the input port map to determined whether to substitute an equivalent port in a port map to be output. The service may first initialize the output port map so that no ports are designated. In block 2601, the service selects the next designated port of the input port map, beginning with the first. In decision block 2602, if all the designated ports have already been selected, then the service completes, else the service continues at block 2603. In decision block 2603, if the selected port is available, then the service designates the selected port in the output port map and proceeds to select the next designated port of the input port map. If the selected port is not available, however, the service in block 2605 retrieves the equivalent port map for the selected port from the equivalent port table. In block 2606, the service selects the next designated port of the selected equivalent port map, beginning with the first. In decision block 2607, if all designated ports of the equivalent port map have already been selected, then the service continues at block 2608, else the service continues at block 2609. In block 2608, the service designates the selected port in the output port map because no equivalent ports are available and completes. The service may repeat this process as ports become available. In decision block 2609, if the selected port of the equivalent port map is available, then the service continues at block 2610, else the service loops to block 2606 to select the next designated port of the equivalent port map. In block 2610, the service designates the selected port of the equivalent port map in the output port map, and then loops to select the next designated port of the input port map.

Figure 27:
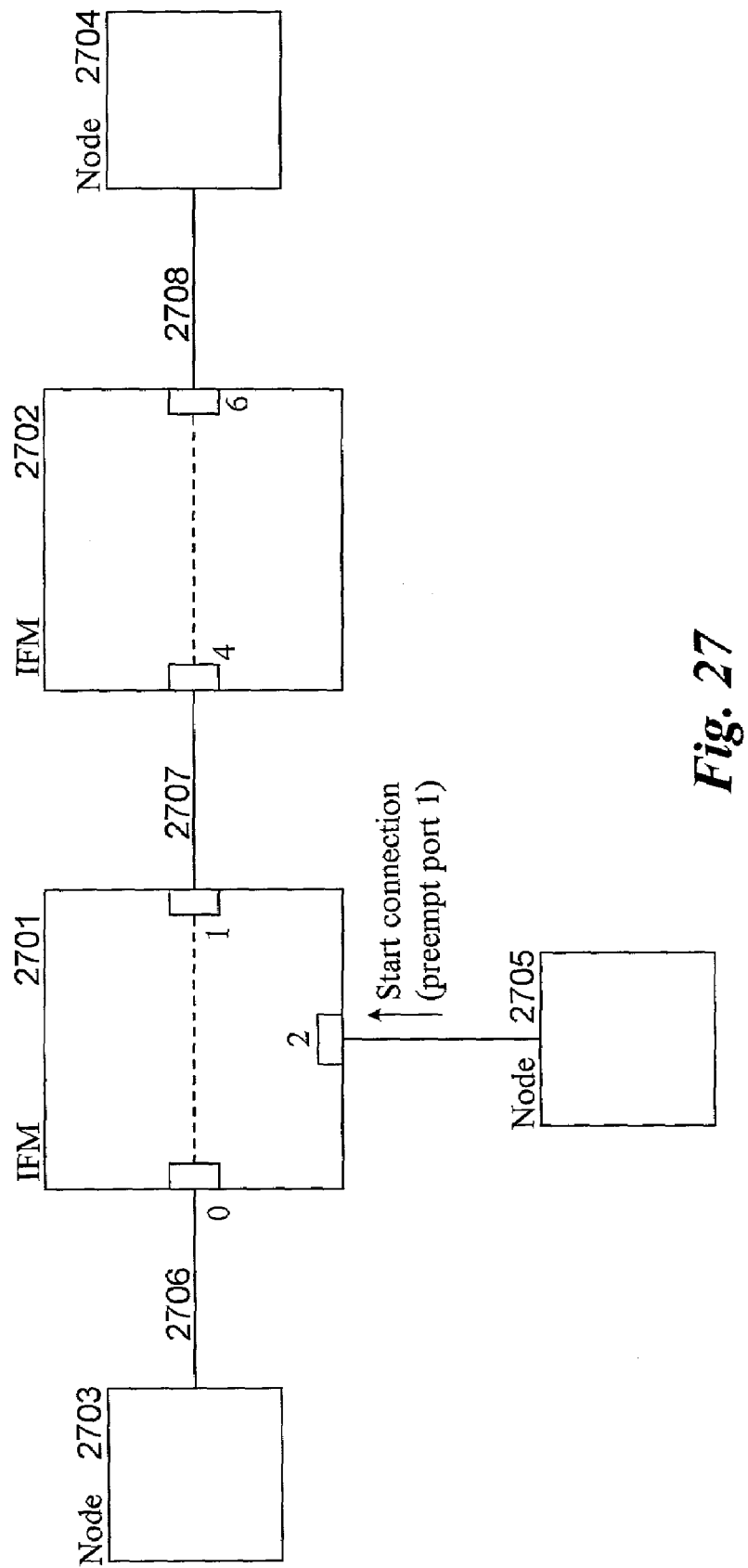
FIG. 27 illustrates an example of preempting a connection.

In some embodiments, the IFMs allow an existing connection to be preempted when a connection with a higher priority is to be established that conflicts with the existing connection. FIG. 27 illustrates an example of preempting a connection. In particular, in the illustrated embodiment a connection is established between node 2703 and node 2704. The connection includes link 2706, a crosspoint connection between port 0 and port 1 of IFM 2701, link 2707, a crosspoint connection between port 4 and port 6 of IFM 2702, and link 2708. Once the connection has been established, however, node 2705 sends a start-of-connection frame with a higher priority than the existing connection and with its preemption bit (flag) set. When the SPC for port 2 receives the frame, it selects the switch destination port through which the connection is to be built. The SPC may use the equivalent port service to identify an equivalent port that is available if the port designated by the port map is in use. If port 1 is designated in the port map and there is no equivalent port that is available, however the SPC for port 2 detects a conflict. The SPC then sets a flag indicating that the conflicting port (i.e., port 0 or 1) should participate in the ensuing arbitration. The SPC for port 2 then sets the arbitration flag and the conflicting port and port 2 participates in the arbitration. If the conflicting port loses, its SPC sends a frame through its connection in both directions indicating that the connection is to be removed, and the SPC for port 2 then establishes a crosspoint connection between port 1 and port 2 and transmits its start-of-connection frame. Conversely, if the conflicting port wins the arbitration, then the existing connection remains established, and the SPC for port 2 sends a frame indicating that the connection cannot be established in its input direction.

Figure 28:
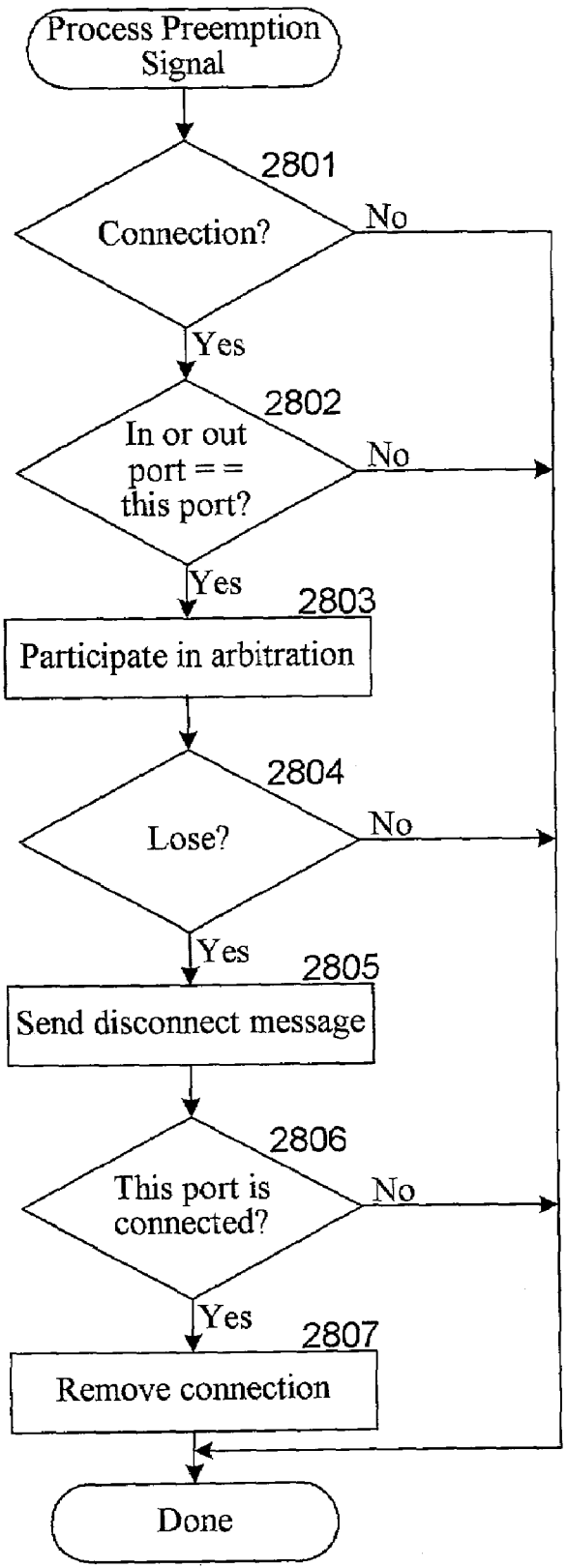
FIG. 28 is a diagram illustrating logic of an embodiment of processing a preemption signal.

FIG. 28 is a diagram illustrating logic of an embodiment of processing a preemption signal. This processing is performed when an SPC detects a preemption signal on the arbitration bus. In decision block 2801, if it is determined that the SPC's port is currently in a connection, then the SPC may need to participate in the arbitration. In decision block 2802, if this port is the conflicting port (e.g., the port that established the connection), then this port participates in the arbitration and continues processing at block 2803. In block 2803, the SPC for this port participates in the arbitration. In decision block 2804, if the SPC of this port loses the arbitration, then it continues at block 2805 to disconnect the connection, else it leaves the connection established. In block 2805, the SPC sends a disconnect frame in the direction of its input and output. In block 2807, the SPC indicates to the SCU to remove the crosspoint connection for this port.

The Fibre Channel standard defines a class 3 protocol that provides a connectionless protocol for transmitting frames without an acknowledgment. Because the protocol is connectionless and no acknowledgment is used, the class 3 protocol can be used for multicasting, that is sending a frame from one node to multiple nodes. Class 3 protocol also specifies that frame delivery is not guaranteed. Traditionally, when a Fibre Channel switch receives a class 3 frame for multicasting, it routes that class 3 frame through as many of the destination ports as are currently available and then discards that frame. In one embodiment, an SPC buffers a class 3 multicasting frame and sends the frame through the multicast ports as they become available. Although the timeout of the class 3 frame at the SPC may expire before all multicast ports become available, the buffering of multicast frames increases the chances that the frame may be sent through additional multicast ports as they become available. One skilled in the art will appreciate that multiframe buffering can be used with communications services other than class 3 of Fibre Channel. In particular, it can be used with any non-acknowledged datagram service, also referred to as a packet service. One skilled in the art will appreciate that multiframe buffering can be used to interleave the transmission of a multicast frame with other frames (e.g., connectionless frames). The multiframe buffering algorithm may, for example, give a highest priority score to the multicast frame only when at least one of the multicast ports is currently available.

Figure 29:
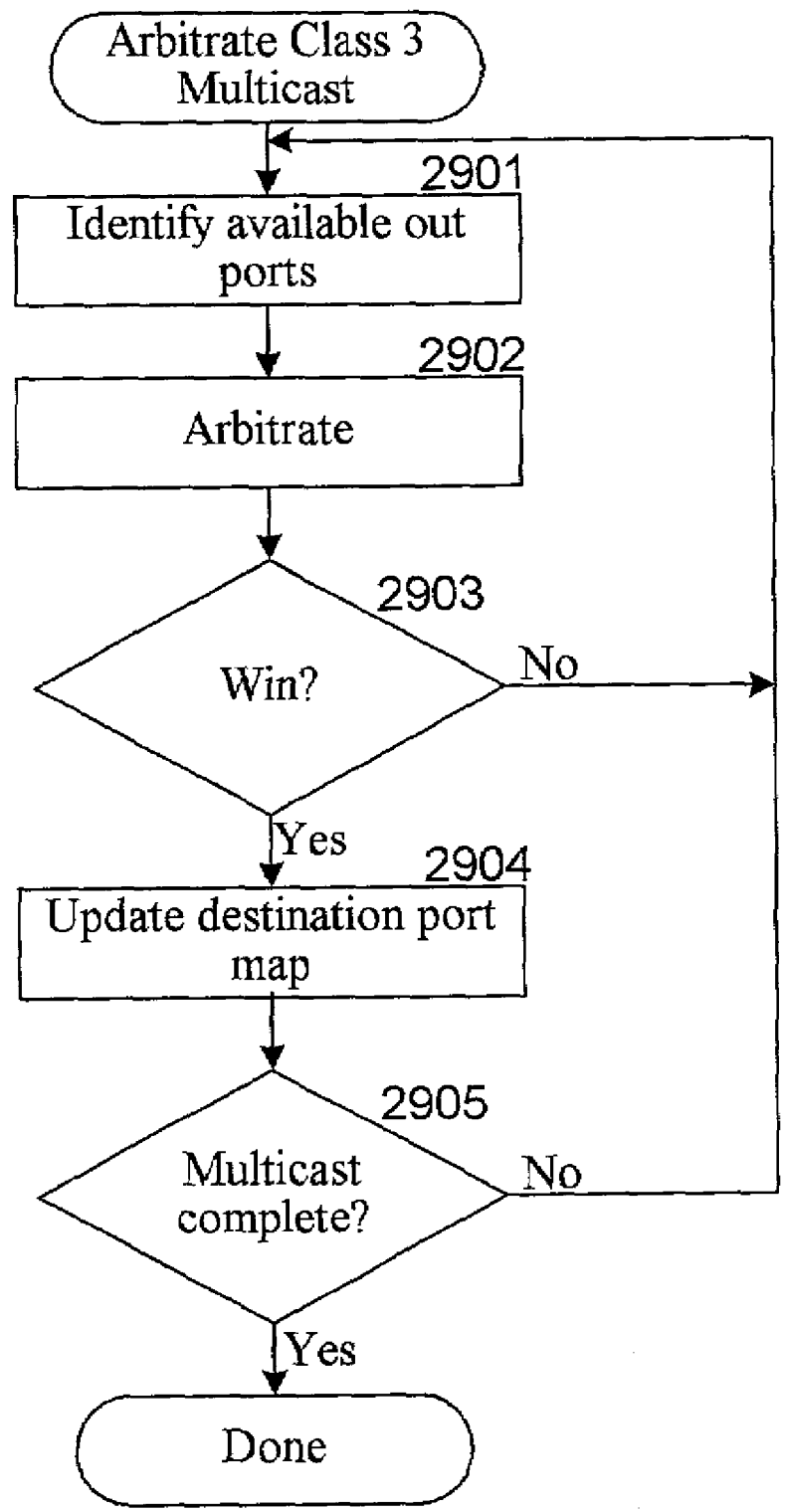
FIG. 29 is a diagram illustrating logic of an embodiment of distributed class 3 multicasting.

FIG. 29 is a diagram illustrating logic of an embodiment of distributed class 3 multicasting. This logic is performed when a class 3 frame with multicasting is received at an SPC. In block 2901, the SPC identifies the multicast ports that are currently available. The multicast ports may be the set of ports indicated by the port map to which a virtual identifier maps. In block 2902, if any of the multicast ports are available, then the SPC participates in arbitration. In decision block 2903, if the SPC wins the arbitration, then it continues at block 2904, else it continues at block 2901 to again participate in an arbitration. In block 2904, the SPC sends the frame and updates the port map stored in a temporary buffer to reflect those ports through which the frame has been sent. In decision block 2905, if the multicast is complete (i.e., the frame has been transmitted through each multicast port), then processing completes, else processing continues to participate in an arbitration to send the frame as additional ports become available.

Additional Quality Of Service Information

Figure 30:
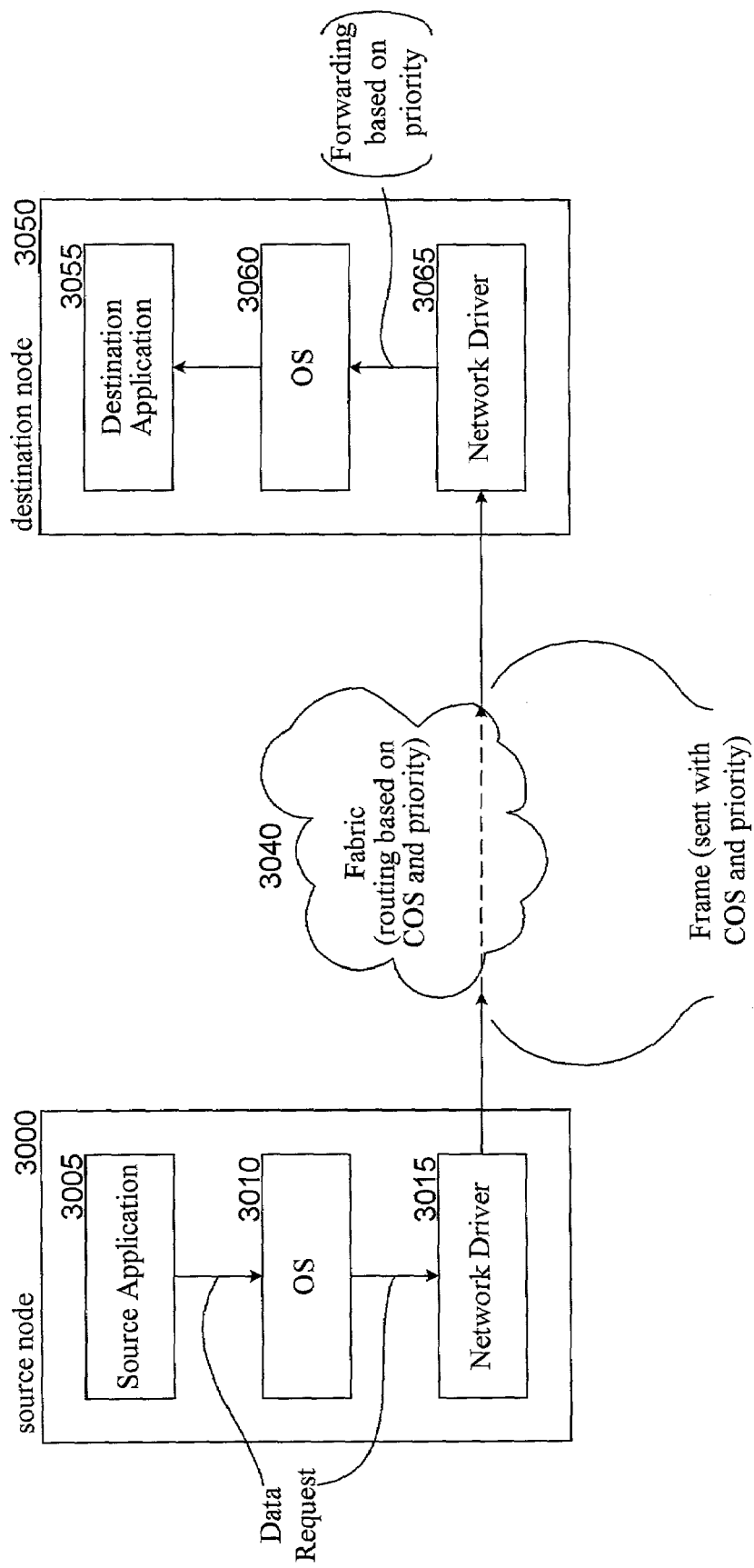
FIG. 30 is a block diagram illustrating an example of node-to-node data communication using QOS communication parameters over a network fabric.

FIG. 30 is a block diagram illustrating an example of node-to-node data communication using QOS communication parameters over a network fabric. In the illustrated embodiment, a source application 3005 on a source node 3000 generates a request to the local operating system (OS) 3010 on the source node to read data from a destination or to write data to a destination, such as by using the standard application command for a read or a write operation and identifying various application-layer QOS specifications (e.g., via the "Type Of Service" field or priority bits in an IP packet) for the data communication.

The OS provides the request to the network driver 3015 (e.g., a VI NIC) of the source node in a standard manner, and the network driver translates the request into appropriate network-layer QOS communication parameters based on the type of the network. In the illustrated embodiment, the network supports multiple COSes, transmission priorities, and the ability to preempt existing network connections, and the network driver uses some or all of those features to enable the data communication to achieve a desired QOS level (e.g., a level of bandwidth, latency, and/or reliability). The driver builds a network frame that includes selected QOS communication parameters, and transmits the network frame to the network fabric 3040.

The network fabric receives the frame and routes it to a destination node 3050 using the QOS parameters embedded in the frame, thus delivering the data with the desired QOS level. A network driver 3065 at the destination translates the embedded network-layer QOS communication parameters into appropriate application-layer QOS specifications for a destination application 3055 (e.g., by converting the network frame into one or more IP packets that include appropriate values), and delivers the translated data to the application via the destination OS 3060. In some embodiments, the destination driver and/or destination OS may also utilize the network-layer QOS communication parameters or application-layer QOS specifications to provide QOS-based application notification and data delivery.

Figure 31:
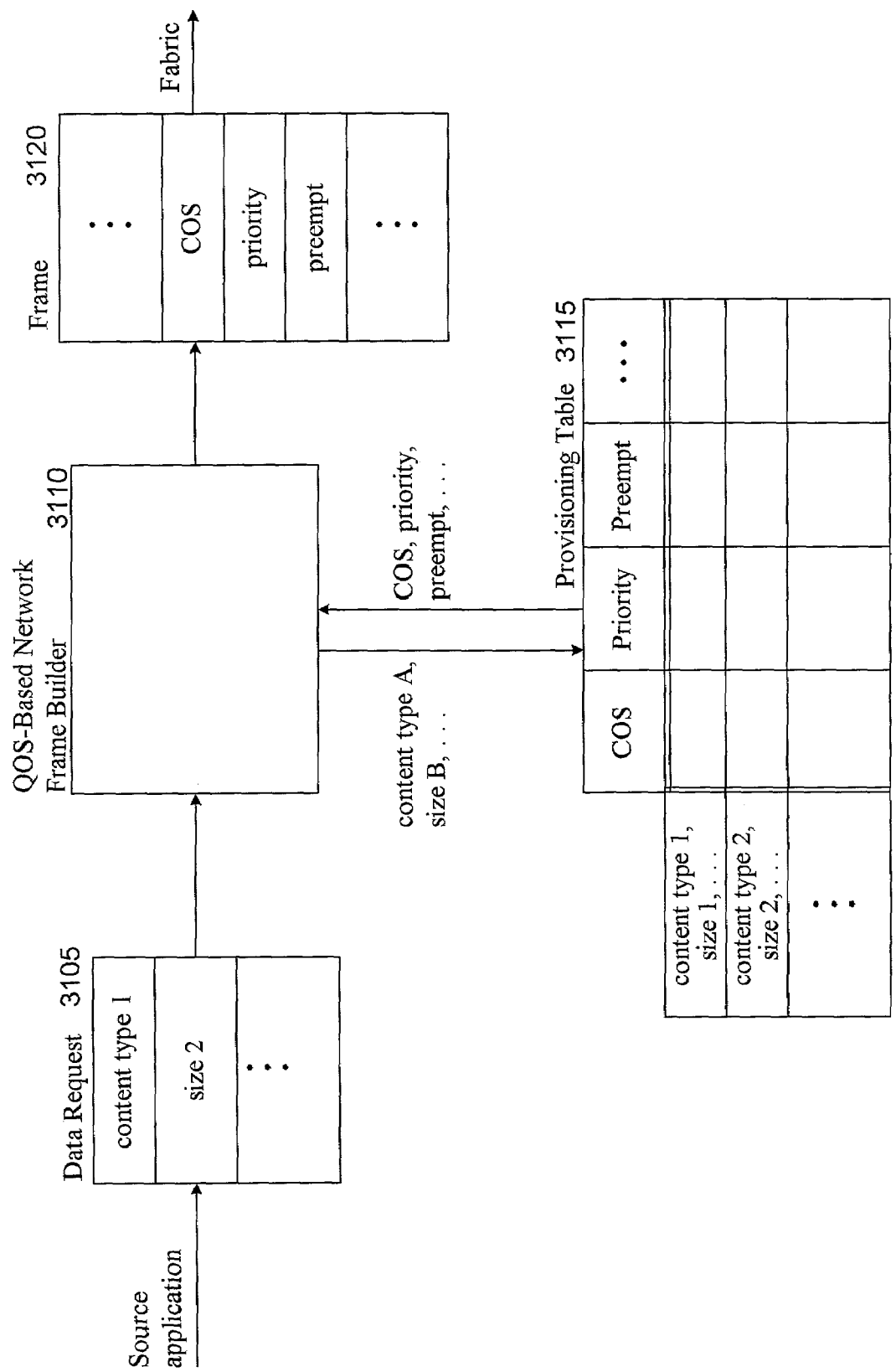
FIG. 31 is a dataflow diagram illustrating an example of using QOS communication parameters for a data communication.

An example of using QOS communication parameters for a data communication from a source node is illustrated in FIG. 31. In the illustrated example, an application data request 3105 from a source application includes a variety of information about the data request, such as a content type, size, destination indication, etc. This included information is processed by a network frame builder process 3110 (e.g., under the control of the network driver) in order to determine appropriate network-layer QOS communication parameters to use with the data communication. In particular, in the illustrated embodiment the included information is used to access a provisioning table 3115 (e.g., stored together with other information as a VI translation table) for the source node to determine network-layer QOS communication parameters that are appropriate for the data request. The contents of the provisioning table can be generated in a variety of ways, such as by being managed by a network manager for the network. The frame builder process can use the accessed network-layer QOS communication parameters to generate a network frame 3120, and then forward the generated frame to the network fabric.

Thus, in the illustrated embodiment, applications do not need knowledge of network-layer QOS information in order to send or receive data in an appropriate manner. Instead, applications can register one or more data communications (or types of data communication) with an appropriate manager, and a provisioning table on the application's node can be configured with appropriate QOS communication parameters for each data communication (or data communication type).

FIG. 32 illustrates an example of configuring a node to use QOS communication parameters and of monitoring a network to determine whether to modify those configured communication parameters. In the illustrated embodiment, a content/services manager 3235 of a network manager 3230 initially receives various general data information for each of various source applications 3210 and/or source nodes 3205 (e.g., services required by or available from each source application or node and/or information that is available from each source application or node), such as during initialization of those source nodes and/or source applications. In other embodiments, such information can be provided to the network manager in other ways, such as by being stored in an accessible location (e.g., via an LDAP server). Regardless of the manner in which the network manager determines types of information and services that will be provided over the network, the network manager can use that information to determine QOS levels that are desirable for the provided services and types of information (e.g., by allocating available bandwidth and/or other network resources between the types of information and services). Appropriate QOS communication parameters that will support those QOS levels can then be selected by the network manager. If one or more network monitors 3260 are available for the network, the network manager may also configure the network monitors to monitor for specified types of network information (e.g., QOS levels or QOS communication parameters).

The selected QOS communication parameters can then be used by a configuration manager 3240 portion of the network manager to configure node provisioning tables 3215 as appropriate, such as in response to data communication registrations (e.g., requests to supply specified data or to connect to a specified type of service). If the network manager also receives network loading information from the network monitors, the network manager can use that loading information before initial configuration of a provisioning table in order to influence the selection of appropriate QOS communication parameters (or ranges of parameters) and/or after the initial configuration to dynamically update the configured QOS communication parameters in the provisioning table to ensure that desired QOS levels are maintained. In some embodiments, data communication registration requests are initially allowed with the lowest possible priority and least overhead COS to provide a desired QOS level and, as network loading changes and/or other requests are serviced, the network manager adjusts (e.g., in a manner transparent to the source node and/or source application) the configured COS and priority values that are used for registered information types.

QOS communication parameters can be selected and managed in a variety of ways. In some embodiments, upon system power-up, initialization, or the attachment of a node to the network, one or more applications on the node send network communications requirements to the network manager using a predefined communications protocol and address. The network manager defines data communication types (e.g., based on types of content or information being requested or provided) and selects appropriate associated QOS communication parameters to support QOS levels desired for those defined data communication types. The selected QOS communication parameters for some or all data communication types are then communicated back to the nodes by the network manager. When an application on a node makes a data communication request, the node can map the request to one of these defined data communication types and use the associated QOS communication parameters for the communication. The network manager can also configure the one or more network monitors to monitor performance of the network for the QOS communication parameters allocated by the network manager.

In some embodiments, the QOS communication parameters are provided to nodes in a dynamic manner. For example, when an application on a node wishes to communicate over the network, it may send a data communication registration request (e.g., a request-to-connect for a defined or default information type) to the network manager. The network manager can then determine if the request can be supported, and if so can configure the node's provisioning table with the appropriate QOS parameters and respond to the application with an "authorization to send" confirmation (e.g., an affirmative response message, or the absence of a denial message). The network manager can also provide additional information related to the registered data communication in the response message in some embodiments, such as a destination identifier (e.g., a virtual identifier or a virtual address) for use with the data communication. Once the node receives authorization and the application has provided data to send, the node's network driver builds one or more network frames using appropriate QOS communication parameters from the provisioning table for the data communication type being sent, and sends the frames. The fabric delivers the frames using the embedded QOS communication parameters so as to provide the desired QOS levels for the data communication type.

In some embodiments, the QOS communication parameters and/or QOS levels to be supported for a data communication or type of data communication are determined as part of a negotiation process between a source application and the network manager. For example, when making a data communication registration request, a source application may request specific desired or required QOS levels and/or QOS communication parameters for the data communication, or ranges of such levels or communication parameters. In response, the network manager may determine whether the requested QOS levels and/or communication parameters can be supported, and may select the QOS levels and/or communication parameters to be enabled for the data communication based in part or entirely on the request. Conversely, if the network manager determines that the requested QOS levels and/or communication parameters cannot be supported, the network manager may deny the request and/or enable alternative QOS levels and/or communication parameters. In some embodiments, the source application may be able to accept the alternative values suggested by the network manager and/or continue the negotiation, while in other embodiments the source application may receive a denial of the registration request and opt to make an additional request with less restrictive desired or required QOS values.

In some embodiments, desired QOS levels are provided by dynamically managing defined QOS communication parameters, such as by modifying QOS communication parameters that are specified in some or all of the network nodes' provisioning tables to reflect a current state of the network (e.g., based on monitoring of the network). For example, a network monitor can report network loading on an operational network (e.g., on a COS and priority basis) to the network manager. As loading increases above some predefined threshold for a given data communication type, the network manager can, for example, increase priority values and/or modify COS types that are associated with that data communication type in nodes' provisioning tables. Conversely, if network loading decreases, the network manager can decrease priority and/or COS values for a data communication type.

Similarly, in some embodiments desired QOS levels are provided for a specific data communication and/or type of data communication by dynamically modifying paths to which the data communications of interest are assigned and/or by dynamically limiting other data communications that share some or all of the assigned paths. For example, if other data communications or other network problems are preventing data communications of interest from achieving the desired QOS levels for those data communications of interest, the network manager could dynamically modify the path which the data communications of interest are using (e.g., selecting a new path with increased availability and/or bandwidth due to multiple equivalent ports between intermediate network routing devices along the path), such as in a manner transparent to the source and destination applications participating in the data communications (e.g., by modifying the label tables of the intermediate network routing devices along the path). Alternatively, if other data communications are preventing a desired QOS level from being achieved for data communications of interest (e.g., by using too much bandwidth along some or all of the paths for those data communications of interest), those other data communications can by dynamically limited in various ways. For example, the paths used by some or all of the other data communications could be changed so that they do not intersect with the paths for the data communications of interests (or so that they do not intersect with portions of those paths with are too congested). In addition, the rate or times at which other data communications are allowed to leave a source node and/or to be sent through the network could be controlled in various ways, such as by configuring a source node's provisioning table (or VI translation table) to not allow specified data communications to be sent (e.g., until re-configured, or at specified times) and/or by configuring some or all intermediate network routing devices to filter or delay (e.g., via buffers within the intermediate network routing devices) certain data communications at certain times.

In some embodiments, additional techniques are used for selecting and managing QOS for the network. These can include defining default QOS communication parameters (e.g., COS and priority values) for some or all defined data communication types, defining increments for raising or lowering values of QOS communication parameters for some or all data communication types, defining thresholds (e.g., network load thresholds) to determine when to raise or lower values of QOS communication parameters for some or all data communication types, defining minimum and/or maximum values for QOS communication parameters for some or all data communication types, and performing network monitoring in such a manner as to provide network loading information for some or all IFM internal links and for end-to-end paths.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

What is claimed is:

1. A method for communicating data through a network from a source node to one or more destination nodes at appropriate Quality Of Service ("QoS") levels, the network having multiple routing devices and a network manager for configuring those routing devices to forward data, each routing device able to forward data to at least one or more other routing devices based on a current configuration, the method comprising:

under control of the source node,
receiving data for communication to a destination node device;
registering the data communication with the network manager by sending a registration request and receiving a transmittal virtual identifier and multiple transmission QoS communication parameters for use with the communication; and
sending to a first routing device the received data accompanied by the transmittal virtual identifier and the transmission QoS communication parameters;
under control of the network manager and in response to the registration request from the source node,
determining a type of the data to be communicated;
determining one or more QoS levels that are appropriate for communications of the determined type of data;
determining a path through the network via which communications of data of the determined type can be sent from the source node to the destination node device at the determined QoS levels, the path associated with a virtual identifier and comprising multiple intermediate routing devices including the first routing device;
determining multiple QoS communication parameters that when used by the intermediate routing devices with communications of data of the determined type should send those data communications at the determined QoS levels; and
sending the associated virtual identifier and the determined QoS communication parameters to the source node for use as the transmittal virtual identifier and the transmission QoS communication parameters for the data communication; and under control of each of the intermediate routing devices along the path, receiving data accompanied by the transmittal virtual identifier and the transmission QoS communication parameters;

determining to forward the received data to a next device that is a next intermediate routing device along the path or the destination node device based on the accompanying transmittal virtual identifier;

determining a manner of forwarding the received data based on the accompanying transmission QoS communication parameters; and forwarding the received data accompanied by the transmittal virtual identifier and the transmission QoS communication parameters to the determined next device in the determined manner, so that the data communication will be sent to the destination node device at the appropriate QoS levels based on a type of the data being communicated.

2. The method of claim 1 including, under the control of the source node and after the registering of the communication of the data, repeatedly communicating additional data of the determined type to the destination node device by sending to the first routing device that additional data accompanied by the transmittal virtual identifier and the transmission QoS communication parameters.

3. The method of claim 1 including, under the control of a network monitor, monitoring network communications that include the forwarding of the received data by some or all of the intermediate routing devices in order to determine whether the data is sent at the determined QoS levels.

4. The method of claim 3 wherein the monitoring includes determining network load information for the network and notifying the network manager of the determined network load information.

5. The method of claim 3 wherein it is determined based on the monitoring that the data is not being sent at the determined QoS levels, and including, under the control of the network manager:

determining updated QoS communication parameters that are distinct from the transmission QoS communication parameters and that when used by the intermediate routing devices under current network load conditions should cause communications of data of the determined type to be sent at the determined QoS levels; and modifying the transmission QoS communication parameters to be used with future data communication of the determined type by sending the updated QoS communication parameters to the source node as replacements.

6. The method of claim 3 wherein it is determined based on the monitoring that the data is not being sent at the determined QoS levels, and including, under the control of the network manager:

determining an updated path through the network from the source node to the destination node via which communications of data of the determined type can be sent at the determined QoS levels, the updated path distinct from the determined path; and modifying the path to be used with future data communications of the determined type to be the updated path.

7. The method of claim 6 wherein the modifying of the path to be used with future data communications of the determined type includes associating the transmittal virtual identifier with the updated path.

8. The method of claim 3 wherein it is determined based on the monitoring that the data is not being sent at the determined QoS levels due to interference by other data communications that are being sent through the network via at least portions of the path, and including, under the control of the network manager, limiting the sending of those data communication via portions of the path to reduce the interference.

9. The method of claim 1 including, under the control of the network manager, configuring the intermediate routing devices to forward data accompanied by the determined QoS communication parameters in accordance with the determined QoS levels.

10. The method of claim 1 including, under the control of the network manager, configuring all but a last of the intermediate routing devices to forward data accompanied by the associated virtual identifier to the next intermediate routing device along the path, and configuring the last intermediate routing device along the path to forward data accompanied by the associated virtual identifier to the destination node device.

11. The method of claim 1 wherein the transmission QoS communication parameters include at least a transmission priority value and a transmission Class Of Service identifier.

12. The method of claim 11 wherein the determining of the manner of forwarding received data based on the accompanying transmission QoS communication parameters includes determining how quickly to forward the received data based at least in part on the accompanying transmission priority value and the accompanying transmission Class Of Service identifier.

13. The method of claim 1 wherein the determined QoS levels include at least one of a minimum level of throughput, a maximum level of network latency, and a maximum level of delivery jitter.

14. The method of claim 1 wherein the sent registration request includes a requested QoS level for the data communication and wherein the determining of the appropriate QoS levels includes determining whether to select the requested QoS level as one of the determined appropriate QoS levels.

15. The method of claim 1 including, under the control of the source node, negotiating with the network manager to select a mutually acceptable QoS level as one of the determined appropriate QoS levels.

16. The method of claim 1 wherein the network manager receives registration requests for data communications from each of multiple source nodes of the network, and wherein the network manager determines appropriate QoS levels and corresponding QoS communication parameters for each registered data communication.

17. The method of claim 1 wherein the network manager receives multiple registration requests for data communications from the source node, and wherein the network manager determines distinct appropriate QoS levels and corresponding QoS communication parameters for each registered data communication based on a type of data to be communicated.

18. The method of claim 1 including, under the control of the source node, storing the received multiple transmission QoS communication parameters in a provisioning table for the source node for use with future communications of data of the determined type.

19. The method of claim 1 including, under the control of the network manager, selecting one or more destination node devices for the data communication based on the determined type of the data, and wherein the determined path is selected so as to lead to the selected destination node devices.

20. A method for communicating data with an appropriate Quality Of Service ("QoS") through a network having multiple routing devices and a network manager, the method comprising:

under control of a source,
registering a data communication of a first type with the network manager so that one or more QoS communication parameters for use in forwarding the data communication along a path from the source to a destination through one or more of the routing devices are identified; and
initiating the data communication of the first type to the destination by supplying data and an indication of the identified QoS communication parameters to a first of the routing devices along the path, and propagating said data and said indication to all nodes along the path, for forwarding in a manner based on the identified QoS communication parameters; and under control of the network manager,
receiving an indication of the registering of the data communication of the first type;
determining at least one QoS level to be satisfied when transmitting the data communication of the first type along the path to the destination; and
identifying at least one QoS communication parameter that when used for transmitting the data communication of the first type along the path to the destination is expected to cause the transmitting to satisfy the determined QoS levels.

21. The method of claim 20 including, under the control of the network manager, selecting one of multiple paths through the network from the source to the destination as the path for a data communication of the first type, the selecting based on the one path being able to transmit a data communication of the first type to the destination in a manner so as to satisfy the determined QoS levels.

22. The method of claim 21 including, after the initiating of the data communication, determining that the data communication was not transmitted so as to satisfy the determined QoS levels and selecting a distinct one of the multiple paths through the network from the source node to the destination node for use with future data communications of the first type.

23. The method of claim 20 wherein the determined QoS levels include a specified amount of network bandwidth.

24. The method of claim 23 wherein the identified QoS communication parameters include an indication of a data communication Class Of Service for which at least the specified amount of network bandwidth will be allocated.

25. The method of claim 23 including, under control of the network manager, limiting other data communications that can be sent through the network via at least portions of the path so as to preserve at least the specified amount of network bandwidth for a data communication of the first type.

26. The method of claim 25 wherein the limiting of the other data communications is performed dynamically during the transmitting of a data communication of the first type.

27. The method of claim 20 wherein the determined QoS levels include a specified amount of network latency.

28. The method of claim 27 wherein the identified QoS communication parameters include an indication of a priority that will allow a data communication of the first type to be selected by the routing devices along the path for forwarding in a sufficiently prompt manner that the transmitting of that data communication will be performed with at most the specified amount of network latency.

29. The method of claim 27 including, under control of the network manager, limiting other data communications that can be sent through the network via at least portions of the path so as to prevent the routing devices along the path from delaying the forwarding of a data communication of the first type sufficiently that the specified amount of network latency is exceeded.

30. The method of claim 20 wherein the determined QoS levels include a specified amount of delivery jitter.

31. The method of claim 30 wherein the identified QoS communication parameters include an indication of a priority that will allow a data communication of the first type to be selected by the routing devices along the path for forwarding in a sufficiently predictable manner that the transmitting of that data communication will be performed with at most the specified amount of delivery jitter.

32. The method of claim 30 including, under control of the network manager, limiting other data communications that can be sent through the network via at least portions of the path so as to control a length of time that the routing devices along the path will delay the forwarding of a data communication of the first type in such a manner that the specified amount of delivery jitter is not exceeded.

33. The method of claim 20 wherein the determined QoS levels include a specified amount of network availability.

34. The method of claim 33 including, under control of the network manager, configuring the path from the source to the destination in such a manner that one or more of the routing devices along the path include multiple equivalent ports with which a data communication of the first type can be forwarded.

35. The method of claim 34 wherein, for at least one of the routing devices that includes multiple equivalent ports, the multiple equivalent ports lead to distinct next routing devices so that a problem with one of the next routing devices does not prevent the forwarding of a data communication of the first type to the destination via another of the next routing devices.

36. The method of claim 20 wherein the registering of the data communication with the network manager includes providing an indication of the first type.

37. The method of claim 20 wherein the registering of the data communication with the network manager includes providing information related to the data communication, and including, under the control of the network manager, analyzing the provided information to determine that the data communication is of the first type.

38. The method of claim 37 wherein the provided information includes an indication of data to be communicated.

39. The method of claim 20 wherein the first type of data communication involves communicating data of an first type.

40. The method of claim 20 wherein the first type of data communication involves communicating data in an indicated manner.

41. The method of claim 20 wherein the first type of data communication involves communicating data to an indicated destination.

42. The method of claim 20 wherein the first type of data communication involves communicating data that is associated with a specified destination identifier.

43. The method of claim 20 wherein the registering of the first type of data communication is performed only for an initial data communication of the first type.

44. The method of claim 20 including, under the control of the source and after the registering, repeatedly initiating additional data communications of the first type to the destination by supplying additional data to the first routing device for forwarding in a manner based on the identified QoS communication parameters.

45. The method of claim 20 including monitoring network communications in order to determine whether the initiated data communication is transmitted so as to satisfy the determined QoS levels.

46. The method of claim 20 wherein it is determined that the initiated data communication is not transmitted so as to satisfy the determined QoS levels, and including determining one or more distinct QoS communication parameters for use with future data communications of the first type.

47. The method of claim 20 wherein it is determined that the initiated data communication is not being transmitted so as to satisfy the determined QoS levels, and including limiting other data communications that are sent through the network via at least portions of the path.

48. The method of claim 20 including, under the control of the network manager, configuring the routing devices along the path to forward a data communication of the first type in accordance with the determined QoS levels.

49. The method of claim 20 including, under the control of the network manager, configuring the routing devices along the path to forward a data communication accompanied by an indication of the identified QoS communication parameters in accordance with the determined QoS levels.

50. The method of claim 20 wherein the registering of the data communication includes requesting a QoS level for the data communication, and wherein the determining of the QoS levels includes determining whether to select the requested QoS level as one of the determined QoS levels.

51. The method of claim 50 wherein the source is a source application executing on a source node, wherein the requested QoS level is specified with a manner of indicating QoS levels used by applications, wherein the determined QoS levels are specified with a distinct manner of indicating QoS levels used by the network, and wherein the determining of whether to select the requested QoS level as one of the determined QoS levels includes translating the requested QoS level into one or more equivalent QoS levels specified with the distinct manner used by the network.

52. The method of claim 20 including, under the control of the source, negotiating with the network manager to select a mutually acceptable QoS level as one of the determined QoS levels.

53. The method of claim 20 including, under the control of the network manager, selecting a virtual identifier that is associated with the path for use in routing data communications of the first type to the destination, and wherein the supplying of the data to the first routing device includes supplying an associated indication of the selected virtual identifier.

54. The method of claim 20 including, under the control of the network manager, selecting one of multiple possible destinations as the destination.

55. The method of claim 20 including, under the control of the network manager, responding to the registering by sending to the source an indication of the identified QoS communication parameters.

56. The method of claim 20 wherein multiple distinct sources each register one or more distinct types of data communications, and wherein the network manager determines appropriate QoS communication parameters for each registered type of data communication.

57. The method of claim 54 wherein the registering of the one or more distinct types of data communications occurs before the determining of the appropriate QoS communication parameters, and wherein the determining of the appropriate QoS communication parameters for each registered type of data communication is based at least in part on balancing available network resources among the distinct types of data communications.

58. A computer-readable medium whose contents cause a computing device to communicate data through a network with an appropriate Quality Of Service ("QoS") by performing a method comprising:
under control of a source,
registering a communication of data of a first type with a network manager for the network so that one or more QoS communication parameters for use in forwarding the data along a path from the source to a destination through one or more of the routing devices can be identified; and
initiating the communication of data of the first type to the destination by supplying the data and an indication of the identified QoS communication parameters to a first of the routing devices along the path, and propagating said data and said indication to all nodes along the path, for forwarding in a manner based on the identified QoS communication parameters; and
under control of the network manager,
receiving an indication of the registering of the communication of data of the first type; and
identifying at least one QoS communication parameter that when used for transmitting data of the first type along the path to the destination should cause the transmitting to satisfy one or more QoS levels determined based on the first type.

59. The computer-readable medium of claim 58 including, under the control of the network manager, selecting the path through the network from the source to the destination based on the path being able to transmit data of the first type to the destination in a manner so as to satisfy the determined QoS levels.

60. The computer-readable medium of claim 58 including, after the initiating of the data communication, determining that the data communication was not transmitted so as to satisfy the determined QoS levels and updating a manner of transmitting future data of the first type so as to increase a likelihood that the future data will be transmitted so as to satisfy the determined QoS levels.

61. The computer-readable medium of claim 58 wherein the computer-readable medium is a memory of a computing device.

62. The computer-readable medium of claim 58 wherein the computer-readable medium is a data transmission medium transmitting a generated data signal containing the contents.

63. The computer-readable medium of claim 58 wherein the contents are instructions that when executed cause the computing device to perform the method.

* * * * *